US011586640B2

(12) United States Patent
Merg et al.

(10) Patent No.: US 11,586,640 B2
(45) Date of Patent: Feb. 21, 2023

(54) SYSTEM AND METHOD FOR ACCESSING VEHICLE COMMUNICATION APPLICATIONS REQUIRING VEHICLE IDENTIFICATION WITHOUT RE-ENTERING VEHICLE IDENTIFICATION

(71) Applicant: Snap-on Incorporated, Kenosha, WI (US)

(72) Inventors: Patrick S. Merg, Hollister, CA (US); Jacob G. Foreman, Hollister, CA (US); Joshua C. Covington, San Juan Bautista, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/686,208

(22) Filed: Mar. 3, 2022

(65) Prior Publication Data

US 2022/0188313 A1    Jun. 16, 2022

Related U.S. Application Data

(63) Continuation of application No. 16/852,030, filed on Apr. 17, 2020, now Pat. No. 11,314,755, which is a (Continued)

(51) Int. Cl.
*G06F 16/2458* (2019.01)
*G07C 5/00* (2006.01)
*G07C 5/08* (2006.01)

(52) U.S. Cl.
CPC ......... *G06F 16/2471* (2019.01); *G07C 5/006* (2013.01); *G07C 5/008* (2013.01); *G07C 5/0808* (2013.01); *G07C 5/0825* (2013.01)

(58) Field of Classification Search
CPC ... G06F 16/2471; G07C 5/008; G07C 5/0825; G07C 5/006; G07C 5/0808
See application file for complete search history.

(56) References Cited

U.S. PATENT DOCUMENTS 6,141,608 A    10/2000    Rother
7,421,322 B1    9/2008    Silversmith et al.
(Continued)

FOREIGN PATENT DOCUMENTS

WO    2017/019693 A1    2/2017

OTHER PUBLICATIONS

International Searching Authority, International Search Report and Written Opinion of the International Searching Authority for PCT Pat. App. No. PCT/US2018/044446, dated Oct. 24, 2018, 14 pages.
(Continued)

*Primary Examiner* — Marthe Y Marc-Coleman
(74) *Attorney, Agent, or Firm* — McDonnell Boehnen Hulbert & Berghoff LLP

(57) ABSTRACT

Methods and apparatus are provided for repairing vehicles. A computing device having first and second software executables can determine vehicle identification information (VII) that identifies a vehicle. The computing device can store first and second vehicle identifiers that are based on the VII and are respectively associated with the first and second software executables, where the first vehicle identifier differs from the second vehicle identifier. The computing device can be used to repair the vehicle by at least: receiving a request to activate the first software executable, and activating the first software executable at least by providing the stored first vehicle identifier to the first software executable.

18 Claims, 26 Drawing Sheets

Related U.S. Application Data continuation of application No. 16/409,705, filed on May 10, 2019, now Pat. No. 10,671,623, which is a continuation of application No. 15/674,436, filed on Aug. 10, 2017, now Pat. No. 10,331,687.

(56) References Cited

U.S. PATENT DOCUMENTS

| | | |
|---|---|---|
| 9,117,319 B2 | 8/2015 | Chen et al. |
| 9,513,789 B2 | 12/2016 | Marshall et al. |
| 2004/0172177 A1 | 9/2004 | Nagai et al. |
| 2007/0008179 A1 | 1/2007 | Hedley et al. |
| 2007/0288127 A1 | 12/2007 | Haq et al. |
| 2008/0071882 A1 | 3/2008 | Hering et al. |
| 2008/0162063 A1 | 7/2008 | Suzuki |
| 2009/0259358 A1 | 10/2009 | Andreasen |
| 2009/0276115 A1 | 11/2009 | Chen |
| 2013/0317694 A1 | 11/2013 | Merg et al. |
| 2014/0075356 A1 | 3/2014 | Gray et al. |
| 2014/0195101 A1* | 7/2014 | Chen .................... G07C 5/0841 701/29.6 |
| 2015/0052022 A1 | 2/2015 | Christy et al. |
| 2016/0055684 A1 | 2/2016 | Chen |
| 2016/0071334 A1 | 3/2016 | Johnson et al. |
| 2016/0314627 A1 | 10/2016 | Fish et al. |
| 2016/0328890 A1 | 11/2016 | Keane et al. |
| 2016/0335816 A1 | 11/2016 | Thoppae et al. |
| 2017/0093866 A1 | 3/2017 | Ben-noon et al. |
| 2017/0116792 A1 | 4/2017 | Jelinek et al. |
| 2017/0140237 A1 | 5/2017 | Voeller et al. |
| 2018/0095638 A1 | 4/2018 | Merg et al. |
| 2018/0135989 A1 | 5/2018 | Scheier et al. |
| 2019/0050458 A1 | 2/2019 | Merg et al. |
| 2019/0266156 A1 | 8/2019 | Merg et al. |
| 2020/0242116 A1 | 7/2020 | Merg et al. |

OTHER PUBLICATIONS

European Patent Office; Communication pursuant to Article 94(3) EPC for Application No. 18 756 053.7-1218 dated Mar. 4, 2022.

* cited by examiner

| Vehicle Identifier (VID) File 310 ||
|---|---|
| Software executable (SE) 320 | VID 322 |
| SE1 | 2012 Maker1 Pickup Model1 4.6L Gas |
| SE2 | 2012 Maker1 Pickup Model1 4.6L |
| SE3 | 2012 Maker1 Pickup Model 1 (2WD) 4.6L V8 SOHC SEFI |
| ... | |

| Enhanced Repair Data 330 ||
|---|---|
| VID Data 340 ||
| SE 350 | VID 352 |
| SE1 | 2012 Maker1 Pickup Model1 4.6L Gas |
| SE2 | 2012 Maker1 Pickup Model1 4.6L |
| SE3 | 2012 Maker1 Pickup Model 1 (2WD) 4.6L V8 SOHC SEFI |
| ... | |
| Diagnostic Data 360 ||
| Vehicle Data 370 | |
| Current Fault Code(s) | FC1 |
| Other Fault Code(s) | FC2, FC3 ... |
| Parameter ID 1 (PID1) | data for PID1 |
| PID2 | data for PID2... |
| Intelligent Repair Data 380 ||
| PID List Identifier | A, B, C, ... |
| Identified Tests | Component Test 1, Functional Test A2 ... |

FIG. 3

1710 Determine, at a computing device, vehicle identification information (VII) that identifies a vehicle under repair, where the first computing device includes a first software executable and a second software executable

1720 Store, at the computing device, a first vehicle identifier associated with the first software executable and a second vehicle identifier associated with the second software executable based on the VII, where the first vehicle identifier differs from the second vehicle identifier

1730 Repair the vehicle under repair using the computing device by at least:
- receiving a request to activate the first software executable, and
- activating the first software executable at least by providing the stored first vehicle identifier to the first software executable

FIG. 17

SYSTEM AND METHOD FOR ACCESSING VEHICLE COMMUNICATION APPLICATIONS REQUIRING VEHICLE IDENTIFICATION WITHOUT RE-ENTERING VEHICLE IDENTIFICATION

CROSS-REFERENCE TO RELATED APPLICATIONS

This application is a continuation application of U.S. patent application Ser. No. 16/852,030, entitled "System and Method for Accessing Vehicle Communication Applications Requiring Vehicle Identification without Re-Entering Vehicle Identification," filed Apr. 17, 2020. U.S. patent application Ser. No. 16/852,030 is a continuation application of U.S. patent application Ser. No. 16/409,705, entitled "System and Method for Accessing Vehicle Communication Applications Requiring Vehicle Identification without Re-Entering Vehicle Identification," filed May 10, 2019. U.S. patent application Ser. No. 16/409,705 is a continuation application of U.S. patent application Ser. No. 15/674,436, entitled "System and Method for Accessing Vehicle Communication Applications Requiring Vehicle Identification without Re-Entering Vehicle Identification," filed Aug. 10, 2017. U.S. patent application Ser. No. 15/674,436 issued on Jun. 25, 2019 as U.S. Pat. No. 10,331,687. U.S. patent application Ser. No. 16/409,705 issued on Jun. 2, 2020 as U.S. Pat. No. 10,671,623. U.S. patent application Ser. No. 16/852,030, U.S. patent application Ser. No. 16/409,705 and U.S. patent application Ser. No. 15/674,436 are incorporated herein by reference.

BACKGROUND

Unless otherwise indicated herein, the materials described in this section are not prior art to the claims in this application and are not admitted to be prior art by inclusion in this section.

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston-ring compressors, and vehicle brake tools. The tools used by vehicle technicians may also include electronic tools such as a vehicle scan tool or a digital voltage-ohm meter (DVOM), for use in diagnosing and/or repairing a vehicle.

The vehicle scan tool and/or DVOM can be linked via wired and/or wireless link(s) to other devices, perhaps to communicate data about the vehicle. The vehicle scan tool and/or DVOM can provide a significant amount of data to aid diagnosis and repair of the vehicle. This data is provided using a number of different functions of the vehicle scan tool and/or DVOM including functions for scanning for diagnostic data and functions performing tests on the vehicle.

SUMMARY

In one aspect, a method is provided. A computing device determines vehicle identification information (VII) that identifies a vehicle. The computing device includes a first software executable and a second software executable. The computing device stores a first vehicle identifier associated with the first software executable and a second vehicle identifier associated with the second software executable based on the VII. The first vehicle identifier differs from the second vehicle identifier. The computing device is used to repair the vehicle by at least: receiving a request to activate the first software executable and activating the first software executable at least by providing the stored first vehicle identifier to the first software executable.

In another aspect, a computing device is provided. The computing device includes a processor and a computer readable medium. The computer readable medium stores at least a first software executable, a second software executable, and executable instructions. The executable instructions, when executed by the processor, cause the computing device to perform functions. The functions include: determining VII that identifies a vehicle; storing, at the computer readable medium, a first vehicle identifier associated with the first software executable and a second vehicle identifier associated with the second software executable based on the VII, where the first vehicle identifier differs from the second vehicle identifier; and repairing the vehicle using the computing device by at least: receiving a request to activate the first software executable, and activating the first software executable at least by providing the stored first vehicle identifier to the first software executable.

In another aspect, a non-transitory computer readable medium is provided. The computer readable medium is configured to store at least executable instructions. The executable instructions, when executed by a processor of a computing device, cause the computing device to perform functions. The functions include: determining VII that identifies a vehicle; storing, at the computing device, a first vehicle identifier associated with the first software executable and a second vehicle identifier associated with the second software executable based on the VII, where the first vehicle identifier differs from the second vehicle identifier; and repairing the vehicle by at least: receiving a request to activate the first software executable, and activating the first software executable at least by providing the stored first vehicle identifier to the first software executable.

BRIEF DESCRIPTION OF THE DRAWINGS

FIG. 3 depicts a vehicle identifier file and repair data, in accordance with an embodiment.

FIG. 17 is a flow chart of an example method, in accordance with an embodiment.

DETAILED DESCRIPTION

Accessing Vehicle Communication Applications without Re-Entering Vehicle Identification A vehicle scan tool is frequently used in diagnosing and repairing faults in vehicles under repair. The vehicle scan tool can include a computing device configured to perform multiple repair-related functions using multiple software executables. Some of the software executables can perform vehicle-specific functions, and so can require a vehicle identifier as an initial input. A typical technique to provide the vehicle identifiers to the software executables of the vehicle scan tool is to have a technician operating the vehicle scan tool provide a vehicle identifier for a software executable each time the software executable is run.

As used herein, the term software executable includes one or more computer-readable instructions encoded in a format that can be executed by one or more computer processors of a computing device, such as a computing device acting as a vehicle scan tool. The software executable and/or other data can be resident on the device; that is, the software executable and/or other data can be stored in memory of the device that is accessible to the one or more computer processors of the computing device. The software executable may rely on other software, such as an interpreter, to be executed and thereby perform one or more tasks; i.e., a software executable can include instructions that are executed by a computer processor by way of executing an interpreter operating on instructions in the software executable as input. In some examples, a software executable can rely upon special hardware, such as testing components or communications interface hardware, to perform some or all of its tasks. As used herein, a software module can include part or all of one or more software executables.

Figure 1:
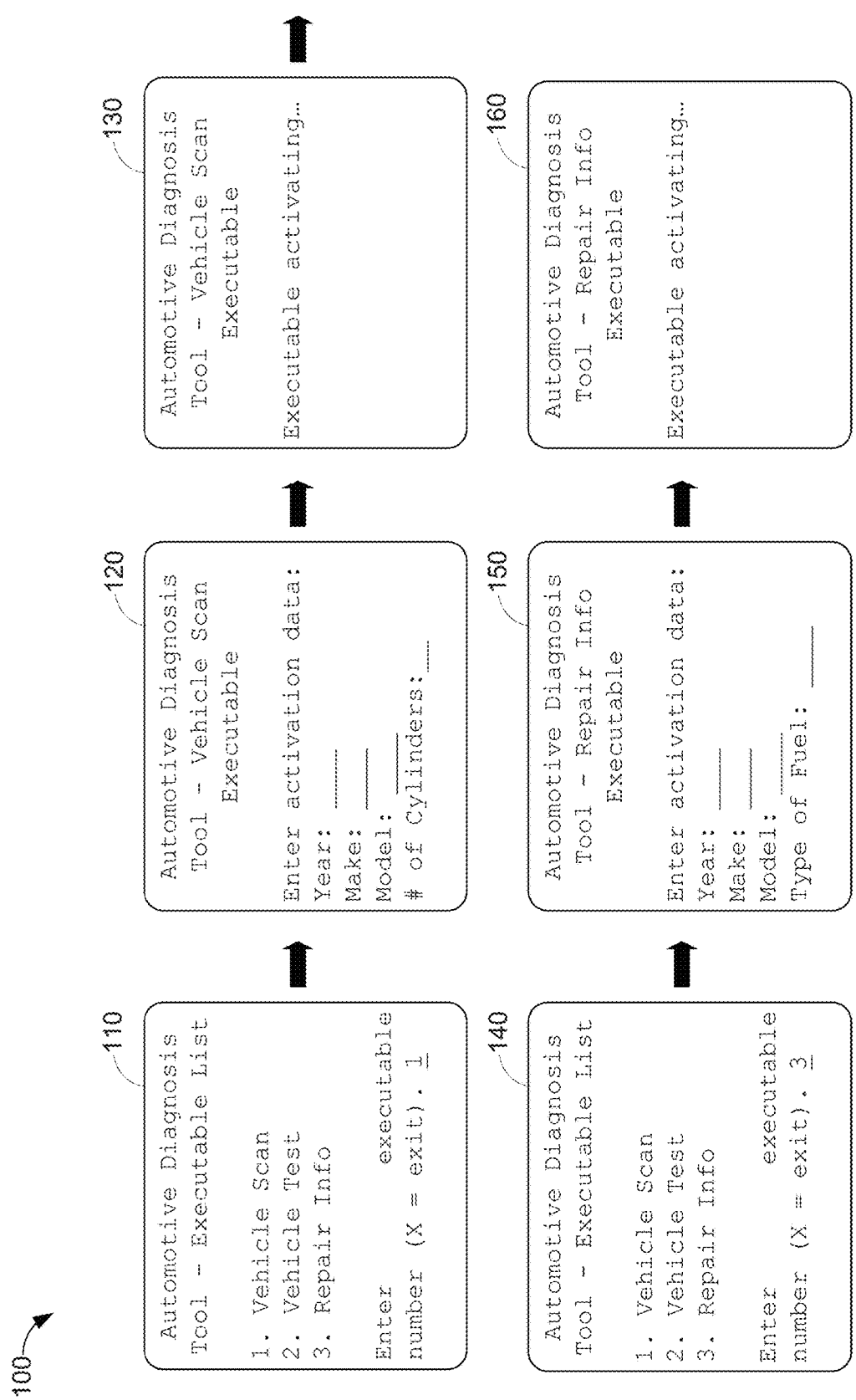
FIG. 1 shows a scenario using a prior art automotive diagnosis tool.

FIG. 1 shows scenario 100 using a prior art automotive diagnosis tool. Scenario 100 starts with a technician powering up the prior art automotive diagnosis tool, and the prior art automotive diagnosis tool subsequently presenting screen 110 for the technician to provide an input to select one of three software executables while repairing a vehicle V0. Screen 110 indicates that the technician can select "1" to use a "Vehicle Scan" executable, "2" to use a "Vehicle Test" executable, "3" to use a "Repair Info" executable, or "X" to exit and power down the prior art automotive diagnosis tool.

Scenario 100 continues with the technician entering a "1" to use the Vehicle Scan executable, and the prior art automotive diagnosis tool subsequently providing screen 120 to the technician to enter data for a vehicle identifier of vehicle V0 for the Vehicle Scan executable, where this vehicle identifier is based on data input by the technician that includes a "Year", "Make", "Model", and "# of Cylinders". After entering this data, the prior art automotive diagnosis tool activates the Vehicle Scan executable as shown by screen 130 of FIG. 1.

Scenario 100 proceeds with the technician completing use of the Vehicle Scan executable during the repair of vehicle V0 and the prior art automotive diagnosis tool presenting screen 140, which is the same as screen 110, for the technician to either select an executable or to power down the prior art automotive diagnosis tool. Scenario 100 proceeds with the technician entering a "3" to use the Repair Info executable. In response to the "3" being entered at screen 140, the prior art automotive diagnosis tool presents screen 150 for the technician to enter data for a vehicle identifier of vehicle V0 for the Repair Info executable, where this vehicle identifier is based on data input by the technician that includes a "Year", "Make", "Model", and "Type of Fuel". After entering this data, the prior art automotive diagnosis tool activates the Repair Info executable as shown by screen 160 of FIG. 1. After screen 160 is presented, scenario 100 is completed.

Scenario 100 illustrates that vehicle identifiers can vary between software executables, but many (if not all) vehicle identifiers are based on similar data. For example, scenario 100 illustrates that the vehicle identifier of the prior art Vehicle Scan Module is based on the year, make (manufacturer's name), model, and number of cylinders for vehicle V0, and the vehicle identifier of the prior art Repair Info executable is based on the year, make, model, and type of fuel for vehicle V0. However, each time a technician activated a software executable of the prior art automotive diagnosis tool in scenario 100, the technician had to enter vehicle-identifier-related data. Further, it is typical that when the same software executable is activated multiple times during a repair session of a vehicle, the same vehicle-identifier-related data has to be input by the technician each time the software executable executed. Thus, the technician may have to provide the same or similar vehicle-identifier-related data to the prior art automotive diagnosis tool multiple times during a repair session.

Herein are described techniques to provide common vehicle identification for software executables of a vehicle scan tool, at least to save time, reduce data entry, and ease usage of the vehicle scan tool. The common vehicle identification techniques can obtain vehicle-identifier-related data once and then provide specific vehicle identifiers to the software executables of the vehicle scan tool as needed during a repair session for repairing a vehicle.

Common vehicle identification can involve obtaining vehicle identification information (VII), obtaining specific vehicle identifiers for software executables of a vehicle scan tool, where each of the specific vehicle identifiers that are based on the VII, and store the specific vehicle identifiers. Then, after a technician requests activation of a particular software executable of a vehicle scan tool (e.g., during a repair session), the vehicle scan tool can retrieve the specific vehicle identifier for the particular software executable and provide the retrieved specific vehicle identifier as part of activating the particular software executable without any additional information from the technician.

In some examples, the VII can include a vehicle identification number (VIN) of a vehicle under repair. Then, the VIN can be parsed to obtain much of the data in the specific vehicle identifiers; e.g., make, model, and year of manufacture. For additional data that may not directly provided by parsing the VIN, such as a type of fuel, data from the VIN can be used to obtain the additional data; e.g., by using data from the VIN to query one or more databases, and obtaining the additional data from query responses from the database. In these cases, the VII can include data obtained from the VIN and the additional data.

Then, the VII can be used to generate the vehicle identifiers for the software executables of the vehicle scan tool. In some cases, part or all of the VII can be formatted to generate a particular vehicle identifier; e.g., one vehicle identifier can use a 2-digit number as a year of manufacture, while another vehicle identifier can use a 4-digit number as the year of manufacture; a vehicle identifier can be translated to a specific language or dialect (English, German, Spanish, etc.). For example, a vehicle identifier that includes a type of fuel can use the word "gas" for US English, "petrol" for UK English, "benzene" for German, and "essence" for French.

After the vehicle identifiers for the software executables of the vehicle scan tool have been identified, the vehicle scan tool can be used during a repair session to repair the vehicle under repair. For example, the vehicle scan tool can be used to request one or more Diagnostic Trouble Codes (DTCs, which are also called fault codes) from the vehicle. The vehicle can provide the requested DTC(s), which can indicate faults perhaps observed by one or more sensors and/or other components (e.g., control units) of the vehicle, to the vehicle scan tool. The vehicle scan tool can display one or more selectors for each of the DTC(s). A technician repairing the vehicle can review the DTCs and can select a first selector associated with a first DTC to be addressed in repairing the vehicle. Upon selection of the first selector associated with the first DTC, the vehicle scan tool can send a request for enhanced repair data, such as testing and parameter-related data, associated with the DTC to a server computing device (or server, for short). The server can access a global repair data database storing repair data obtained for a plurality of vehicles to obtain the enhanced repair data based on the DTC, the VII and/or vehicle identifiers, and perhaps additional data. After obtaining the enhanced repair data from the global repair data database (and perhaps other sources), the server sends the enhanced repair data to the vehicle scan tool. If the vehicle scan tool cannot communicate with the server, the vehicle scan tool uses locally-stored or "default" data in lieu of the enhanced repair data.

After receiving the selection of the first selector and any available enhanced repair data, the vehicle scan tool can generate and present a repair page that includes one or more displays and controls for providing information and/or carrying out tests in order to repair the vehicle; e.g., the repair page can be presented using one or more output display devices. The repair page can indicate whether or not the vehicle scan tool is connected to a server and the displays and controls of the repair page can be based on the enhanced repair data (if available) or default data (if enhanced repair data is unavailable). The controls of the repair page allow the technician using the vehicle scan tool to request activation of resident software executables.

Examples of the software executables resident on the vehicle scan tool include, but are not limited to, an executable for scanning a vehicle for information, an executable for performing component tests on a vehicle, an executable for performing functional tests on a vehicle, and an executable for performing vehicle information retrieval. The executable for scanning a vehicle for information can cause resident software to communicate with an Engine Control Unit (ECU) and/or other components of the vehicle to obtain DTCs, parameter values associated with parameter identifiers (PIDs), and perhaps other information from the vehicle (e.g., a VIN) according to a vehicle communication protocol, such as the On-board Diagnostics II (OBD-II) protocol.

The executables for performing component tests and performing functional tests can respectively perform tests on a per-component and on a per-vehicle-function basis. These executables can use digital electronic measuring components, such as digital oscilloscopes, ammeters, voltmeters, ohmmeters, etc., resident on the vehicle scan tool to perform the respective component and functional tests. These component and functional tests can be tailored on a per-test basis to provide information to the technician about how to execute the test and/or how to interpret test results. The executable for performing vehicle information retrieval can provide repair tips, Original Equipment Manufacturer (OEM) repair information, technical service bulletins (TSBs); and/or other information related to the vehicle. The executable for performing vehicle information retrieval can present one or more titles (or other information) about respective vehicle information (such as a TSB title)—then, subsequent selection of a particular title causes the vehicle scan tool to send a request for the respective vehicle information associated with the title to the server. In response, the server sends the respective vehicle information associated with the title to the vehicle scan tool, and the vehicle scan tool can display the respective vehicle information associated with the title. In other examples, more, fewer, and/or different software executables can be resident on the vehicle scan tool and/or accessible via the controls of the repair page.

Selection of a control that requests activation of a software executable can cause the vehicle scan tool to retrieve a stored vehicle identifier for the activated software executable, and to provide the stored vehicle identifier to the activated software executable upon activation—that is, the technician need not provide data related to the vehicle identifier to activate the software executable; rather the vehicle scan tool can retrieve the stored vehicle identifier rather than requesting additional data entry by the technician as indicated in scenario 100. This saves technician time and effort, and also reduces human error while repairing vehicles.

By obtaining VII once and using the VII to obtain one or more vehicle identifiers, the amount of vehicle-identifier specific data provided by the technician to activate software executables of the vehicle scan tool can be reduced or even eliminated. For example, in some examples, the vehicle scan tool can be connected to a vehicle under repair, obtain the VIN from the vehicle under repair, use the VIN to obtain VII, generate vehicle identifiers from the VII, and save the vehicle identifiers for later use—all without requesting vehicle-identifier specific input from the technician or from the vehicle more than once. Reducing the amount of data required from the technician saves time. Also, the data provided is not subject to human error, further saving time in correcting data entry errors. Additionally, not having to type in as much data, particularly redundant data, into a vehicle scan tool during a repair session makes the vehicle scan tool easier to use.

Example Common Vehicle Identification Systems and Techniques

Figure 2:
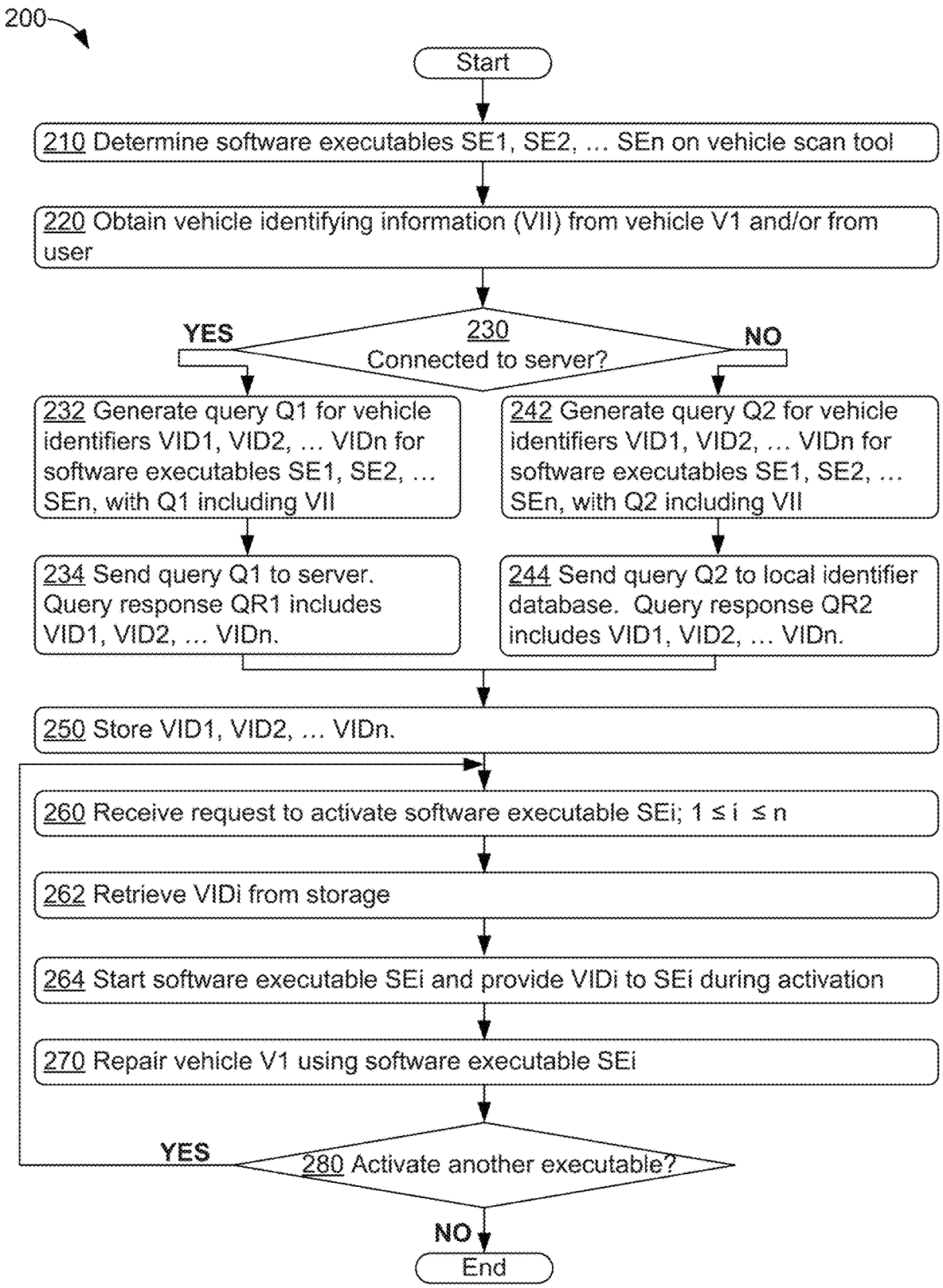
FIG. 2 is a flowchart of a method, in accordance with an embodiment.

FIG. 2 is a flowchart of method 200, in accordance with an embodiment. Part or all of method 200 can be performed by a computing device acting as and/or embodied as a vehicle scan tool to repair a vehicle V1, such as computing device 1600 discussed below at least in the context of FIG. 16.

Method 200 begins at block 210, where the vehicle scan tool can determine one or more software executables SE1, SE2 . . . SEn, n>0, resident on the vehicle scan tool. For example, some or all of software executables SE1, SE2 . . . SEn can be used in repairing vehicle V1. In some examples, such as examples where method 200 is executed while vehicle identifiers are obtained as needed, the procedures of block 210 can be omitted and/or deferred during execution of method 200.

At block 220, the vehicle scan tool can obtain VII from vehicle V1 and/or a user of the vehicle scan tool; e.g., a technician repairing vehicle V1. As one example, the vehicle scan tool can be connected to an OBD-II data port and/or another data port of vehicle V1 and then query vehicle V1 for data related to the VII via the OBD-II and/or other data port(s); e.g., the VIN of vehicle V1. As another example, the vehicle scan tool can prompt the user to provide the VII. In other examples, the vehicle scan tool can obtain some or all of the VII from vehicle V1 and then ask the user to verify the correctness of the obtained VII. Other examples of obtaining VII from vehicle V1 and/or a user of the vehicle scan tool are possible as well.

At block 230, the vehicle scan tool can determine whether the vehicle scan tool is connected to a server. If the vehicle scan tool is connected to the server, the vehicle scan tool can proceed to block 232. Otherwise, the vehicle scan tool is not connected to the server and the vehicle scan tool can proceed to block 242.

At block 232, the vehicle scan tool can generate a query Q1 for n vehicle identifiers VID1, VID2 . . . VIDn for the respective software executables SE1, SE2 . . . SEn. The query Q1 can include some or all of the VII and/or data derived from the VII obtained at block 210.

At block 234, the vehicle scan tool can send query Q1 to the server to request the vehicle identifiers VID1, VID2 . . . VIDn. In response, the server can send a query response QR1 to the vehicle scan tool that includes the requested vehicle identifiers VID1, VID2 . . . VIDn. Upon completion of block 234, the vehicle scan tool can proceed to block 250.

At block 242, the vehicle scan tool can generate a query Q2 for n vehicle identifiers VID1, VID2 . . . VIDn for the respective software executables SE1, SE2 . . . SEn. The query Q2 can include some or all of the VII and/or data derived from the VII obtained at block 210.

At block 244, the vehicle scan tool can send query Q2 to a local identifier database to request the vehicle identifiers VID1, VID2 . . . VIDn, where the local identifier database is stored on the vehicle scan tool. In response, the local identifier database can send a query response QR2 to the vehicle scan tool that includes the requested vehicle identifiers VID1, VID2 . . . VIDn.

In some examples, query Q1 is the same as query Q2. In other examples, a query is formatted differently or otherwise differs depending on whether a destination of the query is the server or is the local database—in these examples, Q1 differs from Q2.

At block 250, the vehicle scan tool can store the vehicle identifiers VID1, VID2 . . . VIDn obtained via query response QR1 or query response QR2. The vehicle identifiers VID1, VID2 VIDn can be stored in non-volatile memory, such as in a vehicle identifier file stored in secondary or persistent long term storage, and/or in volatile memory, such as in repair data stored in one or more of: registers, processor caches, and/or random access memories. Vehicle identifier files and repair data are discussed below in the context of at least FIG. 3.

As shown at block 260 of FIG. 2, the vehicle scan tool can receive a request to activate a software executable SEi, where 1≤i≤n.

At block 262, the vehicle scan tool can retrieve a vehicle identifier VIDi that is associated with software executable SEi from storage, where the vehicle identifier VIDi was stored at block 250.

At block 264, the vehicle scan tool can activate software executable SEi by starting to execute software executable SEi and by providing vehicle identifier VIDi during activation. For example, the vehicle scan tool can pass in vehicle identifier VIDi as a parameter to software executable SEi as part of starting to execute software executable SEi. As another example, software executable SEi can request that the vehicle scan tool provide software executable SEi and the vehicle scan tool can responsively provide vehicle identifier VIDi. Other techniques for providing vehicle identifier VIDi during activation of software executable SEi are possible as well.

At block 270, the vehicle scan tool can be used to repair vehicle V1. FIGS. 4-14C below show example scenarios where a computing device used as a vehicle scan tool to repair vehicles.

As shown at block 280 of FIG. 2, the vehicle scan tool can determine whether to activate another software executable while repairing vehicle V1. If the vehicle scan tool determines that another software executable is to be activated (e.g., a repair session to repair vehicle V1 continues with the user requesting activation of a software executable), the vehicle scan tool can proceed to block 260. If the vehicle scan tool determines that another software executable is not to be activated (e.g., the repair session for vehicle V1 has ended and the user has requested power down of the vehicle scan tool), method 200 can be completed.

FIG. 3 depicts vehicle identifier (VID) file 310 and enhanced repair data 330, in accordance with an embodiment. Vehicle identifier file 310 can have n entries for n software executables, n>0, where each entry can include at least two fields of data: a field of data for software executable (SE) 320 and a field of data for a VID 322. In the example shown in FIG. 3, vehicle identifier file 310 includes data for three software executables as shown by field 320: software executables "SE1", "SE2", and "SE3". Field 322 includes the corresponding, respective vehicle identifiers for the software executables "2012 Maker1 Pickup Model1 4.6 L Gas", "2012 Maker1 Pickup Model1 4.6 L", and "2012 Maker1 Model 1 (2WD) 4.6 L V8 SOHC SEFI". For example, the vehicle identifier for software executable SE3 includes data about a vehicle including: a year of manufacture "2012", a make "Maker1", a model "Pickup Model1", a number of powered wheels "2WD" indicating two-wheel drive, and an engine of the vehicle "4.6 L V8 SOHC SEFI" which indicates that the vehicle's engine is a 4.6 liter V8 engine having a single over-head cam (SOHC) and sequential electronic fuel injection (SEFI). As other examples, the vehicle identifier for software executable SE1 includes the year, make, and model data used for the vehicle identifier of software executable SE3, some of the engine-related data "4.6 L", and information about a fuel utilized by the vehicle "Gas" and the vehicle identifier for software executable SE2 is a subset of the data for either software executable SE1 or software executable SE3.

More generally, a vehicle identifier can include some or all of at least the following information about a vehicle: a make/manufacturer name of the vehicle, year of manufacture of the vehicle, model information for of the vehicle, information about components of the vehicle, information related to a VIN, serial number, and/or other identifying number(s) associated with the vehicle, information about location of manufacture or use of the vehicle, and other information related to the vehicle (e.g., a type of fuel used by the vehicle, a number of powered wheels). Many other examples of vehicle identifiers are possible as well.

Enhanced repair data 330 can include data about vehicle identifiers and other data related to repairing a vehicle. FIG. 3 shows that enhanced repair data 330 can include at least two portions: a first portion with vehicle identifier data 340 and a second portion with diagnostic data 360. Vehicle identifier data 340 can have entries including at least two fields: a software executable field 350 and a vehicle identifier field 352. In some examples, each entry in vehicle identifier data 340 can be the same as the entries of vehicle identifier file 310 discussed above. In particular, software executable field 350 in vehicle identifier data 340 can be the same as software executable field 320 of vehicle identifier file 310 and vehicle identifier 352 in vehicle identifier data 340 can be the same as vehicle identifier 322 of vehicle identifier file 310.

Diagnostic data 360 can include vehicle data 370 and intelligent repair data 380. Vehicle data 370 can include data obtained from a vehicle; e.g., a vehicle under repair. In particular, vehicle data 370 can include DTCs, PIDs, and related fault code data and/or parameter data. As shown in FIG. 3, the fault code data can include data about a "Current Fault Code" and "Other Fault Codes". The current fault code can be a fault code that was most recently generated by a vehicle under service and the other fault codes can be fault codes that are older than and perhaps related to the current fault code.

The PIDs and related parameter data can include data on a per-PID basis. The data on a per-PID basis can include a parameter identifier and data for the parameter identified by the parameter identifier. In some examples, some or all of vehicle data can be or include data obtained via an OBD-II data port of a vehicle under service, where the data can include OBD-II DTCs, OBD-II PIDs, and data for the parameters identified by the PIDs.

Data in diagnostic data 360 can be used to update PID lists and/or suggest tests for execution. A PID list can specify a group or list of PIDs to be observed (scanned) by the vehicle scan tool. For example, PIDs and related parameter data of diagnostic data 360 can identify parameters that can be selected for a new PID list. If a number of PIDs and/or PIDs provided in diagnostic data 360 differs from a number of PIDs in one or more particular PID lists (e.g., a PID list that has some of the PIDs provided in diagnostic data 360), then a server (or multiple servers) in communication with the vehicle scan tool can examine the number of PIDs and/or PIDs in diagnostic data 360 for possible inclusion, exclusion, and/or updating of the one or more particular PID lists.

Also, related parameter data provided in diagnostic data 360 can be used by the server for PID list generation. For example, the server can receive related parameter data for one or more PIDs that is/are outside of a range of expected values during number of repair sessions involving vehicles having partially or completely the same Year/Make/Model/Engine (YMME) values. Then, the server can reorganize one or more PID lists for vehicles having partially or completely the same YMME values to highlight the PID(s) that have been observed to be more likely to outside of the range of expected values; e.g., put likely out-of-range PIDs at the top, bottom, or other well-defined region of the PID list (such as in a portion of the PID list headed with a "Likely Out of Range PIDs" header). After updating the PID list, the server can provide the updated PID list(s) to the vehicle scan tool either via enhanced repair data 330 and/or as one or more updates to one or more default PID lists stored on the vehicle scan tool. Other updates to PID lists and/or suggested tests based on data in diagnostic data 360 are possible as well.

Intelligent repair data 380 can include one or more PID list identifiers and/or one or more identified tests, as indicated in FIG. 3. A PID list identifier can be used to specify or identify a PID list. Then, a PID list identifier can be provided to the vehicle scan tool as part of an instruction to obtain data about the parameters referred to in a PID list that is identified by the PID list identifier. For example, a PID list identifier can identify parameters used to diagnose and/or repair particular faults in the vehicle, such as faults identified by fault codes in vehicle data 370. Some or all of the identified PID lists can be previously stored on the vehicle scan tool; thus, the PID list identifier makes use of an already-stored (and available) PID list of the vehicle scan tool.

The one or more identified tests can include tests to obtain data, verify functionality, and/or get other information about the vehicle. The identified test(s) can include one or more component tests and/or one or more functional tests. A component test is a test related to one or more specific parts or components of the vehicle, and a functional test is a test related to one or more specific features or functions of the vehicle. The vehicle scan tool can then be configured to execute the one or more identified tests.

The server can enhance an existing default set of PID lists by providing a different ordering and/or different set of lists to the PID list based on information about previous repairs of other (e.g., similar) vehicles. In some examples, an identified PID list can be provided by the server. Thus, the PID list identifiers can be enhanced by the server. Similarly, the identified tests can be tests identified by the server based on information about previous repairs of other (e.g., similar) vehicles.

In operation, the vehicle scan tool can determine an initial instance of enhanced repair data 330 by obtaining data for VID data 340, such as values for software executables 350 and VII, such as VII obtained from a user of the vehicle scan tool and/or VII obtained from a vehicle under repair. Then, after determining the initial instance of enhanced repair data 330, the vehicle scan tool can send the initial instance of enhanced repair data 330 to the server. The server can then update the initial instance of enhanced repair data 330 by providing VID(s) 352 in an updated instance of enhanced repair data 330 that are related to the values for software executables and/or VII provided in the initial instance. The server can then send the updated instance of enhanced repair data 330 to the vehicle scan tool.

The vehicle scan tool can further update the received enhanced repair data 330 by providing fault code and/or other data as part of diagnostic data 360 as observed from the vehicle under repair, and send the further updated enhanced repair data 330 to the server. Diagnostic data 360 can be obtained using the software executables of the vehicle scan tools and the related vehicle identifiers in enhanced repair data 330. The server can examine the received diagnostic data 360 and update intelligent repair data 380 of the received enhanced repair data 330 with PID lists, PID list identifiers, and identified tests, and send the even further updated enhanced repair data 330 to the vehicle scan tool. The vehicle scan tool can obtain newly-observed data by scanning for the PIDs on some or all of PID lists, obtaining data from a user, and/or execute some or all of the identified tests of the received intelligent repair data 380, update diagnostic data 360 based on the newly-observed data, and send the updated enhanced repair data 330 to the server. The server and vehicle scan tool can iterate on observed data (provided by the vehicle scan tool) and PID lists/tests provided (provided by the server) throughout a repair session to repair the vehicle under repair. Thus, the vehicle scan tool and server can communicate increasingly updated versions of enhanced repair data 330 with each other to coordinate repair activities during the repair session.

In the example shown in FIG. 3, intelligent repair data 380 includes three PID list identifiers "A", "B", and "C" identifying respective PID lists A, B, and C stored on the vehicle scan tool. Intelligent repair data 380 also includes two identified tests: a component test "Component Test 1" and a functional tests "Functional Test A". Many other PID list identifiers identified tests, and/or intelligent repair data are possible as well.

Some or all of intelligent repair data 380 can be provided to the vehicle scan tool from one or more servers communicatively coupled to the vehicle scan tool. The vehicle scan tool and the server(s) can communicate some or all of intelligent repair data 380 to enable the server to provide inputs, such as intelligent repair data 380, to the vehicle scan tool.

As one example, the vehicle scan tool can obtain data for common vehicle identification, such as VIN or YMME data about a vehicle. Then, the scan tool can update VID data 340 to include the data for common vehicle identification and perhaps data about resident software executables. The vehicle scan tool can then provide the enhanced repair data 330 including updated VID data 340 to the server(s). The server(s) can determine the vehicle identifiers for the software executables of the vehicle scan tool, and send enhanced repair data 330 with VID data 340 that includes the vehicle identifiers for the software executables.

As another example, the vehicle scan tool can obtain diagnostic data by scanning for the PIDs listed on one or more PID lists identified by intelligent repair data 380 and/or by running some or all of the identified tests specified by intelligent repair data 380. The vehicle scan tool can use the diagnostic data to update enhanced repair data 330; e.g., update part or all of vehicle data 370, and send updated enhanced repair data 330 to the server. The server can then receive the scan-tool-updated enhanced repair data 330, determine additional identified tests and/or PID lists based on updated enhanced repair data 330, and update enhanced repair data 330 accordingly, e.g., update intelligent repair data 380 to include the additional identified tests and/or PID lists. The server-updated enhanced repair data 330 can then be sent to the scan tool, for another iteration of updating the repair data to be scan-tool-updated enhanced repair data 330, sending the scan-tool-updated enhanced repair data 330 to the server, and updating the scan-tool-updated repair data at the server to obtain new server-updated enhanced repair data 330.

In some examples, vehicle identifier file 310 can be stored in non-volatile memory of a vehicle scan tool. Then, when the vehicle scan tool has been requested to activate a software executable, the vehicle scan tool can open vehicle identifier file 310, find a name or identifier of the requested software executable in software executable field 320, and use the vehicle identifier 322 in the same entry as the found name/identifier. For example, if the vehicle scan tool has been requested to activate a software executable whose name is "SE2", the vehicle scan tool can open vehicle identifier file 310, find an entry with the name "SE2" in the software executable field 320 of the vehicle identifier file 310, and use the corresponding identifier "2012 Maker1 Pickup Model1 4.6 L" in activating the requested software executable. In other examples, a version of vehicle identifier file 310 can be stored in volatile memory; e.g., as a lookup table, and similar procedures can be used to find vehicle identifiers associated with software executables in volatile memory as used when vehicle identifier file 310 is stored in non-volatile memory.

In other examples, at least part of enhanced repair data 330 can be stored in volatile memory of the vehicle scan tool. In other examples, a version of enhanced repair data 330 can be stored in non-volatile memory of the vehicle scan tool; e.g., part or all of enhanced repair data 330 can be stored in a file for purposes of backing up and/or restoring a repair session that is terminated by an inadvertent power down of the vehicle scan tool. In still other examples, as discussed above, at least part of enhanced repair data 330 can be communicated between and updated by both the vehicle scan tool and a server to repair the vehicle.

Figure 4:
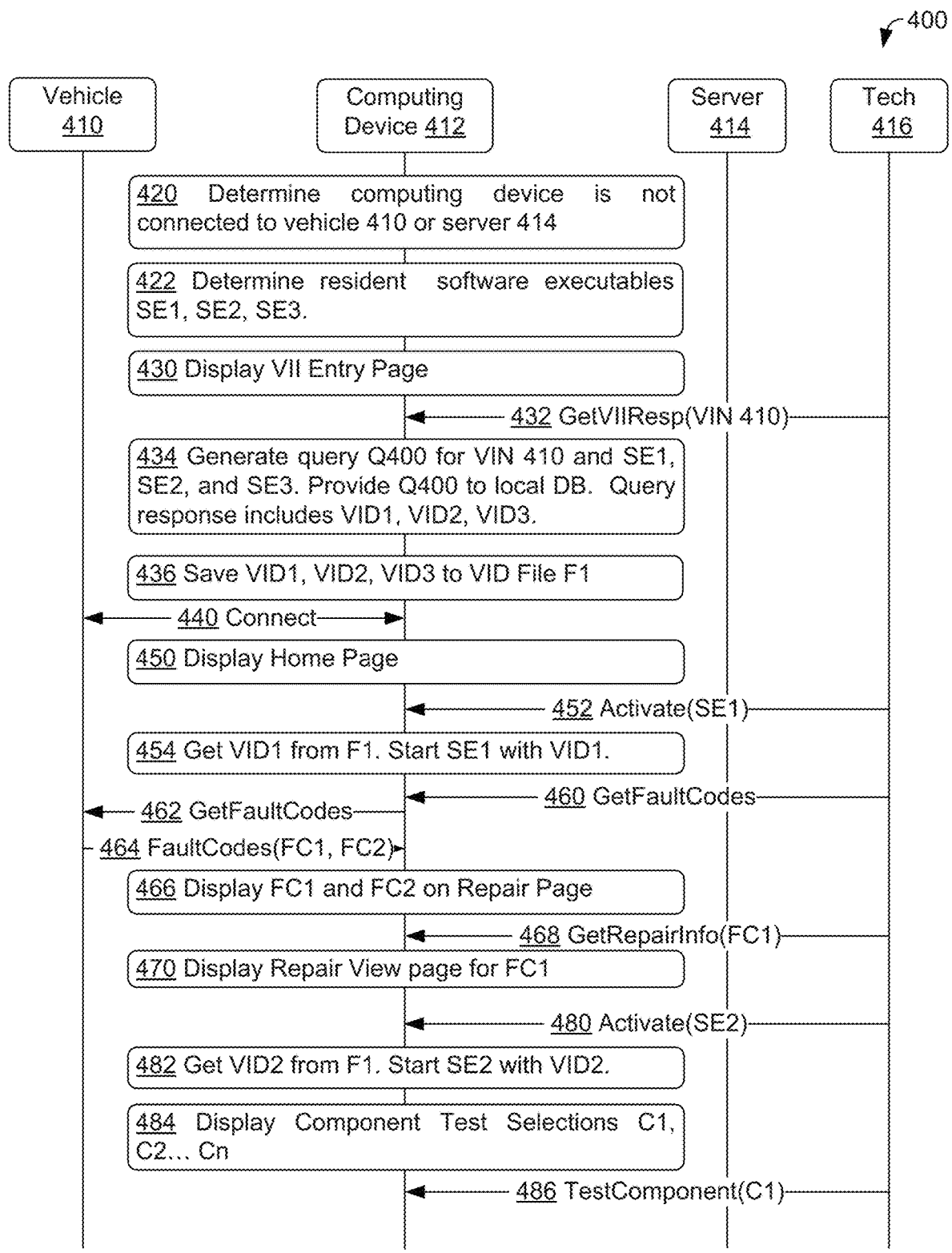
FIG. 4 shows a communication flow during repair of a vehicle, in accordance with an embodiment.

FIG. 4 shows a communication flow 400 during repair of vehicle 410, in accordance with an embodiment. During communication flow 400, technician 416 repairs vehicle 410 using computing device 412 acting as and/or embodied as a vehicle scan tool to carry out method 200.

Communication flow 400 can begin at block 420, where computing device 412 (acting as and/or embodied as a vehicle scan tool) can determine that computing device 412 is not connected to either vehicle 410 or server 414. In communications flows 400, 500, 600, and 700, computing device 412 is configured to but may or may not actually connect to vehicle 410 via a wired connection and is configured to but may or may not actually connect to server 414 via a wireless connection. In other communication flows, computing device 412 can be configured to connect to vehicle 410 via wireless and/or other wired connections, and/or computing device 412 can be configured to connect to server 414 via wired and/or other wireless connections.

At block 422, computing device 412 can carry out the procedures of block 210 of method 200 to determine that three software executables "SE1", "SE2", and "SE3" are resident on computing device 412. At block 430, computing device 412 can carry out the procedures of block 220 of method 200 to obtain VII. In particular, at block 430, computing device 412 can display a VII entry page to a user of computing device 412; e.g., technician 416, to obtain the VII from the user. Example pages for entering VII are shown as FIGS. 10A-10C.

After displaying the VII entry page, technician 416 provides VII data to computing device 412, as indicated in FIG. 4 as "VIN 410" of GetVIIResp message 432. That is, VIN 410 is data provided by technician 416 that corresponds to a VIN of vehicle 410. Upon reception of GetVIIResp message 432, computing device 412 obtains VIN 410 from message 432 and stores VIN 410 for later use.

At block 434, computing device 412 uses the procedures of block 230 of method 200 to determine that computing device 412 is not connected to a server. Then, computing device 412 uses the procedures of block 242 of method 200 to generate a query Q400 for software executables SE1, SE2, SE3 on computing device 412, where query Q400 is based on VIN 410, and where software executables SE1, SE2, SE3 were previously identified at block 422. Then, computing device 412 carries out the procedures of block 244 of method 200 to provide query Q400 to a local database (DB) resident on computing device 412 to obtain vehicle identifiers for software executables SE1, SE2, SE3. The local database provides a query response to query Q400 that includes vehicle identifiers VID1, VID2, VID3 for respective software executables SE1, SE2, SE3. By use of the procedures of block 434, computing device 412 obtains vehicle identifiers for all of its software executables at one time.

The local database can be useful when determining vehicle identifiers during times computing device 412 is not connected to a server, such as server 414. Other local repair-related data can be stored on computing device 412, where some or all of the local repair-related data can be used when computing device 412 is not connected to a server; e.g., repair-related data for default content displays, default test selection data, default parameter list data, etc. In some embodiments, the local database also stores some or all of the repair-related data.

At block 436, computing device 412 carries out the procedures of block 250 of method 200 to save vehicle identifiers VID1, VID2, VID3. In the example illustrated by communication flow 400, computing device 412 is not connected to a server, so computing device 412 saves vehicle identifiers VID1, VID2, VID3 to a vehicle identifier file F1 stored in non-volatile memory of computing device 412, such as discussed above in the context of FIG. 3.

Figure 11:
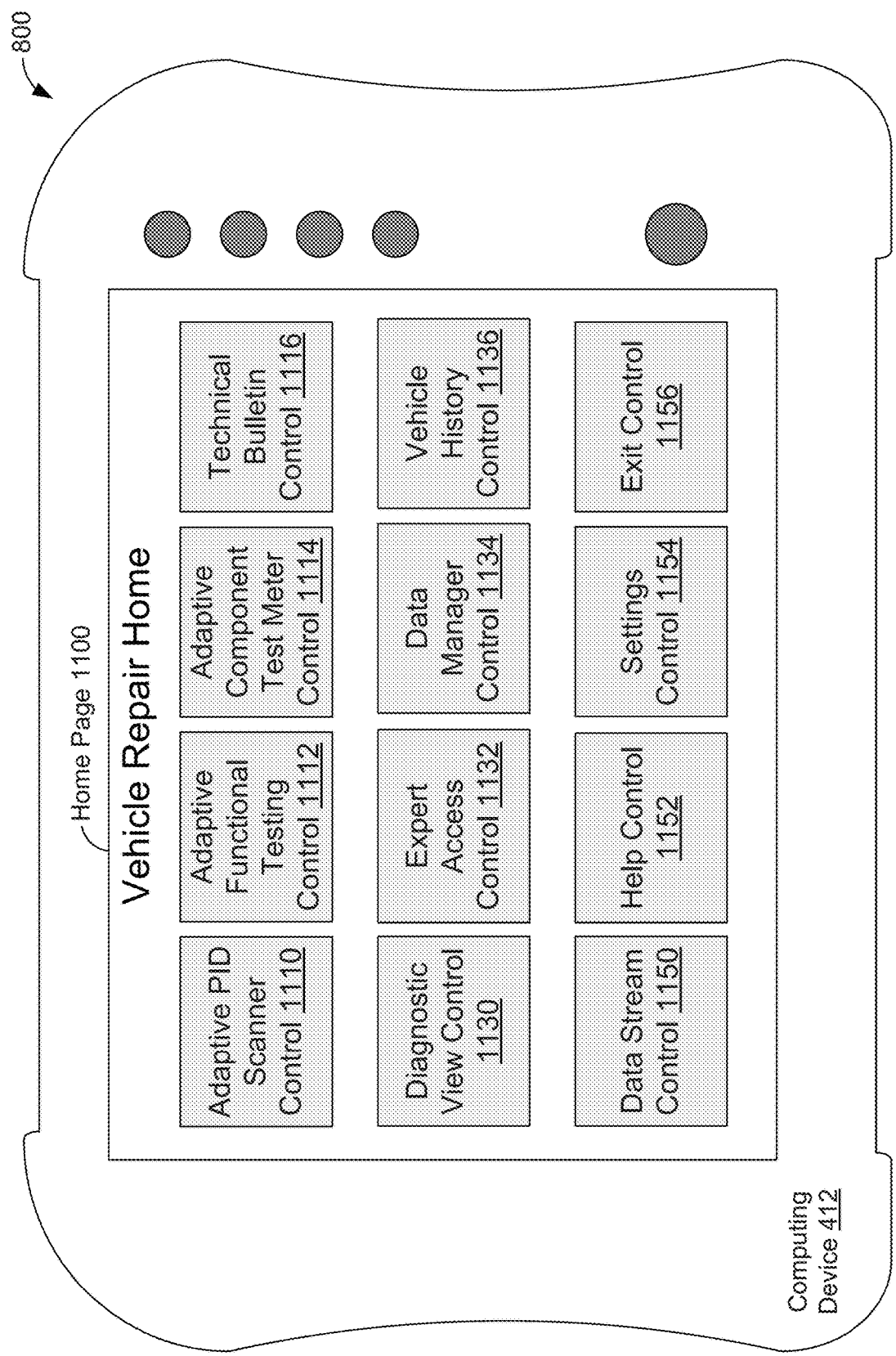

FIG. 4 shows that communication flow 400 continues with technician 416 connecting computing device 412 with vehicle 410, as illustrated by connect message 440. Then, at block 450, computing device 412 displays a home page for vehicle repairs. An example vehicle repair home page is shown in FIG. 11 and discussed below.

After displaying the home page, technician 416 begins repair of vehicle 410 by requesting activation of software executable SE1, illustrated in FIG. 4 by activate message 452. Computing device 412 uses the procedures of block 260 of method 200 to receive activate message 452 requesting activation of software executable SE1. In communication flow 400, software executable SE1 is a software executable for scanning a vehicle, such as vehicle 410, for information, where the information can include, but is not limited to, fault codes, PIDs, and values of parameters associated with PIDs.

At block 454, computing device 412 uses the procedures of block 262 of method 200 to retrieve a vehicle identifier VID1 associated with software executable SE1. Then, computing device 412 uses the procedures of block 264 of method 200 to provide VID1 to software executable SE1 while starting software executable SE1.

Communication flow 400 continues with technician 416 using an interface to software executable SE1 to send GetFaultCodes message 460 to computing device 412. Computing device 412 then requests fault codes from vehicle 410 via software executable SE1 using GetFaultCodes message 462 that corresponds to GetFaultCodes message 460. In response to GetFaultCodes message 462, software executable SE1 obtains fault codes FC1 and FC2 from vehicle 410, as indicated in FIG. 4 as part of FaultCodes message 464. In other scenarios, more, fewer, and/or different fault codes than FC1 and FC2 can be provided; e.g., in FaultCodes message 464.

Figure 12:
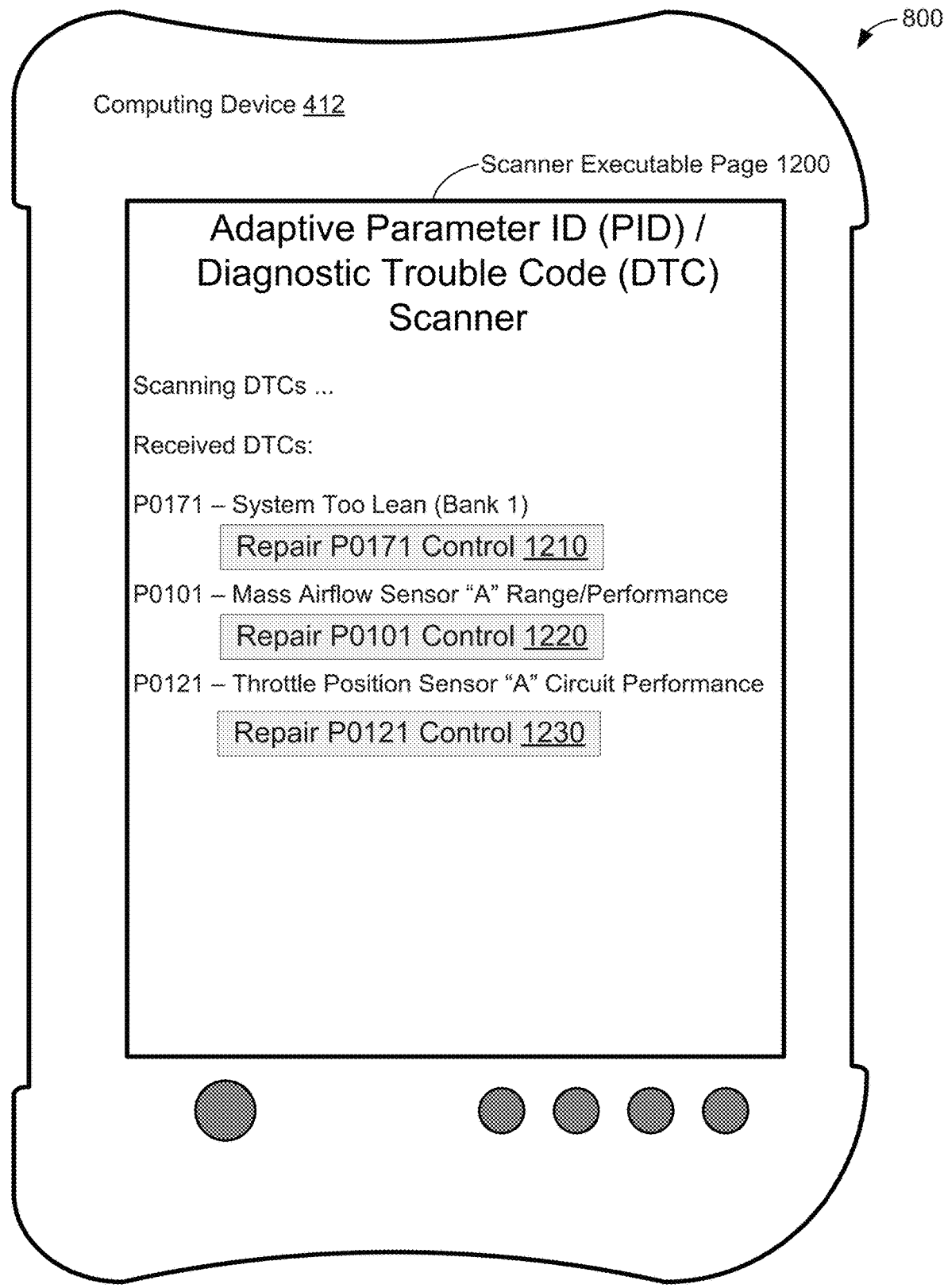

At block 466, computing device 412 displays FC1 and FC2 on a repair page. The repair page can be a display associated with software executable SE1. An example repair page displaying fault codes is shown is shown in FIG. 12 and discussed below. An example of carrying out the procedures of block 270 of method 200 can include the repairs to vehicle 410 associated with messages 452, 460, 462, 464, and blocks 454, 466.

Figure 13A:
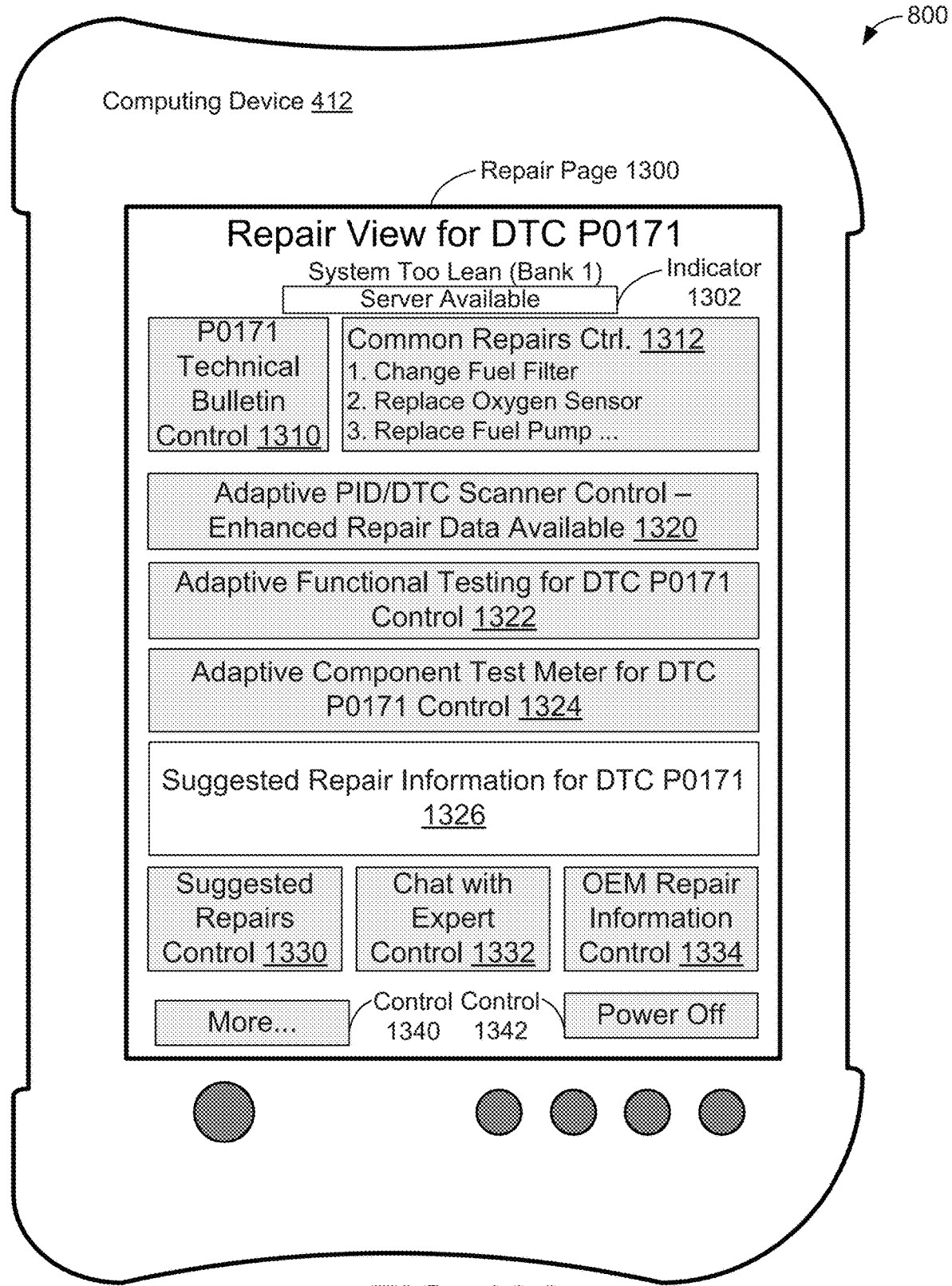

After display of the repair page with fault codes FC1 and FC2, technician 416 requests repair information about fault code FC1, as illustrated using GetRepairInfo message 468 with data of "FC1". In other communications flows, technician 416 can request information about multiple fault codes via GetRepairInfo message 468. At block 470, computing device 412 responds to GetRepairInfo message 468 by displaying a repair page for fault code FC1. An example repair page for a fault code is shown in FIG. 13A discussed below.

FIG. 4 illustrates that after the repair page for fault code FC1 is displayed, technician 416 requests activation of software executable SE2 as illustrated using activate message 480 with data of "SE2". Computing device 412 uses the procedures of block 280 and then block 260 of method 200 to receive activate message 480 requesting activation of software executable SE2. In communication flow 400, software executable SE2 is a software executable for performing component tests on a vehicle, such as vehicle 410.

At block 482, computing device 412 uses the procedures of block 262 of method 200 to retrieve a vehicle identifier VID2 associated with software executable SE2 from file F1. Then, computing device 412 uses the procedures of block 264 of method 200 to provide VID2 to software executable SE2 while starting software executable SE2.

At block 484, computing device 412 displays one or more component tests C1, C2 . . . Cn that can be selected for execution. In some examples, some or all of component tests C1, C2 . . . Cn available for possible execution can themselves be selected based on fault code FC1 selected as discussed above in the context of GetRepairInfo message 468.

After displaying the one or more possible component tests, technician 416 uses an interface to software executable SE2 to send TestComponent message 486 to computing device 412 to request execution of component test "C1" of vehicle 410.

Upon reception of TestComponent message 486, communication flow 400 can be completed. An example of carrying out the procedures of block 270 of method 200 can include the repairs to vehicle 410 associated with block 484 and message 486.

Subsequently, computing device 412 can use the procedures of block 280 of method 200 to complete communication flow 400. In other examples, the repairs to vehicle 410 at block 270 of method 200 include carrying out one or more component tests of component C1 of vehicle 410 and determining one or more results to the component tests of component C1 as directed by TestComponent message 486.

Figure 5:
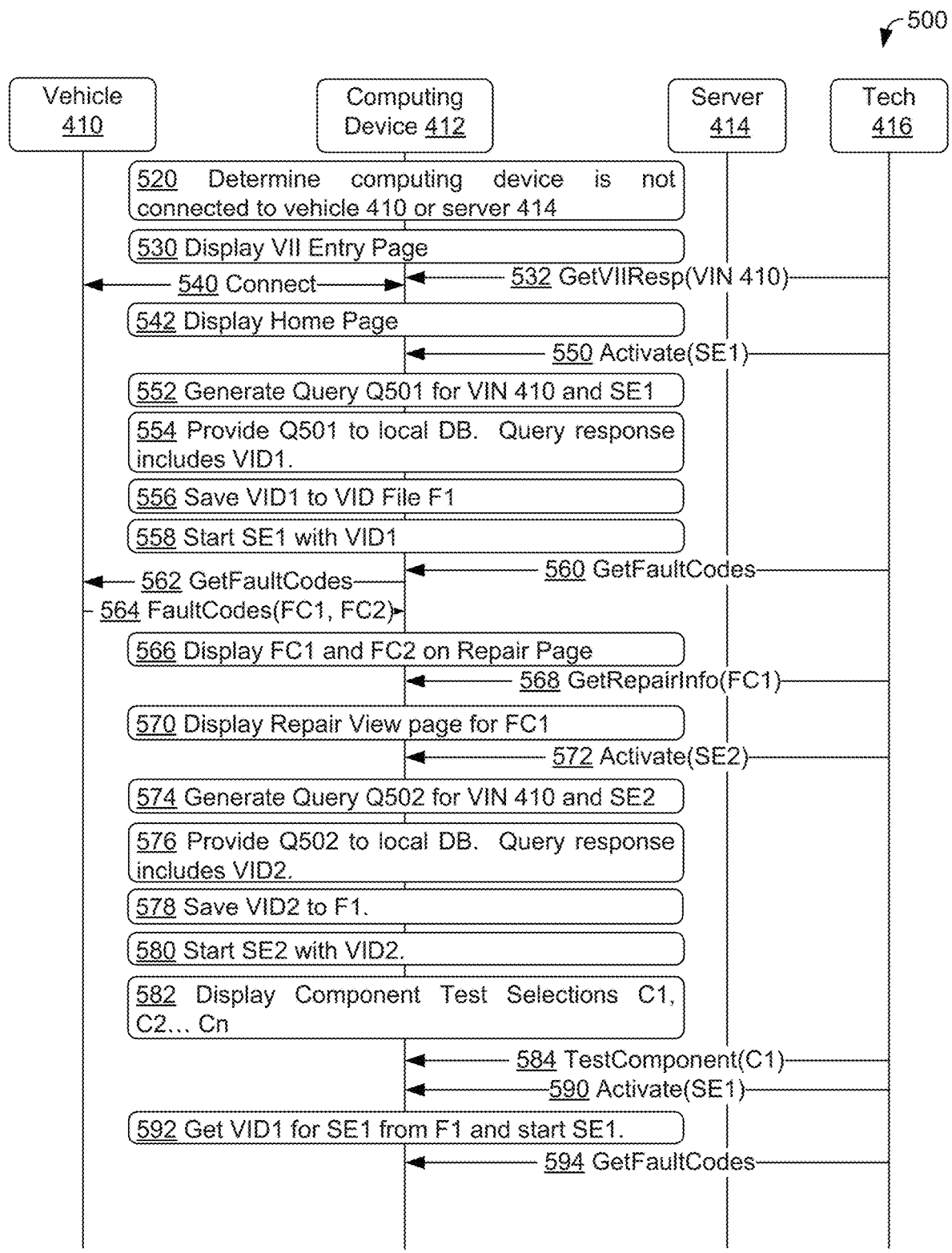
FIG. 5 shows a communication flow during repair of a vehicle, in accordance with an embodiment.

FIG. 5 shows a communication flow 500 during repair of vehicle 410, in accordance with an embodiment. During communication flow 500, technician 416 repairs vehicle 410 using computing device 412 acting as a vehicle scan tool to carry out aspects of method 200. Communication flow 500 is related to communication flow 400 discussed immediately above. In communication flow 400, all vehicle identifiers for software executables were determined at one time, while in communication flow 500, vehicle identifiers for software executables are determined as needed; that is, upon activation of a software executable.

Communication flow 500 can begin at block 520, where computing device 412 (acting as a vehicle scan tool) can determine that computing device 412 is not connected to either vehicle 410 or server 414. At block 530, computing device 412 can carry out the procedures of block 220 of method 200 to obtain VII. In particular, at block 530, computing device 412 can display a VII entry page to a user of computing device 412 as discussed above in the context of block 430 of communication flow 400.

After displaying the VII entry page, technician 416 provides VII data to computing device 412, as indicated in FIG. 5 as "VIN 410" of GetVIIResp message 532. That is, VIN 410 is data provided by technician 416 that corresponds to a VIN of vehicle 410. Upon reception of GetVIIResp message 532, computing device 412 obtains VIN 410 from message 532 and stores VIN 410 for later use.

FIG. 5 shows that communication flow 500 continues with technician 416 connecting computing device 412 with vehicle 410, as illustrated in FIG. 5 by connect message 540. Then, at block 542, computing device 412 displays a home page for vehicle repairs as discussed above in the context of block 450 of communication flow 400.

After displaying the home page, technician 416 begins repair of vehicle 410 by requesting activation of software executable SE1, illustrated in FIG. 5 by activate message 550. Computing device 412 uses the procedures of block 260 of method 200 to receive activate message 550 requesting activation of software executable SE1. In communication flow 500, software executable SE1 is the same software executable for scanning a vehicle as software executable SE1 discussed above in the context of communication flow 400.

Upon reception of activate message 550, computing device 412 carries out the procedures of block 552 to determine that a vehicle identifier for software executable SE1 is not yet available; e.g., computing device 412 determines that a vehicle identifier file with a vehicle identifier for software executable SE1 is not available. Then, computing device 412 carries out the procedures of block 230 of method 200 to determine that computing device 412 is not connected to a server. After determining that the vehicle identifier for SE1 is not available and determining computing device 412 is not connected to a server, computing device 412 retrieves VIN 410 from storage as indicated in the context of message 532. Then, computing device 412 uses the procedures of block 242 of method 200 to generate a query Q501 for software executable SE1 on computing device 412, where query Q501 is based on retrieved VIN 410, and where software executable SE1 was identified by activate message 550. In some examples, computing device 412 verifies that software executable SE1 is resident on computing device before generating query Q501—in examples where software executable SE1 is not resident, computing device 412 can generate and display an appropriate error message.

At block 554, computing device 412 carries out the procedures of block 244 of method 200 to provide query Q501 to a local database resident on computing device 412 to obtain a vehicle identifier for software executable SE1. Then, the local database provides a query response to query Q501 that includes vehicle identifier VID1 for software executable SE1.

At block 556, computing device 412 carries out the procedures of block 250 of method 200 to save vehicle identifier VID1. In the example illustrated by communication flow 400, computing device 412 is not connected to a server, so computing device 412 saves vehicle identifier VID1 to a vehicle identifier file F1 stored in non-volatile memory of computing device 412, such as discussed above in the context of FIGS. 3 and 4.

At block 558, computing device 412 uses the procedures of block 264 of method 200 to provide VID1 to software executable SE1 while starting software executable SE1.

Communication flow 500 continues with technician 416 using an interface to software executable SE1 to send GetFaultCodes message 560 to computing device 412. Computing device 412 then requests fault codes from vehicle 410 via software executable SE1 using GetFaultCodes message 562 that corresponds to GetFaultCodes message 560. In response to GetFaultCodes message 562, software executable SE1 obtains fault codes FC1 and FC2 from vehicle 410, as indicated in FIG. 4 as FaultCodes message 564. In other scenarios, more, fewer, and/or different fault codes than FC1 and FC2 can be provided; e.g., in FaultCodes message 564.

At block 566, computing device 412 displays FC1 and FC2 on a repair page, such as discussed above in the context of block 466 of communication flow 400. An example of carrying out the procedures of block 270 of method 200 can include the repairs to vehicle 410 associated with messages 550, 560, 562, 564 and blocks 552, 554, 556, 558, 566.

After display of the repair page with fault codes FC1 and FC2, technician 416 requests repair information about fault code FC1, as illustrated using GetRepairInfo message 568 with data of "FC1". At block 570, computing device 412 responds to GetRepairInfo message 568 by displaying a repair page for fault code FC1 as discussed above in the context of block 470 of communication flow 400.

FIG. 5 illustrates that after the repair page for fault code FC1 is displayed, technician 416 requests activation of software executable SE2 as illustrated using activate message 572 with data of "SE2". In communication flow 500, software executable SE2 is the same software executable for performing component tests as software executable SE2 discussed above in the context of communication flow 400.

Upon reception of activate message 572, computing device 412 carries out the procedures of block 574 to determine that a vehicle identifier for software executable SE2 is not yet available; e.g., computing device 412 determines that a vehicle identifier file with a vehicle identifier for software executable SE2 is not available. Then, computing device 412 carries out the procedures of block 230 of method 200 to determine that computing device 412 is not connected to a server. After determining that the vehicle identifier for SE2 is not available and determining computing device 412 is not connected to a server, computing device 412 retrieves VIN 410 from storage after receiving GetVIIResp message 532. Then, computing device 412 uses the procedures of block 242 of method 200 to generate a query Q502 for software executable SE2 on computing device 412, where query Q502 is based on retrieved VIN 410, and where software executable SE2 was identified by activate message 572. In some examples, computing device 412 verifies that software executable SE2 is resident on computing device before generating query Q502—in examples where software executable SE2 is not resident, computing device 412 can generate and display an appropriate error message.

At block 576, computing device 412 carries out the procedures of block 244 of method 200 to provide query Q502 to the local database to obtain a vehicle identifier for software executable SE2. Then, the local database provides a query response to query Q502 that includes vehicle identifier VID2 for software executable SE2.

At block 578, computing device 412 carries out the procedures of block 250 of method 200 to save vehicle identifier VID2 to the vehicle identifier file F1 as computing device 412 is not connected to a server, so computing device 412 saves vehicle identifier VID1 to a vehicle identifier file F1 stored in non-volatile memory of computing device 412, such as discussed above in the context of FIGS. 3 and 4.

At block 580, computing device 412 uses the procedures of block 264 of method 200 to provide VID2 to software executable SE2 while starting software executable SE2.

At block 582, computing device 412 displays one or more component tests C1, C2 . . . Cn that can be selected for execution. In some examples, some or all of component tests C1, C2 . . . Cn available for possible execution can themselves be selected based on fault code FC1 selected as discussed above in the context of GetRepairInfo message 568. After displaying the one or more component tests that can be selected for execution, technician 416 uses an interface to software executable SE2 to send TestComponent message 584 to computing device 412 to request execution of component test "C1" of vehicle 410.

Upon reception of TestComponent message 584, computing device 412 performs the requested component test C1. An example of carrying out the procedures of block 270 of method 200 can include the repairs to vehicle 410 associated with messages 572, 584 and blocks 574, 576, 578, 580, 582.

Communication flow 500 continues with technician 416 requesting activation of software executable SE1 as illustrated using activate message 590 with data of "SE1". Upon reception of activate message 590, computing device 412 carries out the procedures of block 592 to determine that a vehicle identifier for software executable SE1 is available in file F1, and so retrieves vehicle identifier VID1 from file F1. Then, computing device 412 uses the procedures of block 264 of method 200 to provide VID1 to software executable SE1 while starting software executable SE1.

Communication flow 500 continues with technician 416 using an interface to software executable SE1 to send GetFaultCodes message 594 to computing device 412. The repairs to vehicle 410 at block 270 of method 200 include obtaining fault codes from vehicle 410, as directed by message 594, and displaying any obtained fault codes.

Upon reception of GetFaultCodes message 594 and perhaps displaying any obtained fault codes by computing device 412, computing device 412 can use the procedures of block 280 of method 200 to complete communication flow 500.

Figure 6:
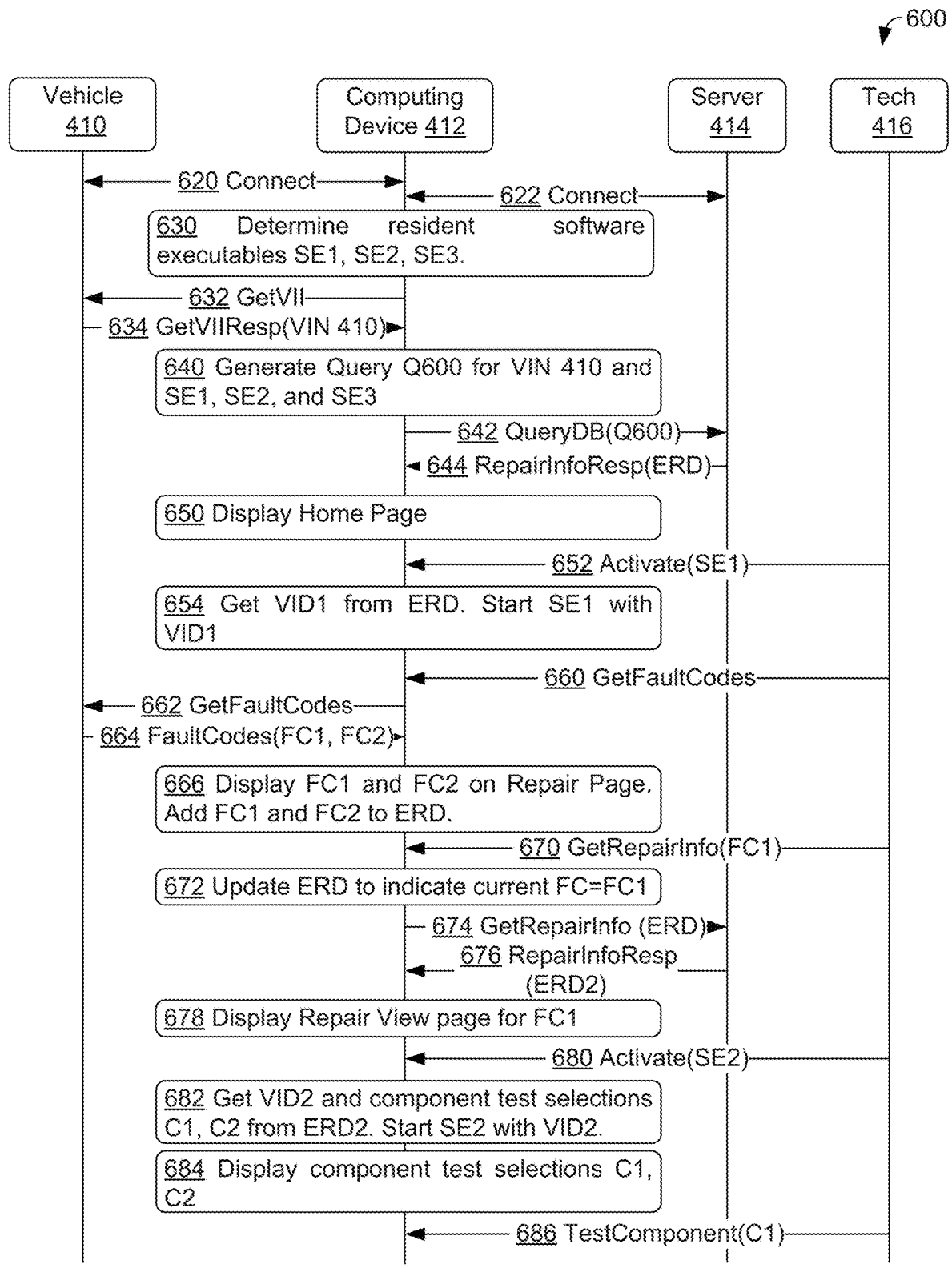
FIG. 6 shows a communication flow during repair of a vehicle, in accordance with an embodiment.

FIG. 6 shows a communication flow 600 during repair of vehicle 410, in accordance with an embodiment. During communication flow 600, technician 416 repairs vehicle 410 using computing device 412 acting as and/or embodied as a vehicle scan tool to carry out method 200. Communication flow 600 is related to communication flow 400. In communication flow 400, computing device 412 was not connected to server 414 and was not connected to vehicle 410 initially. However, in communication flow 600, computing device 412 connects to vehicle 410 and server 414 at the onset.

In communication flows 600 and 700 (shown in FIG. 7), respective repair sessions are begun when computing device 412 connects to vehicle 410 and server 414 and lasts throughout respective communication flows 600 and 700. In other examples, a repair session can be interrupted. For example, a repair session can last until computing device 412 is powered off, until new fault codes and/or parameter values are selected and/or obtained, until computing device 412 connects to a different vehicle than vehicle 410, until a pre-determined amount of time after connection of computing device 412 to vehicle 410 and/or server 414 has elapsed, and/or last until other condition(s) are met. In some particular examples, a relatively-brief interruption (e.g., 30 seconds or less, 1 minute or less, 30 minutes or less) of a connection between vehicle 410 and server 414 may be ignored in determining that a repair session has ended. For example, computing device 412 can move during a repair session and lose connectivity while moving, leading to re-establishing communication with server 414 after moving—such brief interruptions can be ignored when determining whether a repair session has ended.

FIG. 6 shows that communication flow 600 begins with technician 416 connecting computing device 412 (acting as and/or embodied as a vehicle scan tool) with vehicle 410 as illustrated by connect message 620. Computing device 412 also connects with server 414 as illustrated by connect message 622.

At block 630, computing device 412 can carry out the procedures of block 210 of method 200 to determine that three software executables "SE1", "SE2", and "SE3" are resident on computing device 412. Computing device 412 can then send GetVII message 632 to vehicle 410 to obtain VII-related information, such as a VIN of vehicle 410, in accord with the procedures of block 220 of method 200. Vehicle 410 responds with GetVIIResp message 634 that includes VIN 410, which is the VIN of vehicle 410. Computing device 412 then obtains VIN 410 from GetVIIResp message 634.

At block 640, computing device 412 carries out the procedures of block 230 of method 200 to determine that computing device 412 is connected to a server; e.g., server 410. Computing device 412 then uses the procedures of block 232 of method 200 to generate a query Q600 for software executables SE1, SE2, SE3 on computing device 412, where query Q600 is based on VIN 410, and where software executables SE1, SE2, SE3 were previously identified at block 630. Computing device 412 also carries out the procedures of block 234 of method 200 to provide query Q600 to server 414 to obtain vehicle identifiers for software executables SE1, SE2, SE3 via QueryDB message 642.

In response to query Q600 in QueryDB message 642, server 414 sends RepairInfoResp message 644 with enhanced repair data ERD that includes vehicle identifiers VID1, VID2, VID3 for respective software executables SE1, SE2, SE3. An example format of enhanced repair data is shown in FIG. 3 discussed above. By use of messages 642 and 644, computing device 412 obtains vehicle identifiers for all of its software executables at one time. In communication flow 600, computing device 412 saves ERD to storage, thereby saving vehicle identifiers VID1, VID2, VID3 to storage.

Then, at block 650, computing device 412 displays a home page for vehicle repairs. An example vehicle repair home page is shown in FIG. 11 and discussed below.

After displaying the home page, technician 416 begins repair of vehicle 410 by requesting activation of software executable SE1, illustrated in FIG. 6 by activate message 652. In communication flow 600, software executable SE1 is the same software executable for scanning a vehicle as software executable SE1 discussed above in the context of communication flow 400.

Computing device 412 uses the procedures of block 260 of method 200 to receive activate message 652 requesting activation of software executable SE1. In communication flow 600, software executable SE1 is a software executable for scanning a vehicle, such as vehicle 410, for information, where the information can include, but is not limited to, fault codes, PIDs, and values of parameters associated with PIDs.

At block 654, computing device 412 uses the procedures of block 262 of method 200 to retrieve a vehicle identifier VID1 associated with software executable SE1 from stored enhanced repair data ERD. Then, computing device 412 uses the procedures of block 264 of method 200 to provide VID1 to software executable SE1 while starting software executable SE1.

Communication flow 600 continues with technician 416 using an interface to software executable SE1 to send GetFaultCodes message 660 to computing device 412. Computing device 412 then requests fault codes from vehicle 410 via software executable SE1 using GetFaultCodes message 662 that corresponds to GetFaultCodes message 660. In response to GetFaultCodes message 662, software executable SE1 obtains fault codes FC1 and FC2 from vehicle 410 as part of FaultCodes message 664.

At block 666, computing device 412 displays FC1 and FC2 on a repair page. The repair page can be a display associated with software executable SE1. An example repair page displaying fault codes is shown is shown in FIG. 12 and discussed below. Also, computing device adds FC1 and FC2 to ERD at block 666. An example of carrying out the procedures of block 270 of method 200 can include the repairs to vehicle 410 associated with messages 652, 660, 662, 664 and blocks 654, 666.

After display of the repair page with fault codes FC1 and FC2, technician 416 requests repair information about fault code FC1, as illustrated using GetRepairInfo message 670 with data of "FC1". At block 672, computing device 412 responds to GetRepairInfo message 670 by updating enhanced repair data ERD to indicate that FC1 is a current fault code (FC). In other communications flows, technician 416 can request information about multiple fault codes via GetRepairInfo message 670; in these flows, computing device 412 can update enhanced repair data ERD to indicate that multiple fault codes are current fault codes.

Then, computing device 412 sends GetRepairInfo message 674 with enhanced repair data ERD as updated at block 672 to server 414. Server 414 then sends RepairInfoResp message 676 with updated enhanced repair data ERD2 that includes PID lists and tests associated with fault code FC1. In particular, some or all of component tests C1, C2 . . . Cn can be selected by server 414 based on fault code FC1. Then, server 414 can update enhanced repair data ERD2 by adding selected component tests C1, C2 . . . Cn to ERD2 before sending RepairInfoResp message 676. Upon reception of enhanced repair data ERD2, computing device 412 stores a copy of ERD2.

At block 678, computing device 412 displays a repair page for fault code FC1. An example repair page for a fault code is shown in FIG. 13A discussed below.

Communication flow 600 continues with technician 416 requesting activation of software executable SE2 as illustrated using activate message 680 with data of "SE2". In communication flow 600, software executable SE2 is the same software executable for performing component tests as software executable SE2 discussed above in the context of communication flow 400.

Computing device 412 uses the procedures of block 280 and then block 260 of method 200 to receive activate message 680 requesting activation of software executable SE2. In communication flow 600, software executable SE2 is a software executable for performing component tests on a vehicle, such as vehicle 410.

At block 682, computing device 412 uses the procedures of block 262 of method 200 to retrieve a vehicle identifier VID2 associated with software executable SE2 and retrieve component test selections C1, C2 . . . Cn from the stored copy of enhanced repair data ERD2. Then, computing device 412 uses the procedures of block 264 of method 200 to provide VID2 to software executable SE2 while starting software executable SE2.

At block 684, computing device 412 displays one or more component tests C1, C2 . . . Cn that can be selected for execution. After displaying the one or more possible component tests, technician 416 uses an interface to software executable SE2 to send TestComponent message 686 to computing device 412 to request execution of component test "C1" of vehicle 410.

Upon reception of TestComponent message 686, communication flow 600 can be completed. An example of carrying out the procedures of block 270 of method 200 can include the repairs to vehicle 410 associated with block 684 and message 686.

Subsequently, computing device 412 can use the procedures of block 280 of method 200 to complete communication flow 600. In other examples, the repairs to vehicle 410 at block 270 of method 200 include carrying out component test C1 of vehicle 410 and determining one or more results to component test C1 as directed by TestComponent message 686.

Figure 7:
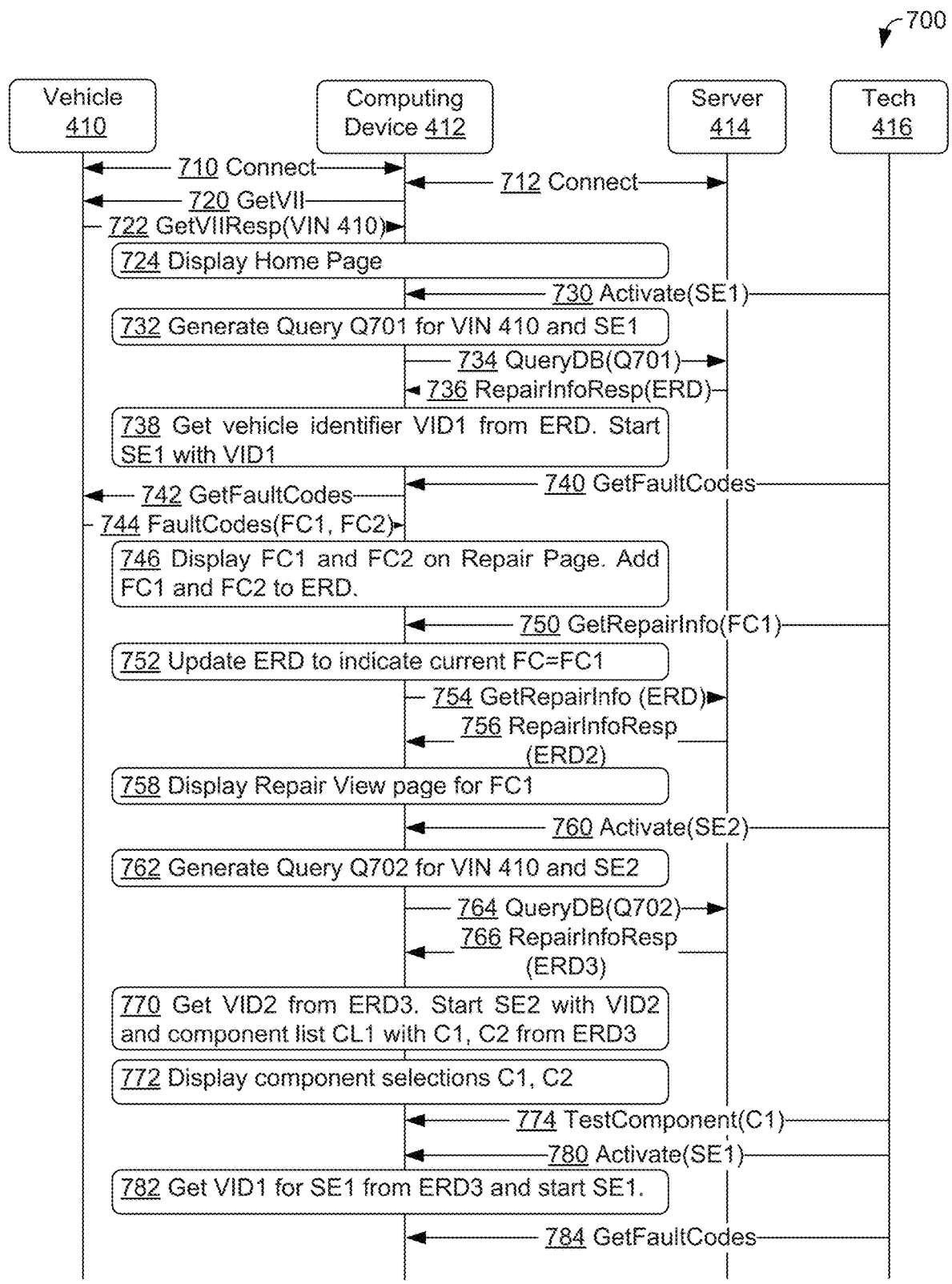
FIG. 7 shows a communication flow during repair of a vehicle, in accordance with an embodiment.

FIG. 7 shows a communication flow 700 during repair of vehicle 410, in accordance with an embodiment. During communication flow 700, technician 416 repairs vehicle 410 using computing device 412 acting as and/or embodied as a vehicle scan tool to carry out aspects of method 200.

Communication flow 700 is related to communication flow 500. In communication flow 500, computing device 412 was not connected to server 414 and was not initially connected to vehicle 410. However, in communication flow 700, computing device 412 connects to vehicle 410 and server 414 at the onset.

FIG. 7 shows that communication flow 700 begins with technician 416 connecting computing device 412 (acting as and/or embodied as a vehicle scan tool) with vehicle 410 as illustrated by connect message 710. Computing device 412 also connects with server 414 as illustrated by connect message 712.

Computing device 412 can send GetVII message 720 to vehicle 410 to obtain VII-related information, such as a VIN of vehicle 410, in accord with the procedures of block 220 of method 200. Vehicle 410 responds with GetVIIResp message 722 that includes VIN 410, which is the VIN of vehicle 410. Computing device 412 then obtains VIN 410 from GetVIIResp message 722 and stores VIN 410 for later use.

At block 724, computing device 412 displays a home page for vehicle repairs as discussed above in the context of block 450 of communication flow 400.

After displaying the home page, technician 416 begins repair of vehicle 410 by requesting activation of software executable SE1, illustrated in FIG. 5 by activate message 730. Computing device 412 uses the procedures of block 260 of method 200 to receive activate message 730 requesting activation of software executable SE1. In communication flow 700, software executable SE1 is the same software executable for scanning a vehicle as software executable SE1 discussed above in the context of communication flow 400.

Upon reception of activate message 730, computing device 412 carries out the procedures of block 732 to determine that a vehicle identifier for software executable SE1 is not yet available; e.g., computing device 412 determines that a vehicle identifier file or enhanced repair data having a vehicle identifier for software executable SE1 is not available. Then, computing device 412 carries out the procedures of block 230 of method 200 to determine that computing device 412 is connected to a server; e.g., server 410.

After determining that the vehicle identifier for SE1 is not available and that computing device 412 is connected to a server, computing device 412 retrieves VIN 410 that was stored after receiving GetVIIResp message 730. Still at block 732, computing device 412 uses the procedures of block 232 of method 200 to generate a query Q701 for software executable SE1 on computing device 412, where query Q701 is based on retrieved VIN 410, and where software executable SE1 was identified by activate message 730. In some examples, computing device 412 verifies that software executable SE1 is resident on computing device before generating query Q701—in examples where software executable SE1 is not resident, computing device 412 can generate and display an appropriate error message. Computing device 412 also carries out the procedures of block 234 of method 200 to provide query Q701 to server 414 to obtain a vehicle identifier for software executable SE1 using QueryDB message 734.

In response to query Q701 in QueryDB message 734, server 414 sends RepairInfoResp message 736 with enhanced repair data ERD that includes vehicle identifier VID1 for software executable SE1. An example format of enhanced repair data is shown in FIG. 3 discussed above. Upon reception of enhanced repair data ERD, computing device 412 saves ERD to storage, thereby saving vehicle identifier VID1 to storage.

At block 738, computing device 412 uses the procedures of block 262 of method 200 to retrieve a vehicle identifier VID1 associated with software executable SE1 from stored enhanced repair data ERD. Then, computing device 412 uses the procedures of block 264 of method 200 to provide VID1 to software executable SE1 while starting software executable SE1.

Communication flow 700 continues with technician 416 using an interface to software executable SE1 to send GetFaultCodes message 740 to computing device 412. Computing device 412 then requests fault codes from vehicle 410 via software executable SE1 using GetFaultCodes message 742 that corresponds to GetFaultCodes message 740. In response to GetFaultCodes message 742, vehicle 410 provides fault codes FC1 and FC2 as part of FaultCodes message 744.

At block 746, computing device 412 displays FC1 and FC2 on a repair page. The repair page can be a display associated with software executable SE1. An example repair page displaying fault codes is shown is shown in FIG. 12 and discussed below. Also, computing device adds FC1 and FC2 to ERD at block 746. An example of carrying out the procedures of block 270 of method 200 can include the repairs to vehicle 410 associated with messages 730, 734, 736, 740, 742, 744 and blocks 732, 738, 746.

After display of the repair page with fault codes FC1 and FC2, technician 416 requests repair information about fault code FC1, as illustrated using GetRepairInfo message 750 with data of "FC1". At block 752, computing device 412 responds to GetRepairInfo message 750 by updating ERD to indicate that FC1 is a current fault code (FC). In other communications flows, technician 416 can request information about multiple fault codes via GetRepairInfo message 750; in these flows, computing device 412 can update enhanced repair data ERD to indicate that multiple fault codes are current fault codes.

Then, computing device 412 sends GetRepairInfo message 754 with enhanced repair data ERD as updated at block 752 to server 414. Server 414 then sends RepairInfoResp message 756 with updated enhanced repair data ERD2 that includes PID lists and tests associated with fault code FC1. In particular, some or all of component tests C1, C2 . . . Cn can be selected by server 414 based on fault code FC1. Then, server 414 can update enhanced repair data ERD2 by adding selected component tests C1, C2 . . . Cn to ERD2 before sending RepairInfoResp message 756. Upon reception of enhanced repair data ERD2, computing device 412 stores a copy of ERD2.

At block 758, computing device 412 displays a repair page for fault code FC1. An example repair page for a fault code is shown in FIG. 13A discussed below.

Communication flow 700 continues with technician 416 requesting activation of software executable SE2 as illustrated using activate message 760 with data of "SE2". In communication flow 700, software executable SE2 is the same software executable for performing component tests as software executable SE2 discussed above in the context of communication flow 400.

Upon reception of activate message 760, computing device 412 carries out the procedures of block 762 to determine that a vehicle identifier for software executable SE2 is not yet available; e.g., computing device 412 determines enhanced repair data ERD2 does not store a vehicle identifier for software executable SE2. Then, computing device 412 carries out the procedures of block 230 of method 200 to determine that computing device 412 is connected to a server. After determining that the vehicle identifier for SE2 is not available and determining computing device 412 is connected to a server, computing device 412 retrieves VIN 410 that was stored after receiving GetVIIResp message 730. Then, computing device 412 uses the procedures of block 232 of method 200 to generate a query Q702 for software executable SE2 on computing device 412, where query Q702 is based on retrieved VIN 410, and where software executable SE2 was identified by activate message 760. In some examples, computing device 412 verifies that software executable SE2 is resident on computing device before generating query Q702— in examples where software executable SE2 is not resident, computing device 412 can generate and display an appropriate error message.

Computing device 412 then carries out the procedures of block 234 of method 200 to provide query Q702 to server 414 to obtain a vehicle identifier for software executable SE2 using QueryDB message 764. In response to query Q702 in QueryDB message 764, server 414 sends RepairInfoResp message 766 with enhanced repair data ERD3 that includes vehicle identifier VID2 for software executable SE2. Upon reception of enhanced repair data ERD3, computing device 412 can save a copy of ERD3 to storage, thereby storing vehicle identifier VID2

At block 770, computing device 412 uses the procedures of block 262 of method 200 to retrieve a vehicle identifier VID2 associated with software executable SE2 and retrieve component test selections C1, C2 . . . Cn from the stored copy of enhanced repair data ERD3. Then, computing device 412 uses the procedures of block 264 of method 200 to provide VID2 to software executable SE2 while starting software executable SE2.

At block 772, computing device 412 displays one or more component tests C1, C2 . . . Cn that can be selected for execution. After displaying the one or more possible component tests, technician 416 uses an interface to software executable SE2 to send TestComponent message 774 to computing device 412 to request execution of component test "C1" of vehicle 410.

Upon reception of TestComponent message 774, computing device 412 performs the requested component test C1. An example of carrying out the procedures of block 270 of method 200 can include the repairs to vehicle 410 associated with messages 760, 764, 766, 774 and blocks 762, 770, 772.

Communication flow 700 continues with technician 416 requesting activation of software executable SE1 as illustrated using activate message 780 with data of "SE1".

Upon reception of activate message 780, computing device 412 carries out the procedures of block 782 to determine that a vehicle identifier for software executable SE1 is available in enhanced repair data ERD3 and to retrieve a vehicle identifier VID1 associated with software executable SE1 from enhanced repair data ERD3. Then, computing device 412 uses the procedures of block 264 of method 200 to provide VID1 to software executable SE1 while starting software executable SE1.

Communication flow 700 continues with technician 416 using an interface to software executable SE1 to send GetFaultCodes message 784 to computing device 412. The repairs to vehicle 410 at block 270 of method 200 include obtaining fault codes from vehicle 410, as directed by message 784, and displaying any obtained fault codes. Upon reception of GetFaultCodes message 784 and perhaps displaying any obtained fault codes by computing device 412, computing device 412 can use the procedures of block 280 of method 200 to complete communication flow 700.

In some examples, software executables stored on computing device 412 can include more, fewer, and/or different software executables than SE1, SE2, and SE3 as described in the context of communications flows 400, 500, 600, 700. In other examples, more, fewer, and/or different vehicle identifiers can be associated with software executables resident on computing device 412.

Example Common Vehicle Identification and Repair Scenarios

FIGS. 8, 9, 10A, 10B, 10C, 11, 12, 13A, 13B, 13C, 13D, 13E, 14A, 14B, 14C, and 14D show two related scenarios 800, 800a, where computing device 412, embodied as a vehicle scan tool, is used by a technician Tech1, such as technician 416, to repair a vehicle V1, such as vehicle 410, in accordance with an embodiment. Scenarios 800 and 800a illustrate some details of how computing device 412 is used to repair the vehicle; e.g., by scanning for DTCs/PIDs, executing tests, reporting test results, and making other repair-related information available to technician Tech1 working on vehicle V1.

During scenario 800, computing device 412 is connected to one server S1, such as server 414, such as discussed above at least in the context of communication flows 600 and 700. As such, scenario 800 is related to, and illustrates aspects of communication flows 600 and 700. However, during scenario 800a, computing device 412 is not connected to a server and initially is not connected to vehicle V1, such as discussed above at least in the context of communication flows 400 and 500. As such, scenario 800a is related to, and illustrates aspects of communication flows 400 and 500.

In scenario 800, server S1 provides information as requested by computing device 412, which can involve obtaining the information on behalf of computing device 412 from one or more other server(s). In other scenarios, computing device 412 can communicate with multiple servers; e.g., a server for common vehicle identification, a server for generating enhanced repair information, a server for providing items of vehicle information, etc.

For both scenarios 800 and 800a, computing device 412 has at least three resident software executables: (1) an adaptive PID scanner executable for scanning a vehicle for information associated with vehicle identifier V_SE, (2) a component test executable for performing component tests on a vehicle associated with a vehicle identifier V_CTE, and (3) a functional test executable for performing functional tests on a vehicle associated with a vehicle identifier V_FTE. In both scenarios 800 and 800a, the only user of computing device 412 is technician Tech1.

Scenarios 800 and 800a begin with computing device 412 providing a dialog for common vehicle identification. In scenario 800, computing device 412 communicates with vehicle V1 to obtain VII and communicates with server S1 to obtain vehicle identifiers for software executables resident on computing device 412; e.g., vehicle identifiers V_SE, V_CTE, and V_FTE. In scenario 800a, technician Tech1 provides inputs related to the VII and once the VII is obtained, computing device 412 uses a local database stored on computing device 412 to obtain vehicle identifiers for software executables resident on computing device 412; e.g., vehicle identifiers V_SE, V_CTE, and V_FTE.

In scenarios 800 and 800a, computing device 412 obtains vehicle identifiers V_SE, V_CTE, and V_FTE all at once, such as discussed above in the context of respective communication flows 400 and 600. In other scenarios, computing device 412 obtains vehicle identifiers as needed from server S1 or from the local database, as discussed above in the context of respective communication flow 500 or communication flow 700. In scenario 800a, after the vehicle identifiers for software executables resident on computing device have been obtained, computing device 412 is connected to vehicle V1. In other scenarios than scenario 800a, computing device 412 is connected to vehicle V1 before the vehicle identifiers for software executables resident on computing device have been obtained.

After the vehicle identifiers are obtained and vehicle V1 is connected to computing device 412, both scenarios 800 and 800a continue with computing device 412 presenting a vehicle repair home page. For both scenarios 800 and 800a, technician Tech1 requests activation of the adaptive PID scanner executable from the vehicle repair home page. In response, computing device 412 retrieves vehicle identifier V_SE from storage, computing device 412 provides vehicle identifier V_SE to the adaptive PID scanner executable during activation, and the adaptive PID scanner executable obtains three DTCs from vehicle V1. In other scenarios, more, fewer, and/or different DTCs than discussed in the context of scenarios 800 and 800a are obtained from a vehicle.

Computing device 412 subsequently displays a scanner executable page with three controls for the respective obtained DTCs on the scanner executable page. For both scenarios 800 and 800a, a selection for DTC P0171 is selected by technician Tech1 from the scanner executable page.

Scenario 800 continues with computing device 412 communicating with the server to obtain more information related to DTC P0171 and subsequently displays a repair page based on the information obtained from the server. From the repair page, technician Tech1 requests activation of the component test executable. In response, computing device 412 displays a repair page for the component test executable which is also based on the information related to DTC P0171 obtained from the server. After displaying the repair page for the component test executable, technician Tech1 selects a component test from the repair page. Consequently, computing device 412 retrieves vehicle identifier V_CTE from storage and provides vehicle identifier V_CTE to the component test executable. The component test executable then executes a component test on vehicle V1.

Scenario 800 then proceeds with technician Tech1 requesting activation of the functional test executable. Computing device 412 displays a repair page for the functional test executable which is also based on the information related to DTC P0171 obtained from the server. After displaying the repair page for the functional test executable, technician Tech1 selects a functional test from the repair page. Consequently, computing device 412 retrieves vehicle identifier V_FTE from storage and provides vehicle identifier V_FTE to the functional test executable. The functional test executable then executes a functional test on vehicle V1.

After the functional test is completed, technician Tech1 selects use of the adaptive PID scanner from the default repair page. Consequently, computing device 412 retrieves vehicle identifier V_SE from storage and provides vehicle identifier V_SE to the adaptive PID scanner executable. The adaptive PID scanner executable then obtains PID data for parameters listed on a PID list provided by server S1 and displays the obtained PID data in a repair page.

After displaying the obtained PID data, scenario 800 continues with technician Tech1 requesting a repair page for DTC C0660 that is unrelated to DTC P0171— computing device 412 attempts to obtain information from the server related to DTC C0660, but the server determines no information is available for DTC C0660. Subsequently, computing device 412 provides a repair page indicating information from the server is unavailable for DTC C0660. After providing this repair page, scenario 800 is completed.

Returning to scenario 800a, the scenario continues with computing device 412 receiving the selection for DTC P0171 and providing a first default repair page related to DTC P0171. As indicated above, a default page is not based on information from the server (as computing device 412 is not connected to the server during scenario 800a). From the first default repair page, technician Tech1 requests activation of the component test executable and computing device 412 displays another default repair page for the component test executable. After displaying the default repair page for the component test executable, technician Tech1 selects a component test from the default repair page. Consequently, computing device 412 retrieves vehicle identifier V_CTE from storage and provides vehicle identifier V_CTE to the component test executable. The component test executable then executes a component test on vehicle V1.

Scenario 800a then proceeds with technician Tech1 requesting activation of the functional test executable. Computing device 412 displays a default repair page for the functional test executable. After displaying the default repair page for the functional test executable, technician Tech1 selects a functional test from the repair page. Consequently, computing device 412 retrieves vehicle identifier V_FTE from storage and provides vehicle identifier V_FTE to the functional test executable. The functional test executable then executes a functional test on vehicle V1.

After the functional test is completed, technician Tech1 selects use of the PID scanner from the default repair page. Consequently, computing device 412 retrieves vehicle identifier V_SE from storage and provides vehicle identifier V_SE to the adaptive PID scanner executable. The adaptive PID scanner executable then obtains PID data for parameters listed on a default PID list and displays the obtained data in a repair page. After displaying the repair page that has PID data for parameters listed on the default PID list, scenario 800a is completed.

Figure 8:
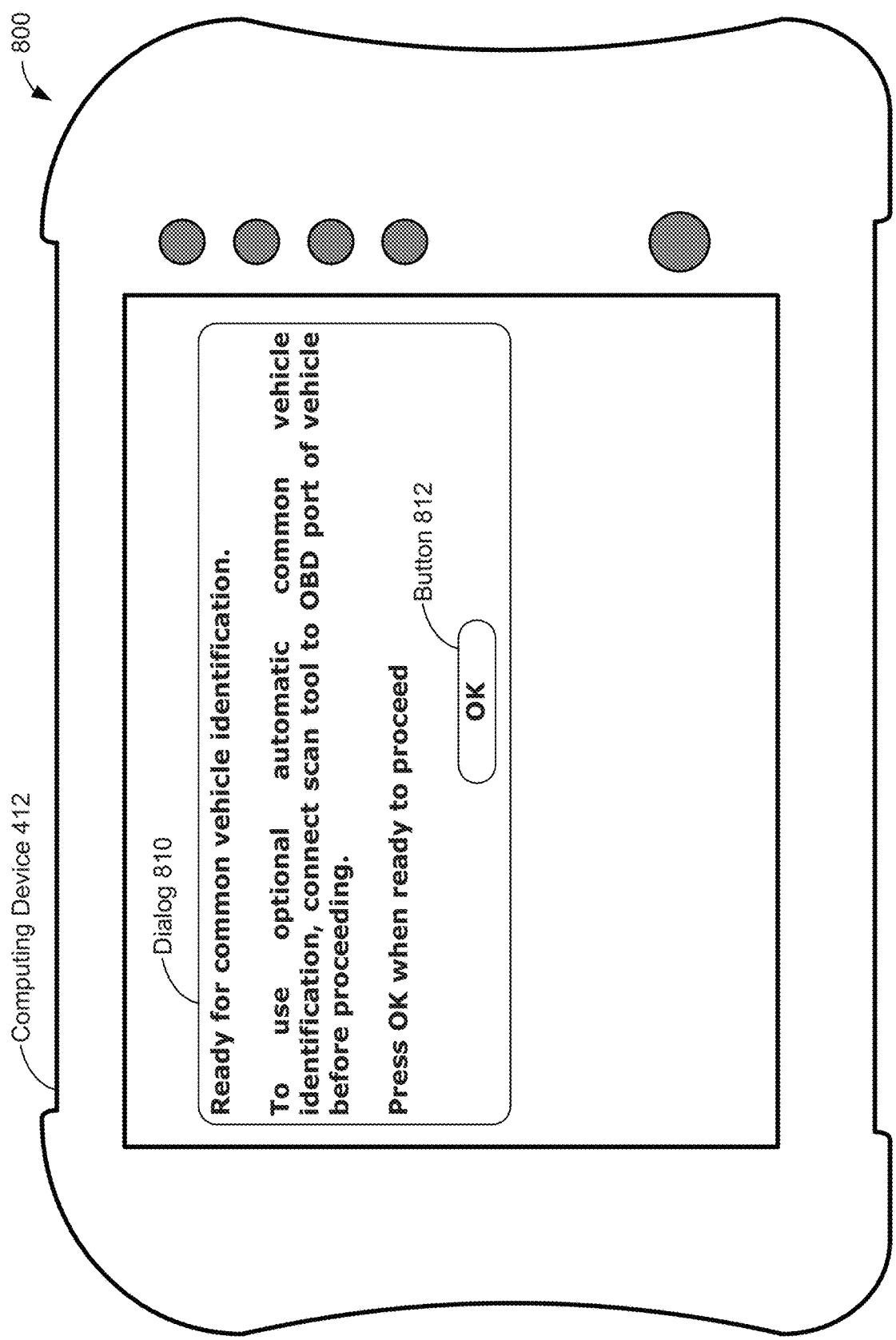
FIGS. 8, 9, 10A, 10B, 10C, 11, 12, 13A, 13B, 13C, 13D, 13E, 14A, 14B, 14C, and 14D show two related scenarios where a computing device is used to repair a vehicle, in accordance with an embodiment.

Turning to FIG. 8, scenarios 800 and 800a begin with computing device 412 presenting dialog 810 for "common vehicle identification", where dialog 810 includes an "OK" button 812. Dialog 810 states that "[to] use optional automatic common vehicle identification, connect scan tool to OBD port of vehicle before proceeding" and that technician Tech1 should "[press] OK [button 812] when ready to proceed.

Figure 9:
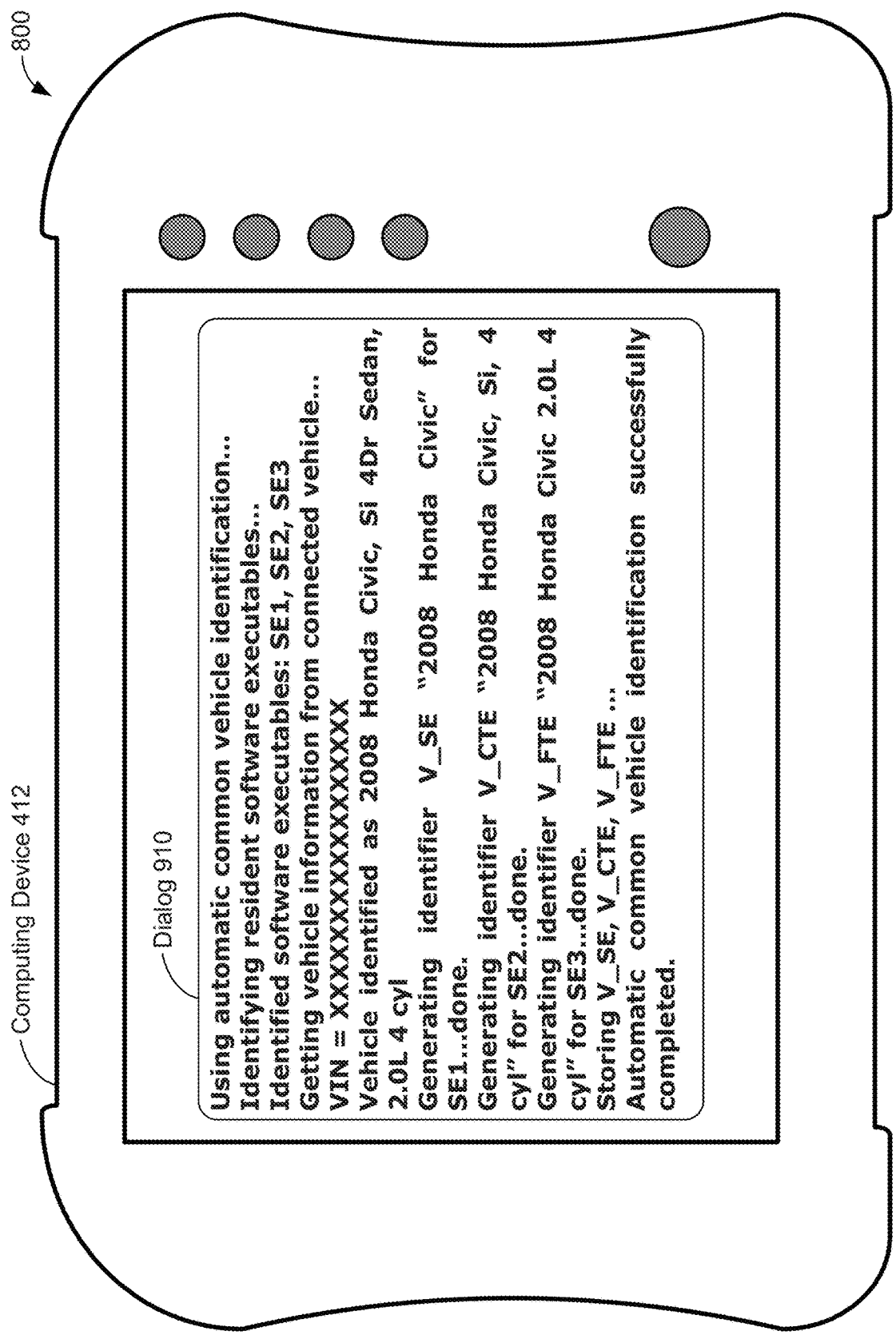

Scenario 800 continues with technician Tech1 connecting vehicle V1 to computing device 412 prior to pressing OK button 812. Scenario 800 then proceeds with computing device 412 presenting dialog 910 as shown in FIG. 9. Dialog 910 relates to "automatic common vehicle identification". During automatic common vehicle identification, computing device 412 can "[i]dentif[y] resident software executables" to find "software executables: SE1, SE2, SE3" as indicated by dialog 910. In scenarios 800 and 800, software executable SE1 is the adaptive PID scanner executable, software executable SE2 is the component test executable, and software executable SE3 is the functional test executable.

Dialog 910 shows that computing device 412 can "[get] vehicle information from connected vehicle" that includes a "VIN=XXXXXXXXXXXXXXXXX", which is a VIN for a "[v]ehicle identified as [a] 2008 Honda Civic, Si 4Dr Sedan, 2.0 L 4 cyl". Then, computing device 412 can "[g]enerat[e] identifier V_SE '2008 Honda Civic' for SE1", "identifier V_CTE '2008 Honda Civic, Si, 4 cyl' for SE2", and "identifier V_FTE '2008 Honda Civic 2.0 L 4 cyl' for SE3". Then, after generating identifiers V_SE, V_CTE, and V_FTE, computing device 412 can "[s]tor[e] V_SE, V_CTE, [and] V_FTE" as also indicted by dialog 910.

In scenario 800, computing device 412 is connected to server S1, and so computing device 412 determines V_SE, V_CTE, and V_FTE by communicating VII, such as the obtained VIN, in a query to server S1 and obtaining V_SE, V_CTE, and V_FTE as part of a query response from server S1.

In other scenarios, computing device 412 performs automatic common vehicle identification without generating part or all of the display shown as dialog 910. In still other scenarios, computing device 412 performs automatic common vehicle identification without generating a display shown as dialog 910, but rather generates and/or updates a log file that includes some or all of the information shown as dialog 910. In still other scenarios, computing device 412 performs automatic common vehicle identification by generating a display of dialog 910 and generating and/or updating a log file.

Scenario 800a continues from FIG. 8 with technician Tech1 pressing OK button 812 without connecting vehicle V1 to computing device 412. Scenario 800a then proceeds with computing device 412 presenting dialog 1010 for "Manual Common Vehicle Identification" as shown in FIG. 10A.

Figure 10A:
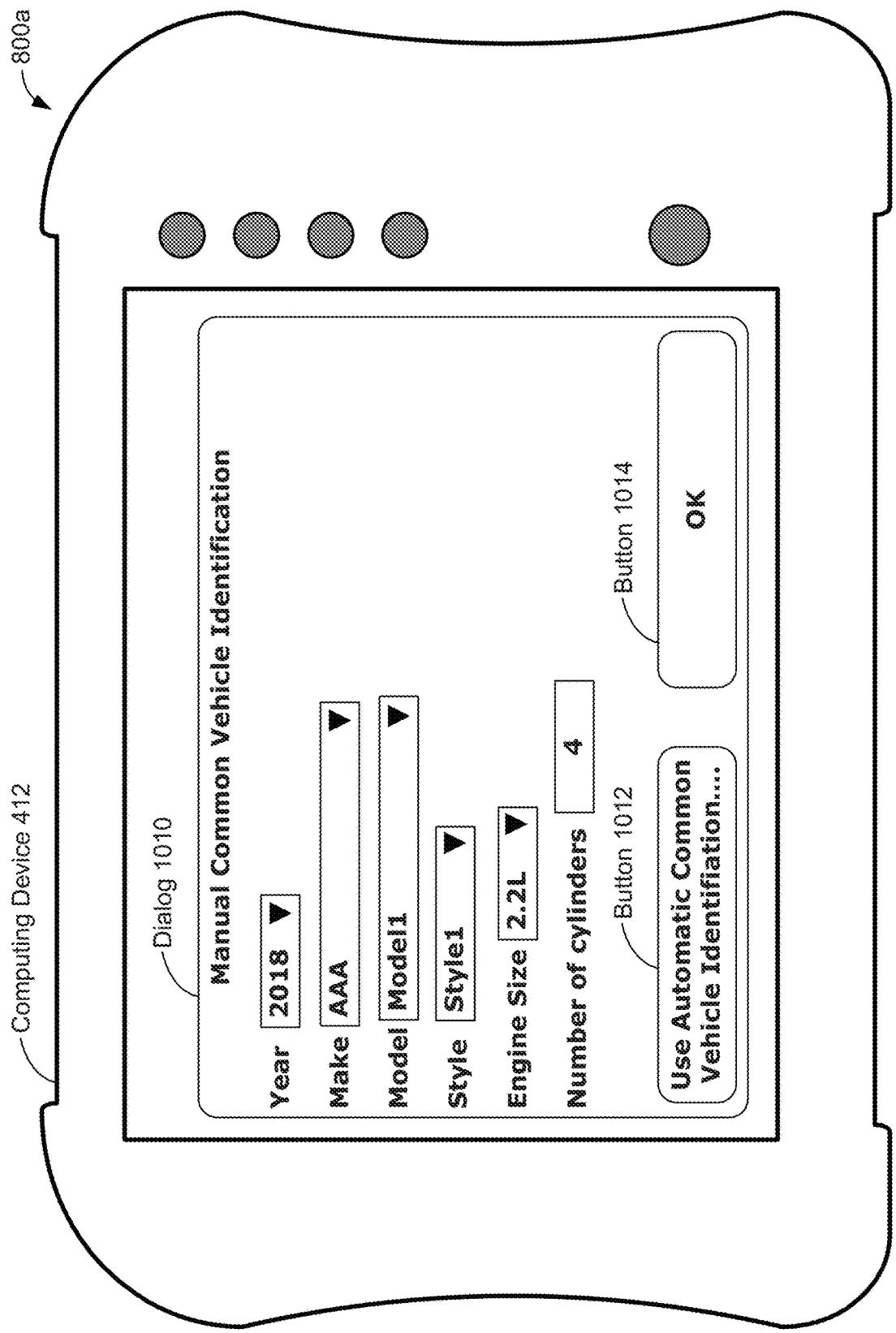

FIG. 10A shows a dialog 1010 related to one technique for manual common vehicle identification. Dialog 1010 allows a user of computing device 412, such as technician Tech1 repairing vehicle V1 of scenario 800a, to enter a "Year", "Make", "Model", "Style", "Engine Size", and a "Number of cylinders" as VII. In the example shown in FIG. 10, the user has entered in a year of "2018", a make of "AAA', a model of "Model1", a style of "Style 1", an engine size of "2.2 L" (2.2 liters), and a number of cylinders equal to 4. Dialog 1010 indicates that pull down menus can be used to provide some or all of the VII—in other examples, more, less, and/or different data can be provided as VII to computing device 412 than shown for dialog 1010.

Once the user has entered in the VII data, the user can press button 1014 indicating that the VII is "OK" and that computing device 412 can proceed with common vehicle identification. If the user decides to use automatic common vehicle identification rather than enter the VII via dialog 1012, then the user can press button 1012. Automatic common vehicle identification is discussed above at least in the context of FIGS. 5, 6, and 9.

Then, after button 1014 is pressed, computing device 412 can generate a query based on the VII provided by dialog 1010 for a local database resident on computing device 412. In response to the query, computing device 412 can receive a query response with one or more vehicle identifiers for one or more corresponding software executables resident on computing device 412.

Figure 10B:
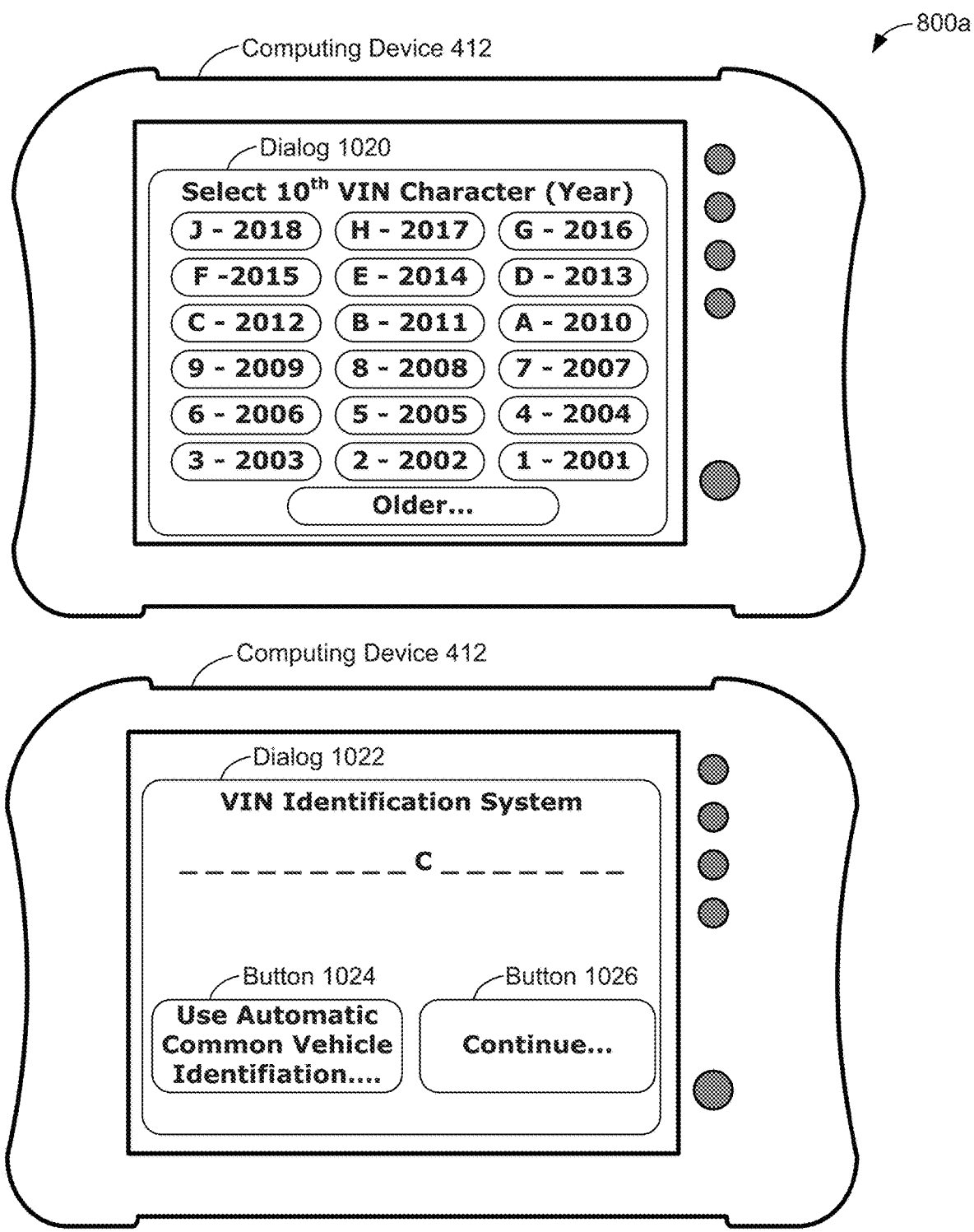
Figure 10C:
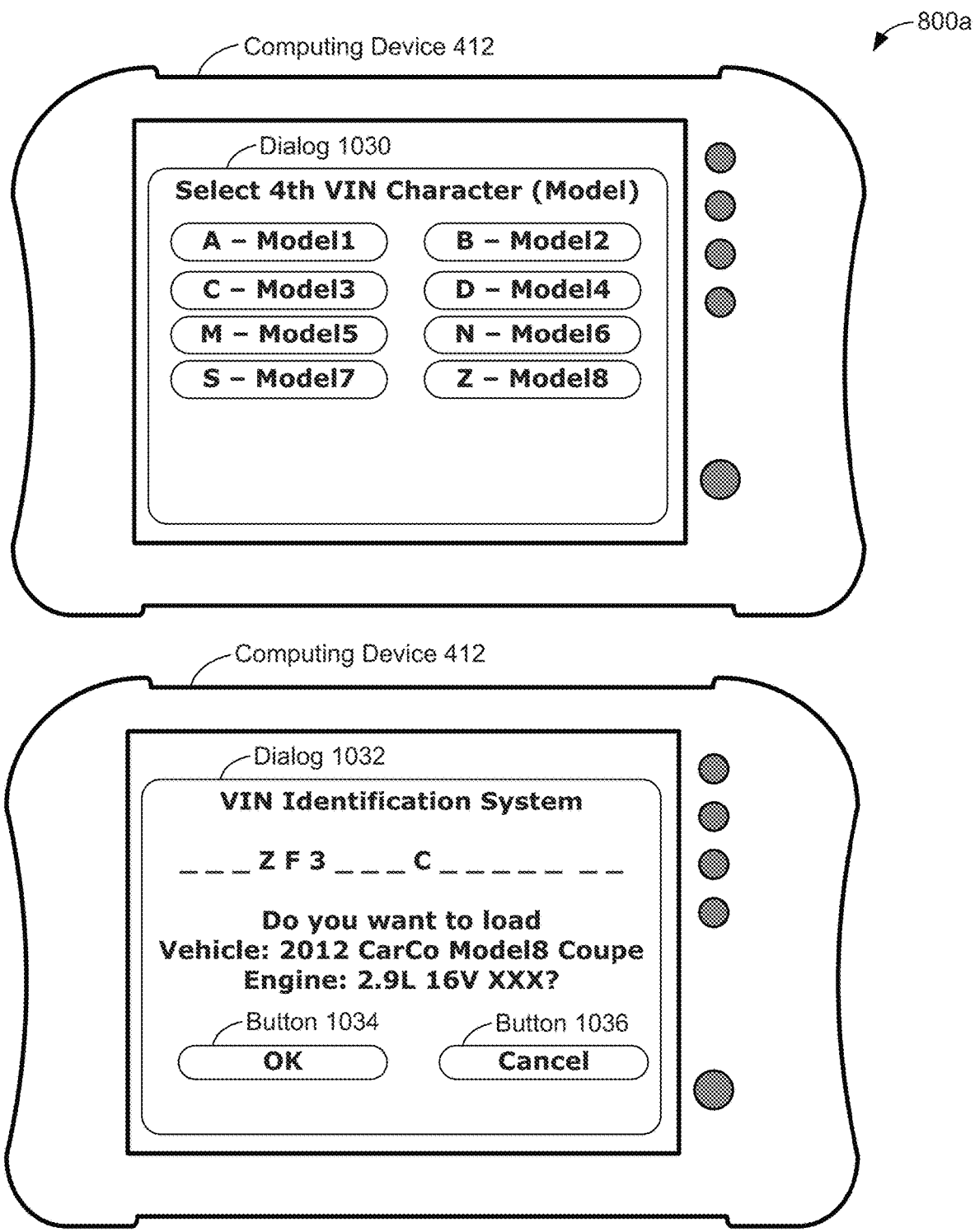

FIGS. 10B and 10C show dialogs 1020, 1022, 1030, and 1032 related to another technique for manual common vehicle identification. In this technique, the user provides data about the VIN of vehicle V1 on a VIN character-by-character basis until enough VII has been collected to enable computing device 412 to query the local database for vehicle identifiers for resident software executables as discussed above at least in the context of FIGS. 4, 5, and 10A.

In particular, an upper portion of FIG. 10B shows dialog 1020 to enter in a "10$^{th}$ VIN Character" which corresponds to the year of manufacture for vehicle V1. In the example shown in FIG. 10B, a "C" character is selected corresponding to year "2012". A lower portion of FIG. 10B shows dialog 1022 which indicates that the "C" character of a VIN has been selected as the 10$^{th}$ character of the VIN of vehicle V1. Dialog 1022 also includes button 1024 to use automatic common vehicle identification rather than manual common vehicle identification and button 1026 to continue with manual common vehicle identification. In scenario 800a, button 1026 is selected to continue with manual common vehicle identification After button 1026 is selected, computing device 412 displays dialog 1030, an example of which is shown in an upper portion of FIG. 10C. Dialog 1030 can be used to enter in a "4$^{th}$ VIN Character" which corresponds to a model of manufacture for vehicle V1. In the example shown in FIG. 10B, a "Z" character is selected corresponding to a "Model 8" vehicle.

A lower portion of FIG. 10C shows dialog 1032, which indicates that the "Z" character has been selected as a 4$^{th}$ character of the VIN of vehicle V1. Dialog 1032 shows that "F" has been selected as a 5$^{th}$ character of the VIN of vehicle V1 and that "3" has been selected as a 6$^{th}$ character of the VIN of vehicle V1. Dialog 1032 also shows that "C" has been selected as the 10th character of the VIN of vehicle V1 as also illustrated by dialog 1022. Dialog 1032 indicates that computing device 412 has obtained enough data about the VIN to make a suggestion of a "2012 CarCo Model8 Coupe Engine: 2.9 L 16V XXX" as the YMME of vehicle under repair.

Dialog 1032 includes OK button 1034 that, if selected by a user, allows computing device 412 to proceed with common vehicle identification based on the suggested YMME. Dialog 1032 includes also includes cancel button 1036 that, if selected by a user, allows computing device 412 to stop common vehicle identification. In other examples, dialog 1032 can include additional buttons, such as a "back" or "edit" button to allow changing of the previously-provided VIN and/or YMME data, and a button such as button 1024 of dialog 1022 to allow use of automatic common vehicle identification. In scenario 800a, technician Tech1 repairing vehicle V1 selects OK button to accept 2012 CarCo Model8 Coupe Engine: 2.9 L 16V XXX as the VII (and YMME) for vehicle V1 being repaired, and allowing common vehicle identification to proceed with obtaining vehicle identifiers for resident software executables based on the VII.

In scenario 800a, computing device 412 is not connected to a server, and so computing device 412 determines V_SE, V_CTE, and V_FTE by querying a local database and obtaining V_SE, V_CTE, and V_FTE as part of a query response from the local database. In scenario 800a, after vehicle identifiers V_SE, V_CTE, and V_FTE have been obtained, computing device 412 is connected to vehicle V1. After vehicle identifiers V_SE, V_CTE, and V_FTE are obtained, scenarios 800 and 800a both continue with computing device 412 storing vehicle identifiers V_SE, V_CTE, and V_FTE.

Computing device 412 then displays home page 1100 as shown in FIG. 11. Home page 1100 can act as a vehicle repair home page that can include controls for activating various repair-related functions. These repair-related functions can be based on resident software executables of computing device 412.

FIG. 11 shows that home page 1100 includes adaptive PID scanner control 1110, adaptive functional testing control 1112, adaptive component test meter control 1114, technical bulletin control 1116, diagnostic view control 1130, expert access control 1132, data manager control 1134, vehicle history control 1136, data stream control 1150, help control 1152, settings control 1154, and exit control 1156. In other examples, home page 1100 can include more, fewer, and/or different controls than illustrated.

Adaptive PID scanner control 1110, when selected (i.e., pressed), can activate the resident adaptive PID scanner executable. The adaptive PID scanner executable can cause resident software and hardware of computing device 412 to communicate vehicle V1 to obtain DTCs, PIDs, parameter values associated with the PIDs and perhaps other information from vehicle V1.

Adaptive functional testing control 1112, when selected, can activate the resident functional test executable for performing tests on a per-function basis on a vehicle; e.g., vehicle V1. Adaptive component test meter control 1114, when selected, can activate the resident component test executable for performing tests on a per-component basis on a vehicle; e.g., vehicle V1. The resident software executables can use digital scanners and electronic measuring components, such as digital oscilloscopes, ammeters, voltmeters, ohmmeters, etc., resident on computing device 412 to perform the respective component and functional tests. These component and functional tests can be tailored on a per-test basis to provide information to technician Tech1 about how to execute the test and/or how to interpret test results.

Technical bulletin control 1116, when selected, can activate a resident software executable for performing vehicle information retrieval. The executable for performing vehicle information retrieval can provide repair tips, OEM repair information, TSBs, and/or other information related to vehicle V1. This executable can present one or more titles or other information about respective items of vehicle information (such as a TSB title about a particular TSB). Subsequent selection of a particular title causes computing device 412 to send a request for the respective item of vehicle information associated with the title to server S1. In response, server S1 sends the respective vehicle information associated with the title to computing device 412, and computing device 412 can display the respective vehicle information associated with the title. In some examples, the software executable for performing vehicle information retrieval can be associated with a vehicle identifier; this vehicle identifier can be obtained during common vehicle identification, stored on computing device 412, and provided to the software executable during activation. In other examples, more, fewer, and/or different software executables can be resident on vehicle V1 scan tool and/or accessible via the controls of the repair page.

Diagnostic view control 1130, when selected, can cause computing device 412 to provide a repair page for diagnosing a vehicle under repair. This repair page can be customized based on a DTC selected by a user of computing device 412; e.g., technician Tech1. If computing device 412 is connected to a server; e.g., server S1, then the repair page can be further customized based on enhanced repair data, including intelligent repair data, provided by the server. The repair page can include controls to activate the above-mentioned software executables with inputs including the selected DTC and inputs provided by the server as part of the enhanced repair data, as well as other controls related to repairing vehicle V1. Examples of this repair page are discussed below in the context of FIGS. 13A and 14A.

Expert access control 1132, when selected, can cause computing device 412 to (attempt to) connect to one or more (off-site) experts for advice about using computing device 412 to repair vehicle V1, for advice and/or service about computing device 412, and/or for other information. Computing device 412 can communicate data, text, audio, video, and/or other information with the connected expert(s); e.g., enable communications via telephone, video call, or textual chat, send and/or receive images and/or data, etc. Data manager control 1134, when selected, can cause computing device 412 to provide controls for reviewing, updating, inserting, and/or deleting data stored on computing device 412; i.e., controls for local data management.

Vehicle history control 1136, when selected, can cause computing device 412 to display information about previous repairs and other historical information about a vehicle under repair. Data stream control 1150, when selected, can cause computing device 412 to display information about networks and/or devices connected to computing device 412 and providing data, perhaps as one or more data streams, to computing device 412. Help control 1152, when selected, can cause computing device 412 to provide additional information on how to use computing device 412; i.e., help in using computing device 412.

Settings control 1154, when selected, can cause computing device 412 to provide a settings page that allows a user of computing device 412 to read, update, insert, and/or delete "settings" or values that control operation of computing device 412. Example settings include, but are not limited to, settings related to upgrading and/or installing hardware and/or software of computing device 412, settings related to already-installed hardware and/or software of computing device 412 (e.g., executable-specific settings) networking-related settings, settings for audio information (e.g., volume), settings for display information (e.g., brightness, color adjustment), settings related to storage available on and/or used by computing device 412, and settings related to users of computing device 412 (e.g., user names, passwords, user-accessible storage, etc.). Exit control 1156, when selected, can cause computing device 412 to exit home page 1100. In some examples, when exit control 1156 is selected, computing device 412 is powered down.

For both scenarios 800 and 800a, technician Tech1 selects adaptive PID scanner control 1110 to cause computing device 412 to activate the adaptive PID scanner executable. Upon selection of adaptive PID scanner control 1110, computing device 412 retrieves vehicle identifier V_SE for the adaptive PID scanner executable from storage and activates the adaptive PID scanner executable. In scenario 800, vehicle identifiers V_SE, V_CTE, and V_FTE are stored as part of enhanced repair data communicated between computing device 412 and the server, and computing device 412 retrieves vehicle identifiers from stored enhanced repair data. In scenario 800a, vehicle identifiers V_SE, V_CTE, and V_FTE are stored in a vehicle identifier file stored on computing device 412. Both scenarios 800 and 800a continue with computing device 412 providing a scanner executable page for the activated adaptive PID scanner executable.

FIG. 12 shows scanner executable page 1200 for the adaptive PID scanner executable. Scanner executable page 1200 indicates that the adaptive PID scanner executable first "Scan[s]" vehicle V1 for "DTCs" and receives three DTCs from vehicle V1. The three DTCs are: DTC "P0171", which has a title of "System Too Lean (Bank1)", DTC "P0101", which has a title of "Mass Airflow Sensor 'A' Range/Performance", and DTC "P0121", which has a title of "Throttle Position Sensor 'A' Circuit Performance". In some examples, DTCs and related controls displayed on scanner executable page 1200 are presented in order of relative importance for repairing vehicle V1; e.g., repairing faults in vehicle V1 related to DTC P0171 are more important and/or may also repair faults in vehicle V1 related to DTCs P0101 and P0121, and repairing faults in vehicle V1 related to DTC P0101 are more important and/or may also repair faults in vehicle V1 related to DTC P0121.

Scanner executable page 1200 also includes three controls 1210, 1220, 1230. Each of respective controls 1210, 1220, 1230, when selected, indicates to computing device 412 that a user; e.g., technician Tech 1, intends to "repair" one or more faults in vehicle V1 associated with respective DTCs "P0171", "P0101", and "P0121". In both scenarios 800 and 800a, technician Tech1 selects repair P0171 control 1210 with the intention of repairing one or more faults in vehicle V1 associated with DTC P0171.

To help technician Tech1 repair these faults, computing device 412 can provide information, tests, displays, and/or other materials related to a DTC associated with a selected control to enable technician Tech1 to repair one or more faults in vehicle V1 related to the DTC. The information, tests, displays, and/or other materials can differ based on information provided by server S1; i.e., server S1 can provide computing device 412 with enhanced repair information that modifies and/or selects different information, tests, displays, and/or other materials related to a DTC in comparison to default information, tests, displays, and/or other materials resident on computing device 412. Thus, the remainder of scenario 800 differs from the remainder of scenario 800a.

Scenario 800 continues with computing device 412 obtaining enhanced repair information related to DTC P0171 from server S1. Computing device 412 subsequently displays repair page 1300 based on the enhanced repair information.

FIG. 13A shows that repair page 1300 includes indicator 1302 showing that the "Server" is "Available"; i.e., server S1 is connected to computing device 412. Repair page 1300 also includes controls 1310, 1312, 1320, 1322, 1324, 1330, 1332, 1334, 1340, 1342 and suggested repair information 1326. Several of these controls; e.g., controls 1310, 1312, 1322, 1324, and suggested repair information 1326 are customized based on "DTC P0171", which is the DTC selected from scanner executable page 1200 using repair P0171 control 1210. Additionally, control 1320 is customized based on the enhanced repair data.

P0171 technical bulletin control 1310, when selected, can cause computing device 412 to provide one or more technical bulletins associated with a specific DTC; in this example, DTC P0171. A technical bulletin can provide information related to diagnosing and/or repairing faults in vehicle V1, perhaps provided by the OEM of vehicle V1 and/or other repair experts. For example, computing device 412 can obtain the technical bulletin(s) associated with DTC P0171 from server S1. In some examples, P0171 technical bulletin control 1310 can indicate a number of technical bulletins available and related to P0171.

Common repairs control 1312 can indicate one or more repair procedures performed by other technicians attempting to repair vehicles that generate a specific DTC; in this example, DTC P0171. In this example, the repair procedures are listed in order of a number of attempts performed by other technicians; that is, the most commonly attempted repair procedure to remedy DTC P0171 is to "Change [the] Fuel Filter", the second most commonly attempted repair procedure to remedy DTC P0171 is to "Replace [the] Oxygen Sensor", and the third most commonly attempted repair procedure to remedy DTC P0171 is "Replace Fuel Pump". Upon selection, common repair control 1312 can provide more information about the listed repair procedures; e.g., parts information, related manual pages, images of faulty and/or correct parts, audio and/or video information about performing the repair procedures.

In some examples, common repairs control 1312 indicates one or more repair procedures performed on vehicles that are similar to or the same as vehicle V1; e.g., have some or all of the same YMME/VII/vehicle identifier information as vehicle V1. In other examples, common repairs control 1312 provides a graph of common repairs based on a number of repair attempts over time; i.e., to indicate if one or more particular repair procedures have increased or decreased in popularity over time.

Adaptive PID/DTC scanner control 1320, when selected, can cause computing device 412 to activate the adaptive PID scanner executable and/or redisplay scanner executable page 1200 with the DTCs obtained from vehicle V1. As indicated by the text of control 1320 shown in FIG. 13A, adaptive PID/DTC scanner control 1320 can indicate whether or not "Enhanced Repair Data" is "Available".

Adaptive functional testing control 1322, when selected, can cause computing device 412 to display a repair page associated with the functional test executable and/or activate the functional test executable. The enhanced repair data provided by the server can include one or more identified functional tests that are associated with a specific DTC; e.g., DTC P0171. Then, when the functional test executable is activated, technician Tech1 can select one or more of the identified functional tests associated with DTC P0171 for subsequent performance.

Adaptive component testing control 1324, when selected, can cause computing device 412 to display a repair page associated with the component test executable and/or activate the component test executable. The enhanced repair data provided by the server can include one or more identified component tests that are associated with a specific DTC; e.g., DTC P0171. Then, when the component test executable is activated, technician Tech1 can select one or more of the identified component tests associated with DTC P0171 for subsequent performance.

Suggested repair information 1326 can include one or more tips, procedures, and/or other information suggested by technicians, experts, and/or others to repair one or more faults associated with a specific DTC; e.g., DTC P0171. Suggested repairs control 1330, when selected, can cause computing device 412 to provide additional tips, repair procedures, and/or other information suggested by technicians, experts, and/or others to repair one or more faults associated with a specific DTC; e.g., DTC P0171. That is, suggested repair information 1326 can include repair information that is most commonly read, has a highest user or other rating, the oldest, the newest, and/or otherwise deemed to be most important and suggested repairs control 1330 can provide other repair information beyond suggested repair information 1326 that is also associated with a specific DTC; e.g., DTC P0171.

Chat with expert control 1332, when selected, can cause computing device 412 to initiate communications with one or more persons that have expertise related to repairing vehicle faults; e.g., technicians, mechanics, OEM personnel, etc. In some examples, these person(s) can have expertise related to repairing vehicle faults related to a specific DTC; e.g., DTC P0171. These communications can include data, text, audio, video, and/or other information communicated between computing device 412 and the person(s) with expertise.

OEM repair information control 1334, when selected, can cause computing device 412 to provide original equipment manufacturer information about vehicles that are similar to or the same as vehicle V1; e.g., have some or all of the same YMME/VII/vehicle identifier information as vehicle V1. In some examples, OEM repair information control 1334, when selected, can cause computing device 412 to provide original equipment manufacturer information about similar and/or the same vehicle and also about repairing vehicle faults related to a specific DTC; e.g., DTC P0171.

Control 1340, when selected, can cause computing device 412 to provide any other available controls, information, options, etc. related to repairing a vehicle generating a specific DTC; in this example, DTC P0171. Control 1342, when selected, can cause computing device 412 to power down.

Figure 13B:
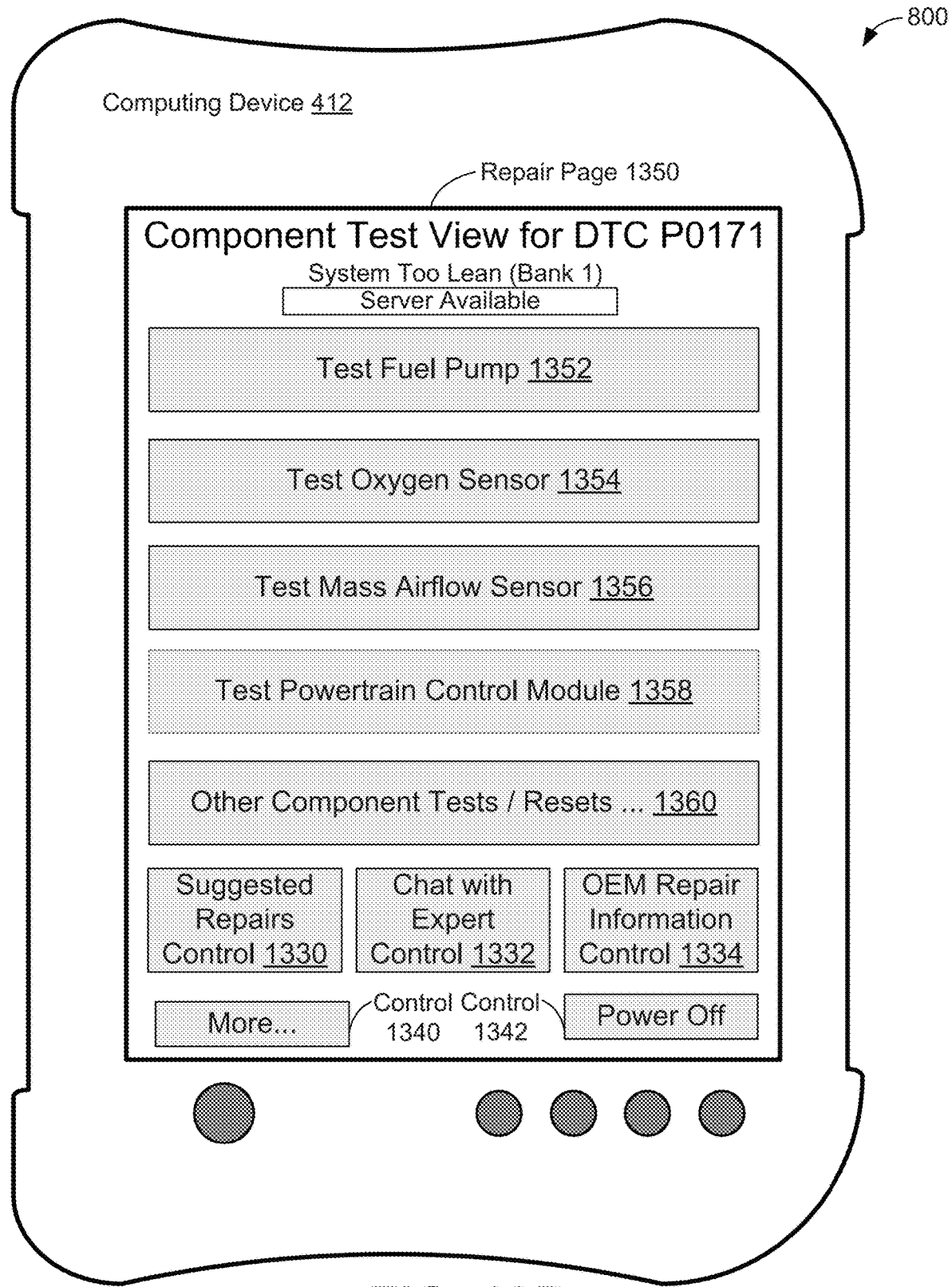

Scenario 800 continues with technician Tech1 selecting adaptive component testing control 1324 to activate the component test executable. In response, computing device 412 displays repair page 1350 as shown in FIG. 13B.

Repair page 1350 is related to the component test executable. Repair page 1350 provides a "Component Test View" with component tests and/or resets customized for a specific DTC; e.g., "DTC P0171". A component test can be used to obtain information about a specific component of vehicle V1, while a component reset can be used to set data for the component to factory-recommended and/or other initial values. In scenario 800, the customized tests and/or resets are selected by computing device 412 from the enhanced repair information provided by server S1.

More specifically, repair page 1350 includes controls 1352, 1354, 1356, 1358 for selection and execution of component tests and/or resets. Respective controls 1352, 1354, 1356, 1358, when selected, can cause computing device 412 to execute a respective "Fuel Pump", "Oxygen Sensor", "Mass Airflow Sensor", or "Powertrain Control Module" test on vehicle V1 and report results of the respective fuel pump, oxygen sensor, mass airflow sensor, or powertrain control executable test. Based on the results of one or more component tests, technician Tech1 can continue to repair vehicle V1 assisted by computing device 412 for executing further tests, scanning for additional DTCs/PIDs, replacing, removing, installing, adjusting, and/or otherwise modifying one or more vehicle components, etc.

Control 1360, when selected, can cause computing device 412 to provide additional component tests and/or resets for selection and execution than those already displayed on repair page 1350. Repair page 1350 also includes suggested repairs control 1330, chat with expert control 1332, OEM repair information control 1334, and controls 1340 and 1342— each of these controls can perform the same (or similar) functions for repair page 1350 as discussed above in the context of repair page 1300 shown in FIG. 13A.

Scenario 800 continues with technician Tech1 selecting the test fuel pump control 1352 from repair page 1350, which causes computing device 412 to activate the component test executable. As part of activating the component test executable, computing device 412 retrieves vehicle identifier V_CTE from storage and provides vehicle identifier V_CTE to the component test executable during activation. After activating the component test executable, computing device 412 uses the component test executable to execute the fuel pump test and presents results of the fuel pump test. Subsequently, technician Tech1 directs computing device 412 to return to repair page 1300 as shown in FIG. 13A. From repair page 1300, technician Tech1 selects adaptive functional testing control 1324 to activate the functional test executable. In response, computing device 412 displays repair page 1370, which is related to the functional test executable.

Figure 13C:
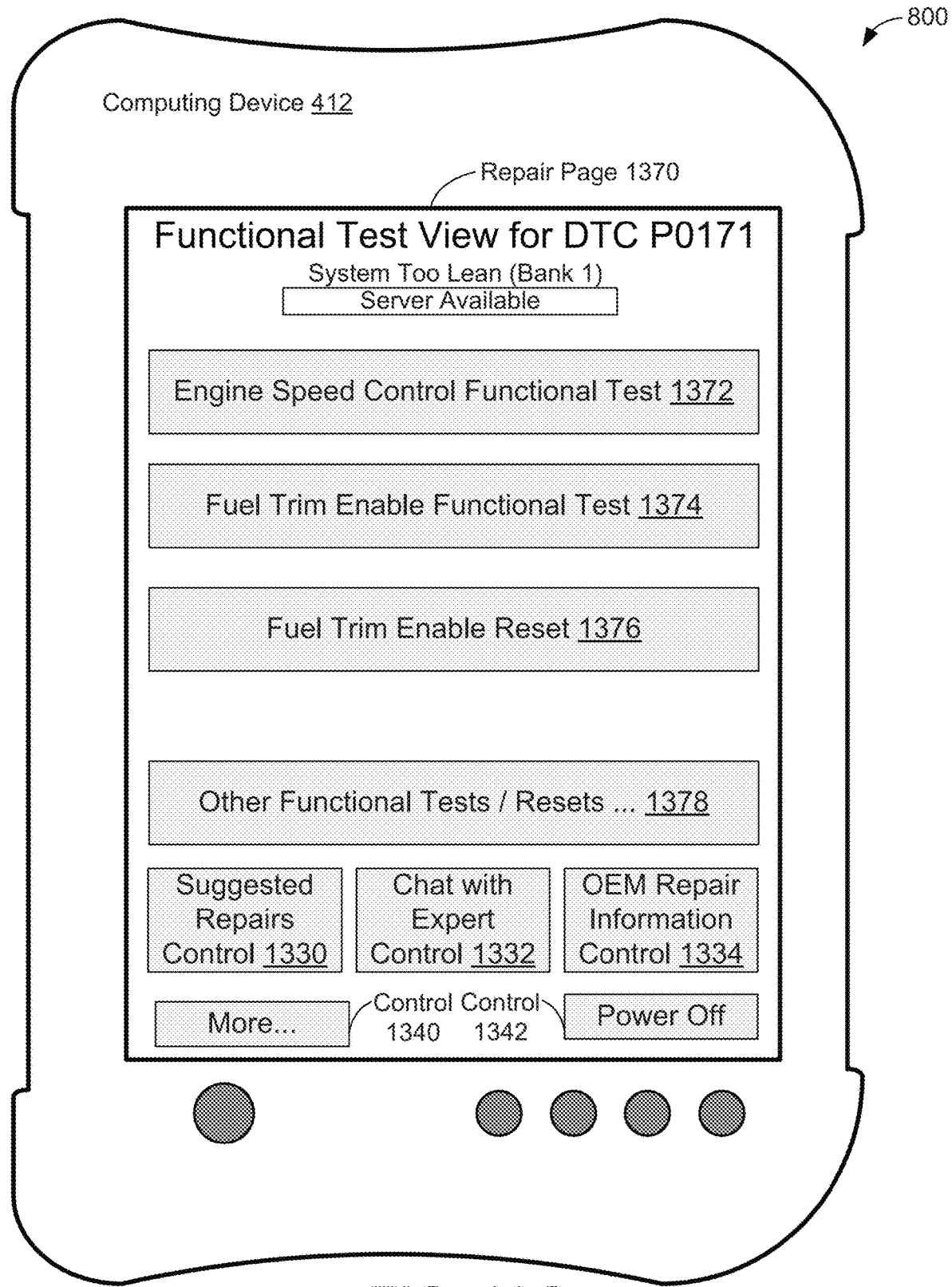

FIG. 13C shows that repair page 1370 provides a "Functional Test View" with functional tests and/or resets customized for a specific DTC; e.g., "DTC P0171". A functional test can be used to obtain information about a specific function of vehicle V1, while a component reset can be used to set data related to the specific function to factory-recommended and/or other initial values. In scenario 800, the customized tests and/or resets are selected by computing device 412 from the enhanced repair information provided by server S1.

More specifically, repair page 1370 includes controls 1372, 1374, 1376 for selection and execution of the customized functional tests and/or resets. Respective controls 1372, 1374, 1376, when selected, can cause computing device 412 to execute a respective "Engine Speed Control Functional Test", "Fuel Trim Enable Functional Test", or "Fuel Trim Reset" on vehicle V1 and report results of the respective functional test or functional reset. Based on the results of the functional test or reset, technician Tech1 can continue to repair vehicle V1 by executing further tests, scanning for additional DTCs/PIDs, replacing, removing, installing, adjusting, and/or otherwise modifying one or more vehicle components, etc.

Control 1378, when selected, can cause computing device 412 to provide additional functional tests and/or resets for selection and execution than those already displayed on repair page 1370. Repair page 1370 also includes suggested repairs control 1330, chat with expert control 1332, OEM repair information control 1334, and controls 1340 and 1342— each of these controls can perform the same (or similar) functions for repair page 1370 as discussed above in the context of repair page 1300 shown in FIG. 13A.

Scenario 800 continues with computing device 412 receiving selection of control 1372 to execute an engine speed functional test, which causes computing device 412 to activate the functional test executable. As part of activating the functional test executable, computing device 412 retrieves vehicle identifier V_FTE from storage and provides vehicle identifier V_FTE to the functional test executable during activation. After activating the functional test executable, computing device 412 uses the functional test executable to execute the engine speed functional test and presents results of the engine speed functional test.

Figure 13D:
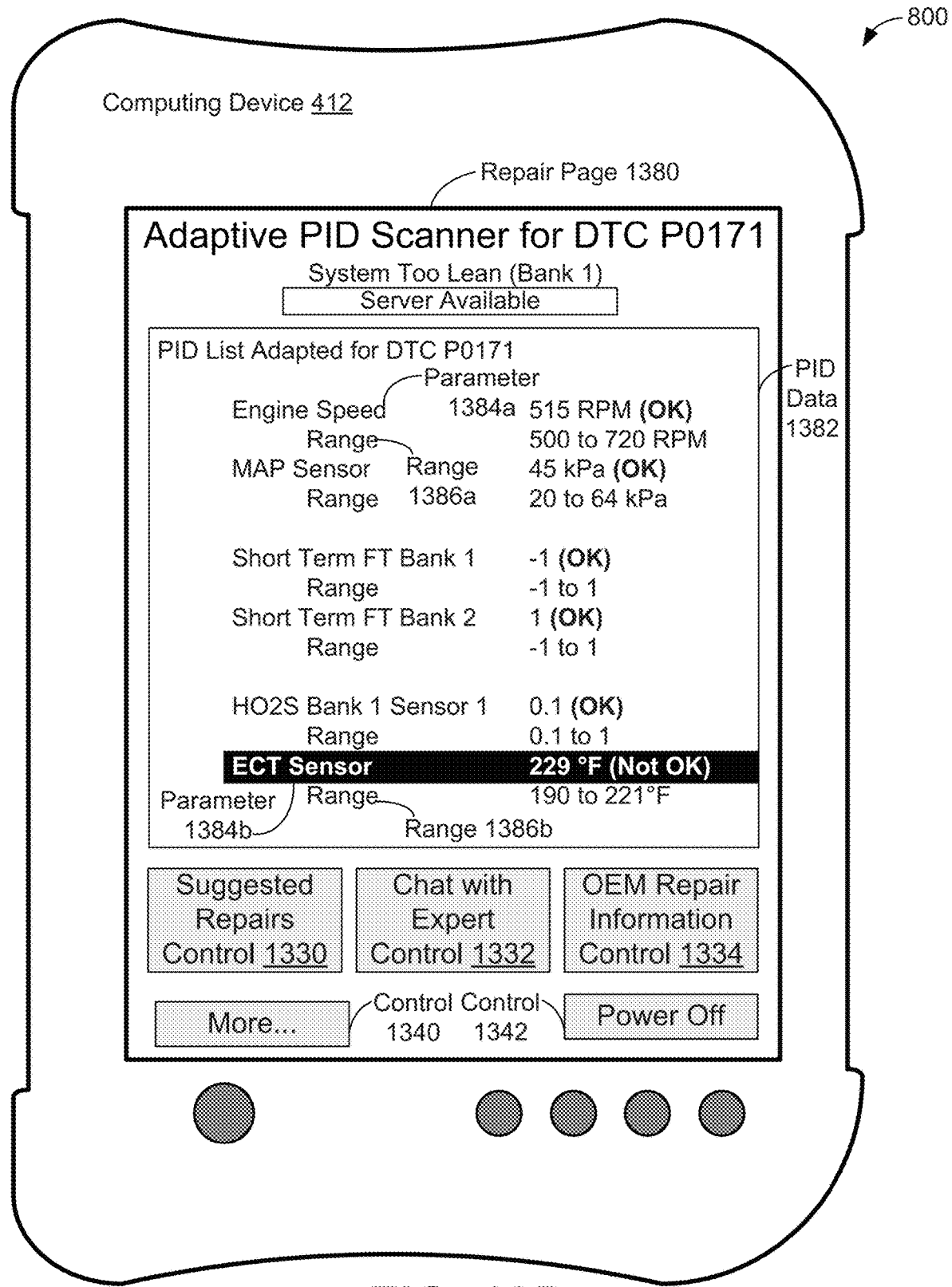

After the results of the engine speed functional test have been presented by computing device 412, technician Tech1 directs computing device 412 to request data from vehicle V1 related to six PIDs listed on a PID list. Computing device then displays repair page 1380 for an "Adaptive PID Scanner for DTC P0171" as shown in FIG. 13D.

Repair page 1380 includes a "PID List Adapted for DTC P0171" showing PID data 1382 for six parameters: "Engine Speed", "MAP Sensor", "Short Term FT Bank 1". "Short Term FT Bank 2", "HO2S Bank 1 Sensor 1", and "ECT Sensor" with corresponding respective data of "515 RPM", "45 kPa", "−1", "1", "0.1", and "229° F.". A recommended range of data values and an indication of data being in or out of range for each parameter are also provided on repair page 1380. For example, parameter 1384a, which is the "Engine Speed" parameter, has a value of "515 RPM". The value of 515 RPM for parameter 1384a is indicated on repair page 1380 as being "OK"; that is, the value of 515 RPM for parameter 1384a is within range 1386a of "500 to 720 RPM".

As another example, parameter 1384b, which is the "ECT Sensor" parameter, has a value of "229° F.". The value of 229° F. for parameter 1384b is indicated on repair page 1380 as being "Not OK"; that is, the value of 229° F. for parameter 1384b is outside of range 1386b of "190 to 221° F.". Repair page 1380 provides additional graphical indications of parameters that are in range or not in range. In particular, FIG. 13D illustrates repair page 1380 showing in-range parameter values, such as the value of parameter 1384a, with black text on a white background and showing not-of-range parameter values, such as the value of parameter 1384b, with white text on a black background. In other scenarios, more and/or different graphical indications of parameters that are in range and/or not in range are used.

Figure 13E:
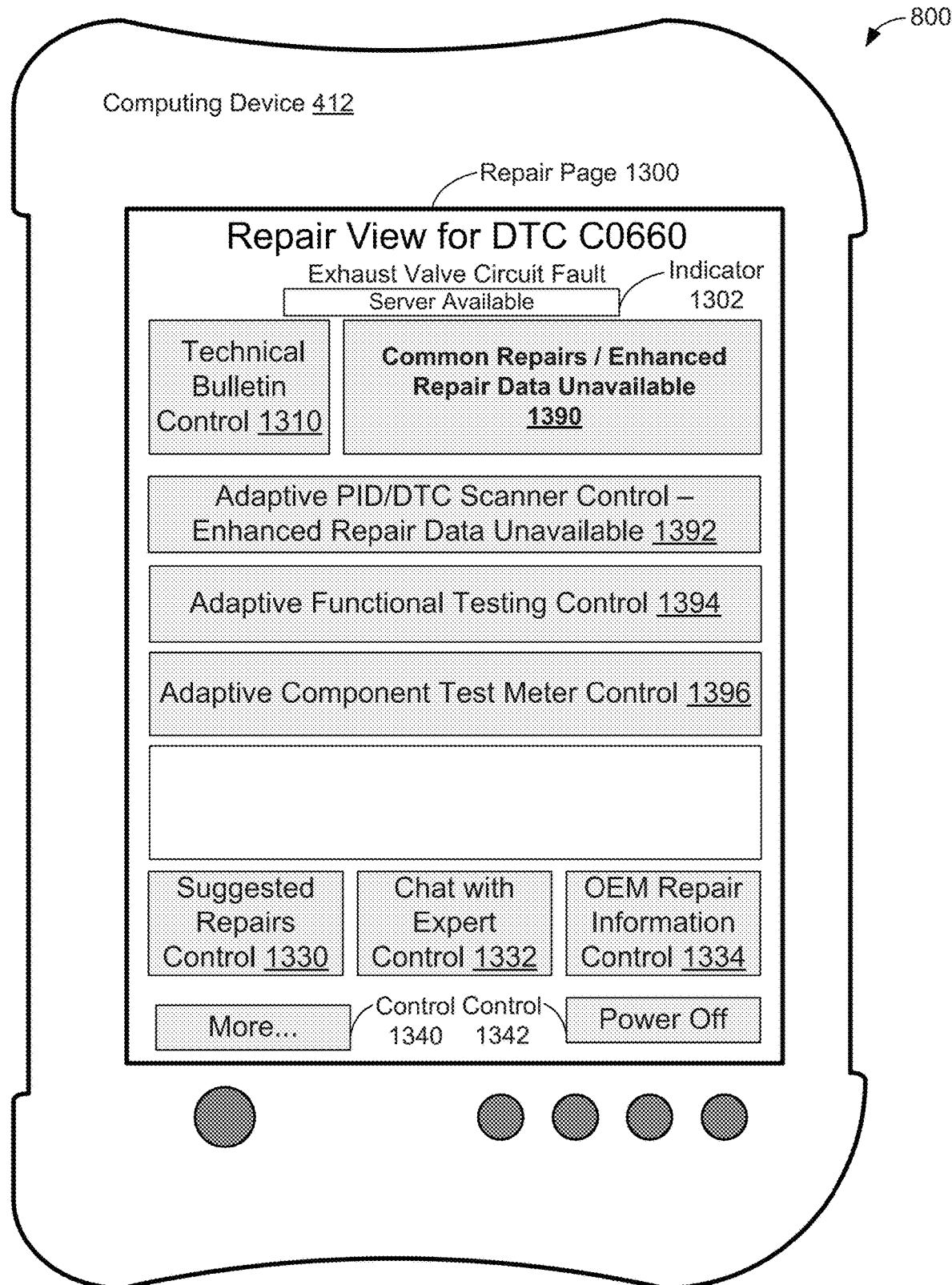

Subsequently, technician Tech1 directs computing device 412 to display a repair view for DTC C0660, which is a DTC that is unrelated to DTC P0171 discussed above. Computing device then displays repair page 1300 for "DTC C0660" as shown in FIG. 13E. FIG. 13E indicates that a title for DTC C0660 is "Exhaust Valve Circuit Fault" and uses indicator 1302 to that the server is "Available" to computing device 412. However, at this stage of scenario 800, the server determines that no non-default information is available for DTC C0660 based on the previous scans and tests performed on vehicle V1. Subsequently, display 1390 indicates that "Common Repairs" and "Enhanced Repair Data" is "Unavailable" for this specific DTC; e.g., DTC C0660. Also, control 1392 for "Adaptive PID/DTC Scanner Control" indicates that "Enhanced Repair Data: is "Unavailable". Repair page 1300 also includes default controls 1394 and 1396 for respective "Functional Testing" and a "Component Test Meter". Repair page 1300 also includes suggested repairs control 1330, chat with expert control 1332, OEM repair information control 1334, and controls 1340 and 1342—each of these controls can perform the same (or similar) functions for repair page 1300 as discussed above in the context of FIG. 13A. After repair page 1300 as shown in FIG. 13E is displayed, scenario 800 is completed.

Returning to scenario 800a, after computing device 412 receives the selection for DTC P0171, computing device 412 subsequently displays repair page 1400 based on the enhanced repair information.

Figure 14A:
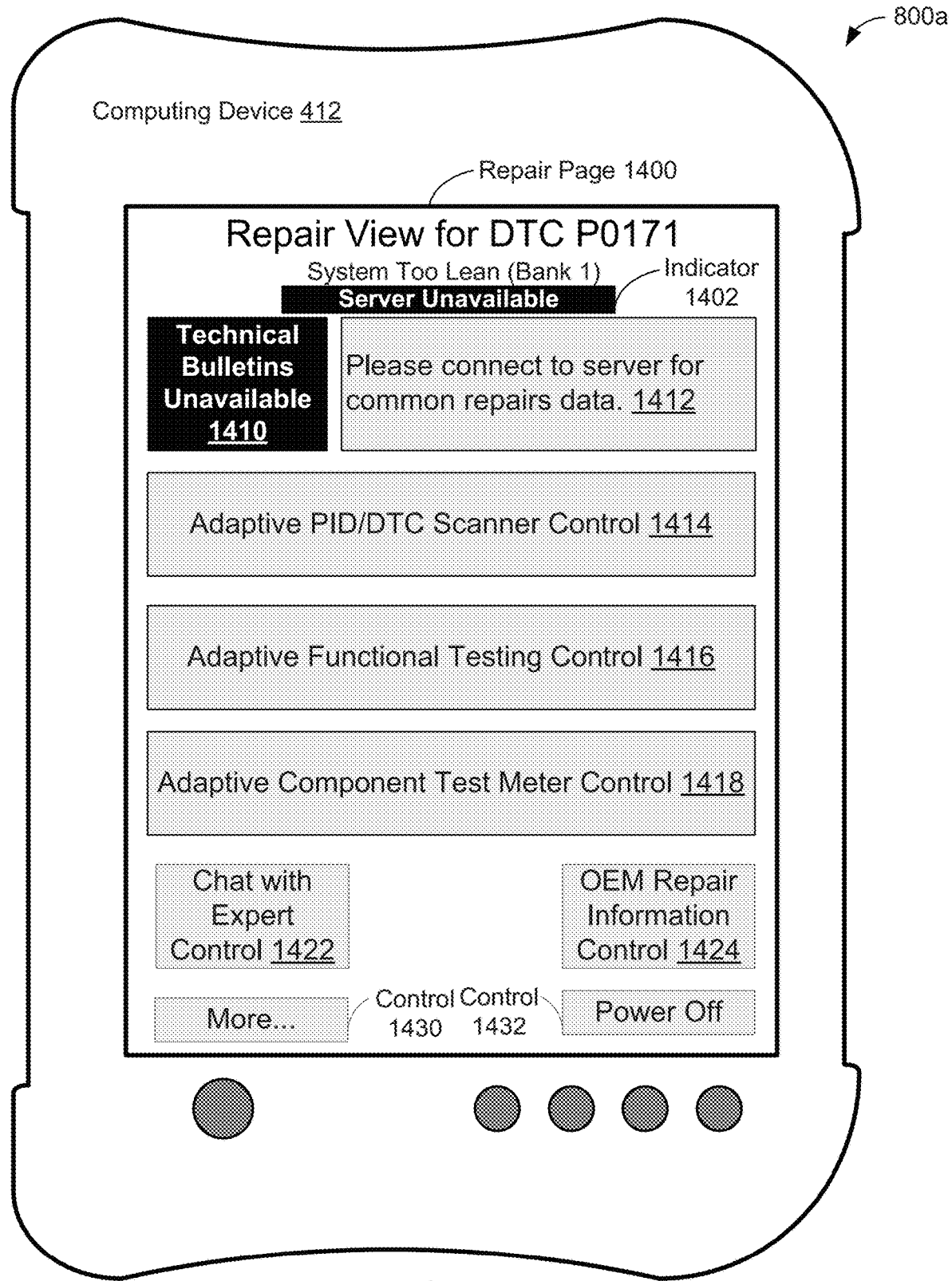

FIG. 14A shows repair page 1400, which is a default repair page related to "DTC P0171"; that is, a repair page related to DTC P0171 that is not been modified based on information from the server since computing device 412 is not connected to the server. Repair page 1400 includes indicator 1402 showing that the "Server" is "Unavailable"; i.e., server S1 is not connected to computing device 412. Repair page 1400 also includes displays 1410, 1412 and controls 1414, 1416, 1418, 1422, 1424, 1430, and 1432.

Display 1410 indicates that technical bulletins are unavailable; i.e., since computing device 412 is not connected to server S1. Display 1412 instructs technician Tech1 to "connect to server [S1] for common repairs data", as a further indication that computing device 412 is not connected to server S1.

Adaptive PID/DTC scanner control 1414, when selected, can cause computing device 412 to activate the adaptive PID scanner executable and/or redisplay scanner executable page 1200 with the DTCs obtained from vehicle V1. Adaptive functional testing control 1416, when selected, can cause computing device 412 to display a repair page associated with the functional test executable and/or activate the functional test executable. Adaptive component test meter control 1418, when selected, can cause computing device 412 to display a repair page associated with the component test executable and/or activate the component test executable.

Chat with expert control 1422, when selected, can cause computing device 412 to initiate communications with one or more persons that have expertise related to repairing vehicle faults, as described above in the context of chat with expert control 1332. OEM repair information control 1424, when selected, can cause computing device 412 to provide original equipment manufacturer information about vehicles that are similar to or the same as vehicle V1, as described above in the context of OEM repair information control 1334.

Control 1430, when selected, can cause computing device 412 to provide any other available controls, information, options, etc. related to repairing a vehicle generating a specific DTC; in this example, DTC P0171. Control 1432, when selected, can cause computing device 412 to power down.

Scenario 800a continues with technician Tech1 selecting adaptive component test meter control 1418 to activate the component test executable. In response, computing device 412 displays repair page 1450 as shown in FIG. 14B.

Repair page 1450 is related to the component test executable and is a default page presented when a "Server" is "Unavailable" as indicated by indicator 1402. Repair page 1450 provides access to a default set of component tests and/or resets that may be related to specific DTC; e.g., "DTC P0171".

More specifically, repair page 1450 includes controls 1452, 1454, 1456, 1458 for selection and execution of component tests and/or resets. Respective controls 1452, 1454, 1456, 1458, when selected, can cause computing device 412 to execute a respective "Fuel Pressure Regulator", "Fuel Pump", "Powertrain Control Module", or "Oxygen Sensor" test on vehicle V1 and report results of the respective fuel pressure regulator, fuel pump, powertrain control executable, or oxygen sensor test. Based on the results of one or more component tests, technician Tech1 can continue to repair vehicle V1 assisted by computing device 412 for executing further tests, scanning for additional DTCs/PIDs, replacing, removing, installing, adjusting, and/or otherwise modifying one or more vehicle components, etc. Note that the default set of tests and/or resets available via controls 1452, 1454, 1456, 1458 of repair page 1450 differs from the customized set of tests and/or resets available via controls 1352, 1354, 1356, 1358 of repair page 1350; that is, the customization performed by server S1 for scenario 800 changes the default set of component tests for scenario 800a.

Figure 14B:
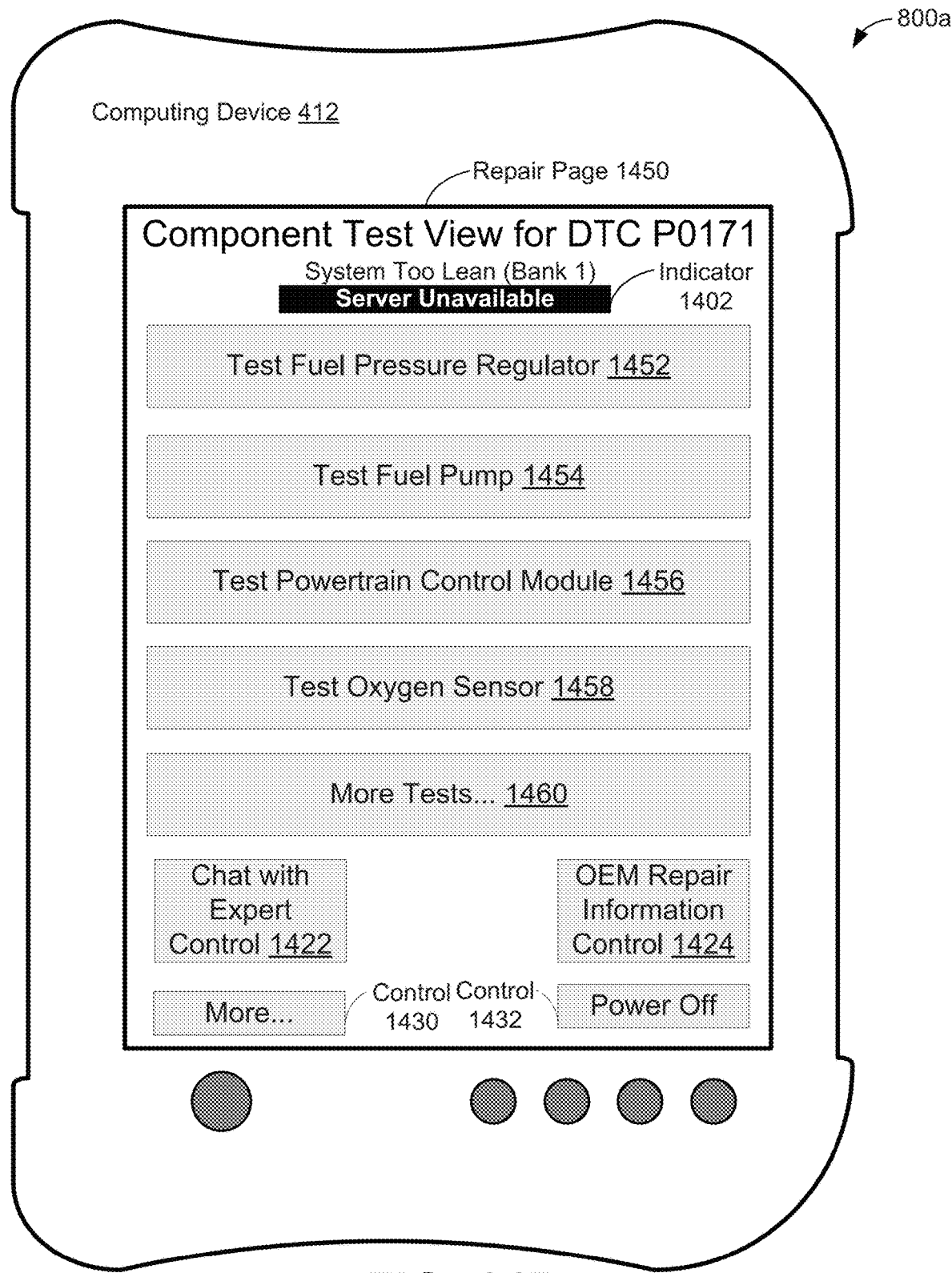

FIG. 14B indicates that control 1460, when selected, can cause computing device 412 to provide additional component tests and/or resets for selection and execution than those already displayed on repair page 1450. Repair page 1450 also includes chat with expert control 1422, OEM repair information control 1424, and controls 1430 and 1432—each of these controls can perform the same (or similar) functions for repair page 1450 as discussed above in the context of repair page 1400 shown in FIG. 14A.

Scenario 800a continues with technician Tech1 selecting the test fuel pressure regulator control 1452 from repair page 1450, which causes computing device 412 to activate the component test executable. As part of activating the component test executable, computing device 412 retrieves vehicle identifier V_CTE from storage and provides vehicle identifier V_CTE to the component test executable during activation. After activating the component test executable, computing device 412 uses the component test executable to execute the fuel pressure regulator and presents results of the fuel pressure regulator test. Subsequently, technician Tech1 directs computing device 412 to return to repair page 1400 as shown in FIG. 14A. From repair page 1400, technician Tech1 selects adaptive functional testing control 1416 to activate the functional test executable. In response, computing device 412 displays repair page 1470, which is related to the functional test executable.

Figure 14C:
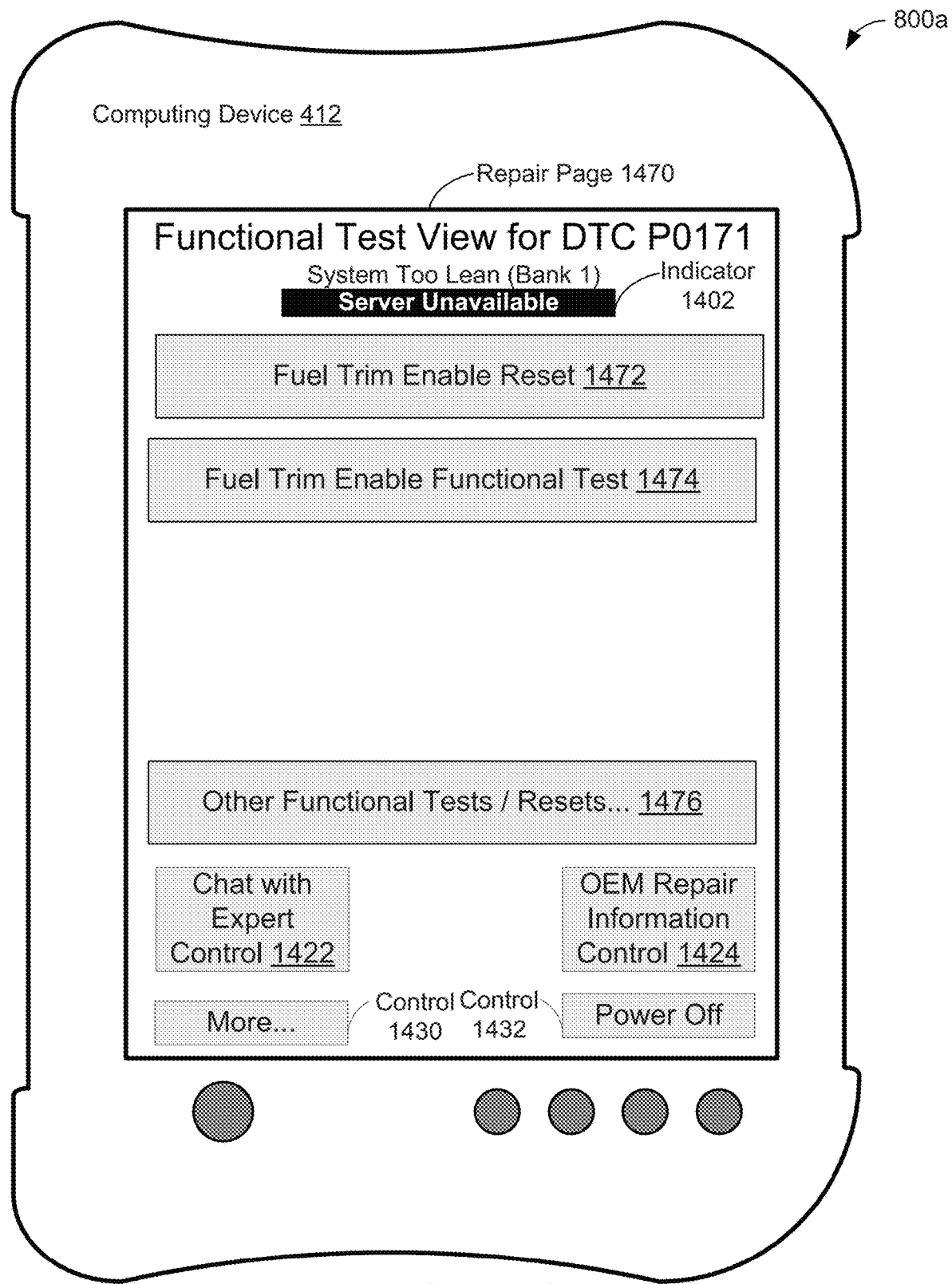

FIG. 14C shows that repair page 1470 provides a "Functional Test View" and is a default page presented when a "Server" is "Unavailable" as indicated by indicator 1402. Repair page 1470 provides access to a default set of functional tests and/or resets that may be related to specific DTC; e.g., "DTC P0171".

More specifically, repair page 1470 includes controls 1472, 1474 for selection and execution of the default set of functional tests and/or resets. Respective controls 1372, 1374, when selected, can cause computing device 412 to execute a respective "Fuel Trim Reset" or "Fuel Trim Enable Functional Test" on vehicle V1 and report results of the respective functional test or reset. Based on the results of the functional test or reset, technician Tech1 can continue to repair vehicle V1 by executing further tests, scanning for additional DTCs/PIDs, replacing, removing, installing, adjusting, and/or otherwise modifying one or more vehicle components, etc. Note that the default set of tests and/or resets available via controls 1472, 1474 of repair page 1470 differs from the customized set of tests and/or resets available via controls 1372, 1374, 1376 of repair page 1350; that is, the customization of functional tests performed by server S1 for scenario 800 changes the default set of functional tests used in scenario 800a.

FIG. 14C indicates that control 1476, when selected, can cause computing device 412 to provide additional functional tests and/or resets for selection and execution than those already displayed on repair page 1470. Repair page 1470 also includes chat with expert control 1422, OEM repair information control 1424, and controls 1430 and 1432—each of these controls can perform the same (or similar) functions for repair page 1470 as discussed above in the context of repair page 1400 shown in FIG. 14A.

Scenario 800a continues with computing device 412 receiving selection of control 1472 to execute a fuel trim enable reset, which causes computing device 412 to activate the functional test executable. As part of activating the functional test executable, computing device 412 retrieves vehicle identifier V_FTE from storage and provides vehicle identifier V_FTE to the functional test executable during activation. After activating the functional test executable, computing device 412 uses the functional test executable to execute the fuel trim enable reset and presents results related to the fuel trim enable reset.

Figure 14D:
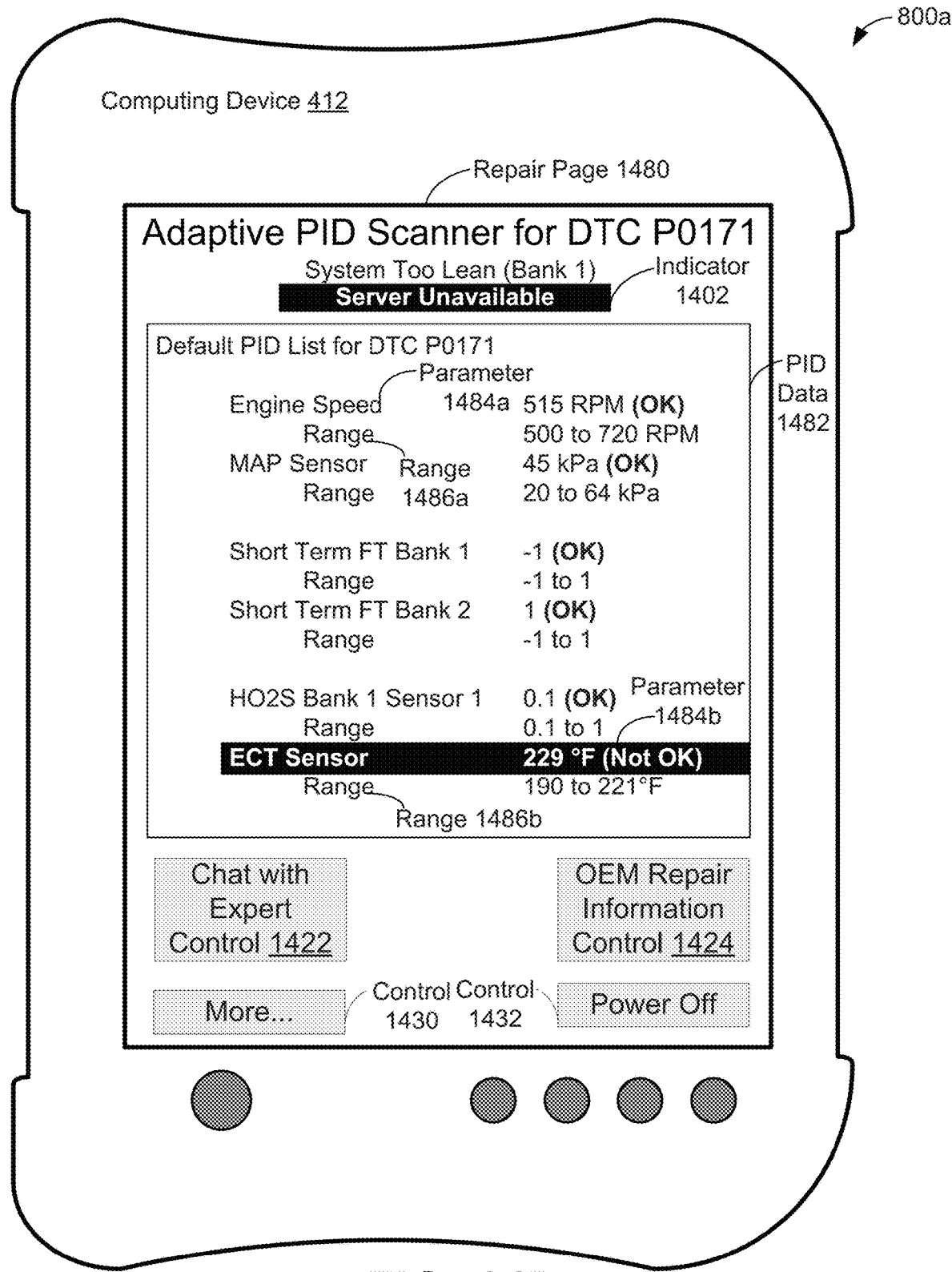

After the results of the fuel trim enable reset have been presented by computing device 412, technician Tech1 directs computing device 412 to request data from vehicle V1 related to six PIDs listed on a PID list. Computing device then displays repair page 1480 for a "Default PID List for DTC P0171" as shown in FIG. 14D. In scenarios 800 and 800a, the adapted PID list provided by server S1 in scenario 800 and illustrated by repair page 1380 of FIG. 13D is the same PID list as the default PID list of scenario 800a illustrated by repair page 1480 of FIG. 14D. In other scenarios, adapted PID lists provided by server S1 may, but need not, differ from default PID lists.

Repair page 1480 shows PID data 1482 for six parameters: "Engine Speed", "MAP Sensor", "Short Term FT Bank 1". "Short Term FT Bank 2", "HO2S Bank 1 Sensor 1", and "ECT Sensor" with corresponding respective data of "515 RPM", "45 kPa", "−1", "1", "0.1", and "229". A recommended range of data values and an indication of data being in or out of range for each parameter are also provided on repair page 1480. For example, parameter 1484a, which is the "Engine Speed" parameter, has a value of "515 RPM". The value of 515 RPM for parameter 1484a is indicated on repair page 1480 as being "OK"; that is, the value of 515 RPM for parameter 1484a is within range 1486a of "500 to 720 RPM".

As another example, parameter 1484b, which is the "ECT Sensor" parameter, has a value of "229° F.". The value of 229° F. for parameter 1484b is indicated on repair page 1480 as being "Not OK"; that is, the value of 229° F. for parameter 1484b is outside of range 1486b of "190 to 221° F.". Repair page 1480 provides additional graphical indications of parameters that are in range or not in range. In particular, FIG. 14D illustrates repair page 1480 showing in-range parameter values, such as the value of parameter 1484a, with black text on a white background and showing not-of-range parameter values, such as the value of parameter 1484b, with white text on a black background. In other scenarios, more and/or different graphical indications of parameters that are in range and/or not in range are used. After displaying repair page 1480, scenario 800a can be completed.

Example Computing Network

Figure 15:
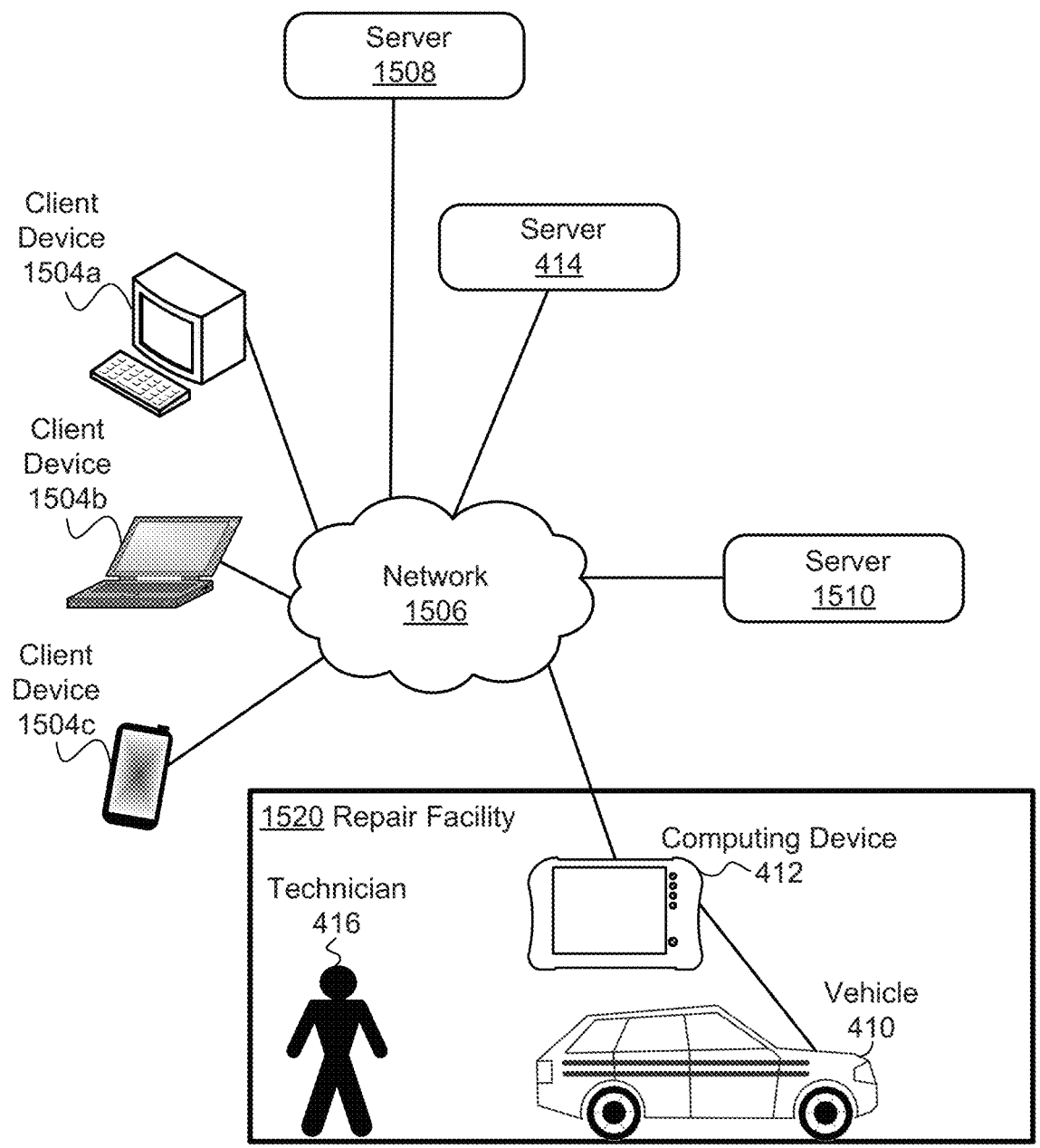
FIG. 15 is a block diagram of an example computing network, in accordance with an embodiment.

FIG. 15 is a block diagram of example computing network 1500 in accordance with an example embodiment. In FIG. 15, servers 3414, 1508, and 1510 are configured to communicate, via a network 1506, with computing device 412 at repair facility 1520 and perhaps with technician 416, as well as with client devices 1504a, 1504b, and 1504c. As shown in FIG. 15, client devices can include a personal computer 1504a, a laptop computer 1504b, and a smartphone 1504c. More generally, client devices 1504a-1504c (or any additional client devices) can be any sort of computing device, such as a workstation, network terminal, desktop computer, laptop computer, wireless communication device (e.g., a cell phone or smart phone), and so on. Server 414 is discussed above in the context of at least FIGS. 4-13E. Computing device 412 at repair facility 1520 is also discussed above in the context of at least FIGS. 4-14D. In the context of computing network 1500, computing device 412 can act as a client device.

Network 1506 can correspond to a local area network, a wide area network, a corporate intranet, the public Internet, combinations thereof, or any other type of network(s) configured to provide communication between networked computing devices. In some embodiments, part or all of the communication between networked computing devices can be secured.

Servers 414, 1508, and 1510 can share content and/or provide content at least to computing device 412 and client devices 1504a-1504c, where the content can include images, video, audio, computer-readable data, and/or other types of available information directly or indirectly accessible via servers 414, 1508, and 1510. As shown in FIG. 15, servers 414, 1508, and 1510 are not physically at the same location. Alternatively, some or all servers 414, 1508, and 1510 can be co-located, and/or can be accessible via one or more networks separate from network 1506. Although FIG. 15 shows four client devices (including computing device 412) and three servers, network 1506 can service more or fewer than four client devices and/or more or fewer than three servers.

Example Computing Device

Figure 16A:
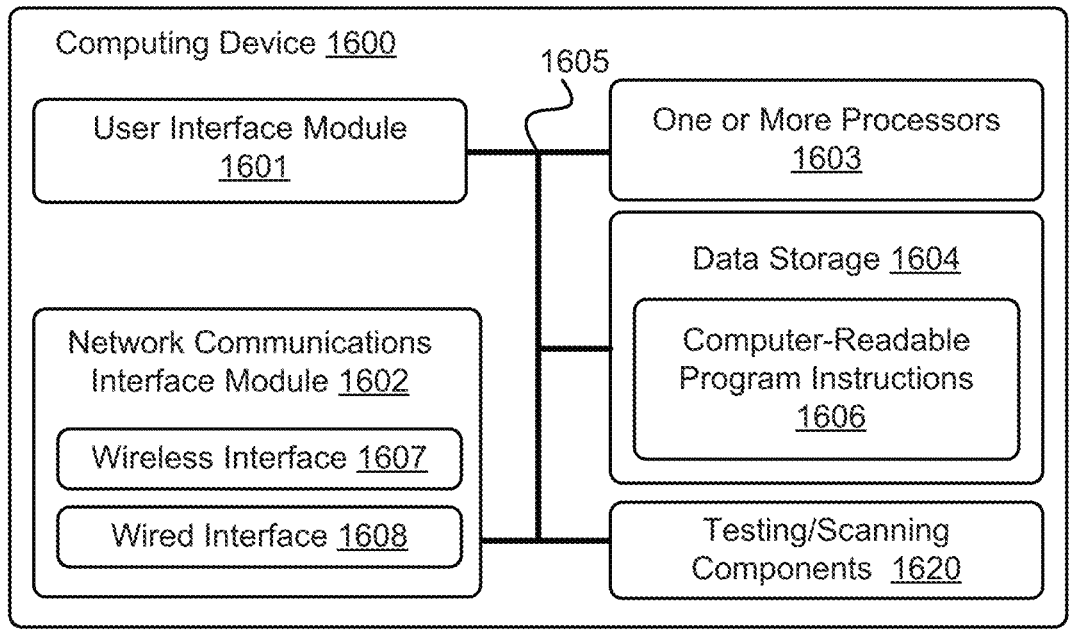
FIG. 16A is a block diagram of an example computing device, in accordance with an embodiment.

FIG. 16A is a block diagram of an example computing device 1600, in accordance with an embodiment. In particular, computing device 1600 can be configured to perform one or more functions of and/or related to herein-described VII, herein-described vehicle identifiers, a herein-described vehicle scan tool, a herein-described server, herein-described enhanced repair data, a herein-described software executable, vehicle identifier file 310, enhanced repair data 330, vehicle 410, computing device 412, server 414, server S1, vehicle V1, client devices 1504a-1504c, network 1506, and/or servers 1508, 1510 and/or at least a portion of one or more of: method 200, communication flow 400, communication flow 500, communication flow 600, communication flow 700, scenario 800, scenario 800a, and/or method 1700.

Computing device 1600 can be a desktop computer, laptop or notebook computer, personal data assistant (PDA), mobile phone, embedded processor, touch-enabled device, or any similar device that is equipped with at least one processing unit capable of executing machine-language instructions that implement at least a portion of the herein-described techniques and methods, including, but not limited to, method 200, communication flow 400, communication flow 500, communication flow 600, communication flow 700, scenario 800, scenario 800a, and/or method 1700.

Computing device 1600 may include a user interface executable 1601, a network communication interface executable 1602, one or more processors 1603, and data storage 1604, all of which may be linked together via a system bus, network, or other connection mechanism 1605. User interface module 1601 can receive input and/or provide output, perhaps to a user. User interface module 1601 can be configured to send and/or receive data to and/or from user input from input device(s), such as a keyboard, a keypad, a touch screen, a computer mouse, a track ball, a joystick, and/or other similar devices configured to receive input from a user of the computing device 1600.

User interface module 1601 can be configured to generate and/or provide visible output via one or more output display devices, such as cathode ray tubes (CRTs), liquid crystal displays (LCDs), plasma devices, light emitting diodes (LEDs), displays using digital light processing (DLP) technology, printers, light bulbs, monitors, touch screens, and/or other similar devices capable of displaying graphical, textual, and/or numerical information to a user of computing device 1600. User interface module 1601 can also be configured to generate and/or provide audible output(s) via one or more audio output devices, such as speakers, speaker jacks, audio output ports, earphones, and/or other similar devices configured to convey sound and/or audible information to a user of computing device 1600. User interface module 1601 can further be configured to generate and/or provide haptic output(s) via one or more haptic output devices, such as vibration devices and/or other devices configured to convey touch-related and/or haptic information to a user of computing device 1600.

Network communication interface module 1602 can be configured to send and receive data over wireless interface 1607 and/or wired interface 1608 via a network, such as network 1506. Wireless interface 1607 if present, can utilize an air interface, such as a Bluetooth®, Wi-Fi®, ZigBee®, and/or WiMAX™ interface to a data network, such as a wide area network (WAN), a local area network (LAN), one or more public data networks (e.g., the Internet), one or more private data networks, or any combination of public and private data networks. Wired interface(s) 1608, if present, can comprise a wire, cable, fiber-optic link and/or similar physical connection(s) to a data network, such as a WAN, LAN, one or more public data networks, one or more private data networks, or any combination of such networks. Network communication interface module 1602 can be configured to communicate with one or more vehicles, such as vehicle 410, using one or more communications interfaces; e.g., an OBD-II protocol interface, a Bluetooth® interface, a Wi-Fi® interface, a ZigBee® interface.

In some embodiments, network communication interface module 1602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications. In some cases, such communications can also, or instead, be compressed communications; in these cases, network communication interface module 1602 can be configured to compress uncompressed communications and/or decompress compressed communications.

Processor(s) 1603 can include one or more central processing units, computer processors, mobile processors, digital signal processors (DSPs), graphics processing units (GPUs), microprocessors, computer chips, and/or other processing units configured to execute machine-language instructions and process data. Processor(s) 1603 can be configured to execute computer-readable program instructions 1606 that are contained in data storage 1604 and/or other instructions as described herein.

Data storage 1604 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 1604 can include one or more physical and/or non-transitory storage devices with at least enough combined storage capacity to contain computer-readable program instructions 1606 and any associated/related data and data structures.

In embodiments of the disclosure in which a computer software product is used, the product may be non-transitory and store instructions on one or more physical media and/or devices, such as a DVD, a solid state drive, a hard drive, or any other non-transitory computer-readable media or storage devices disclosed herein. Alternatively, the product may be transitory and in the form of instructions provided over a connection such as a network connection which is linked to a network such as the Internet.

Computer-readable program instructions 1606 and any data structures contained in data storage 1604 include computer-readable program instructions executable by processor(s) 1603 and any storage required, respectively, to perform at least part of herein-described of the herein-described techniques and methods, including, but not limited to, method 200, communication flow 400, communication flow 500, communication flow 600, communication flow 700, scenario 800, scenario 800*a*, and/or method 1700.

Testing/scanning components 1620 can include components for scanning, testing, and/or repairing a vehicle. These components can include, but are not limited to, one or more OBD-II (i.e., DTC/PID) scanners, electronic measuring components, test leads, data ports, power supplies, digital oscilloscopes, digital ammeters, digital voltmeters, digital ohmmeters, and digital multi-meters. In some embodiments, some or all of the herein described software executables can be included as testing/scanning components 1620. In other embodiments, testing/scanning components 1620 and/or data storage 1604 can store VII and/or one or more vehicle identifiers, perhaps by storing one or more vehicle identifier files and/or one or more instances of enhanced repair data.

Figure 16B:
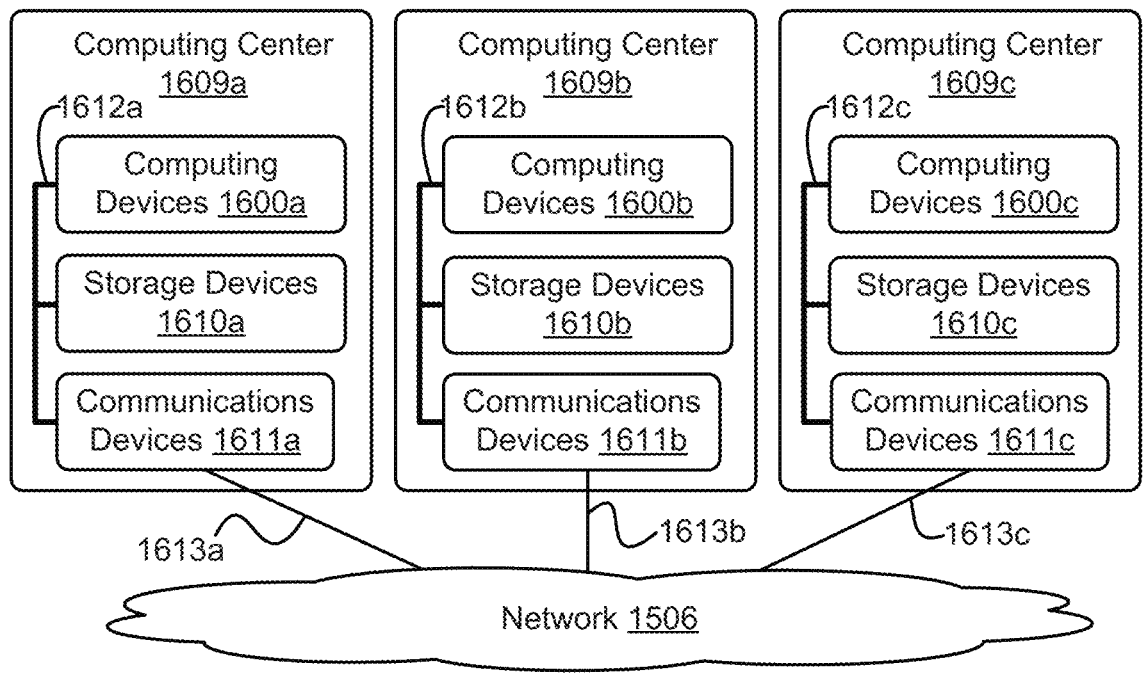
FIG. 16B depicts an example network of computing centers, in accordance with an embodiment.

FIG. 16B depicts a network 1506 of computing centers 1609*a*, 1609*b*, 1609*c* in accordance with an example embodiment. Data and/or software for server 414 and/or server S1 can be stored on one or more cloud-based devices that store program logic and/or data of cloud-based applications and/or services. In some embodiments, server 414 and/or server S1 can be a single computing device residing in a single computing center. In other embodiments, server 414 and/or server S1 can include multiple computing devices in a single computing center, or even multiple computing devices located in multiple computing centers located in diverse geographic locations.

In some embodiments, data and/or software for server 414 and/or server S1 can be encoded as computer readable information stored in computer readable media and/or non-transitory computer readable storage media and accessible by client devices 1504*a*, 1504*b*, and 1504*c*, and/or other computing devices (e.g., computing device 412). In some embodiments, data and/or software for server 414 and/or server S1 can be stored on a single disk drive or other non-transitory and/or tangible storage media, or can be implemented on multiple disk drives or other non-transitory and/or tangible storage media located at one or more diverse geographic locations.

FIG. 16B depicts a cloud-based server system in accordance with an example embodiment. In FIG. 16B, the functions of server 414 and/or server S1 can be distributed among three computing centers 1609*a*, 1609*b*, and 1608*c*. Computing center 1609*a* can include one or more computing devices 1600*a*, storage devices 1610*a*, and communication devices 1611*a* (e.g., router(s), hub(s), switch(es)) connected by local network 1612*a*. Similarly, computing center 1609*b* can include one or more computing devices 1600*b*, storage devices 1610*b*, and communication devices 1611*b* connected by local network 1612*b*. Likewise, computing center 1609*c* can include one or more computing devices 1600*c*, storage devices 1610*c*, and communication devices 1611*c* connected by local network 1612*c*.

In some embodiments, each of computing centers 1609*a*, 1609*b*, and 1609*c* can have equal numbers of computing, storage, and communication devices. In other embodiments, however, each computing center can have different numbers of computing, storage, and/or communication devices. The number of computing, storage, and communication devices in each computing center can depend on the computing task or tasks assigned to each computing center.

In computing center 1609a, for example, computing devices 1600a can be configured to perform various computing tasks of server 414 and/or server S1. In one embodiment, the various functionalities of server 414 and/or server S1 can be distributed among one or more of computing devices 1600a, 1600b, and 1600c. Computing devices 1600b and 1600c in computing centers 1609b and 1609c can be configured similarly to computing devices 1600a in computing center 1609a. On the other hand, in some embodiments, computing devices 1600a, 1600b, and 1600c can be configured to perform different functions.

In some embodiments, computing tasks and stored data associated with server 414 and/or server S1 can be distributed across computing devices 1600a, 1600b, and 1600c based at least in part on the processing requirements of server 414 and/or server S1, the processing capabilities of computing devices 1600a, 1600b, and 1600c, the latency of the network links between the computing devices in each computing center and between the computing centers themselves, and/or other factors that can contribute to the cost, speed, fault-tolerance, resiliency, efficiency, and/or other design goals of the overall system architecture.

The storage devices 1610a, 1610b, and 1610c of computing centers 1609a, 1609b, and 1609c can be data storage arrays that include disk array controllers configured to manage read and write access to groups of hard disk drives. The disk array controllers, alone or in conjunction with their respective computing devices, can also be configured to manage backup or redundant copies of the data stored in the storage devices to protect against disk drive or other storage device failures and/or network failures that prevent one or more computing devices from accessing one or more storage devices.

Similar to the manner in which the functions of server 414 and/or server S1 can be distributed across computing devices 1600a, 1600b, and 1600c of computing centers 1609a, 1609b, and 1609c, various active portions and/or backup portions of these components can be distributed across storage devices 1610a, 1610b, and 1610c. For example, some storage devices can be configured to store one portion of the data and/or software of server 414 and/or server S1, while other storage devices can store other, separate portions of the data and/or software of server 414 and/or server S1. Additionally, some storage devices can be configured to store backup versions of data and/or software stored in other storage devices.

Communication devices 1611a, 1611b, and 1611c can include networking equipment configured to provide internal and external communications for computing centers 1609a, 1609b, 1609c. For example, communication devices 1611a in computing center 1609a can include one or more internet switching and routing devices configured to provide (i) local area network communications between computing devices 1600a and storage devices 1610a via local network 1612a, and (ii) wide area network communications between computing center 1609a and the computing facilities 1609b and 1609c via connection 1613a to network 1506. Communication devices 1611b and 1611c can include network equipment similar to communication devices 1611a, and communication devices 1611b and 1611c can perform similar networking functions for computing centers 1609b and 1609b that communication devices 1611a perform for computing center 1609a.

In some embodiments, the configuration of communication devices 1611a, 1611b, and 1611c can be based at least in part on the communication requirements of the computing devices and storage devices, the communications capabilities of network equipment in the communication devices 1611a, 1611b, and 1611c, the latency and throughput of local networks 1612a, 1612b, 1612c, the latency, throughput, and cost of connections 1613a, 1613b, and 1613c, and/or other factors that can contribute to the cost, speed, throughput, fault-tolerance, resiliency, efficiency and/or other design goals for computing centers 1609a, 1609b, 1609c.

Example Methods of Operation

FIG. 17 is a flow chart of method 1700, in accordance with an embodiment. Method 1700 can be carried out by a computing device, such as computing device 1600 discussed above in the context of FIG. 16. In some embodiments, the computing device can act and/or be embodied as a vehicle scan tool while carrying out part or all of method 1700.

Method 1700 can begin at block 1710, where the computing device can determine VII that identifies a vehicle and where the computing device includes a first software executable and a second software executable, such as discussed above at least in the context of FIGS. 2-14D.

In some embodiments, the computing device can be connected to the vehicle; then, determining the VII can include: sending a request for the VII from the computing device to the vehicle; and receiving the VII at the computing device from the vehicle, such as discussed above at least in the context of FIGS. 2, 3, 6, and 7.

In other embodiments, the VII can include a VIN for the vehicle, such as discussed above at least in the context of FIGS. 2-10C.

In still other embodiments, the first software executable can be configured for one or more functions of: a vehicle scanning function, a vehicle testing function, and a repair-information retrieval function, such as discussed above at least in the context of FIGS. 2-14D.

At block 1720, the computing device can store, a first vehicle identifier associated with the first software executable and a second vehicle identifier associated with the second software executable, where both the first and second vehicle identifiers are based on the VII, and where the first vehicle identifier differs from the second vehicle identifier, such as discussed above at least in the context of FIGS. 2-10C.

In some embodiments, the computing device can be communicatively coupled to a server computing device; then, storing the first vehicle identifier associated with the first software executable and the second vehicle identifier associated with the second software executable can include: providing a first query to the server computing device, the first query based on an identifier of the first software executable and the VII; after providing the first query to the server computing device, receiving a first query response to the first query from the server computing device; determining the first vehicle identifier based on the first query response; and storing the first vehicle identifier at the computing device, such as discussed above at least in the context of FIGS. 2, 3, 6, and 7.

In other embodiments, the computing device can include an identifier database and the computing devices is not communicatively coupled to a server computing device for determining vehicle identifiers; then, storing the first vehicle identifier associated with the first software executable and the second vehicle identifier associated with the second software executable can include: providing a first query to the identifier database, the first query based on the identifier of the first software executable and the VII; after providing the first query to the identifier database, receiving a first query response to the first query from the identifier database; determining the first vehicle identifier based on the first query response; and storing the first vehicle identifier, such as discussed above at least in the context of FIGS. 2-5.

In still other embodiments, storing the first vehicle identifier associated with the first software executable and the second vehicle identifier associated with the second software executable based on the VII can include: providing a first query based on the VII; receiving a first query response to the first query; determining the first vehicle identifier and the second vehicle identifier based on the first query response; and storing the first vehicle identifier and the second vehicle identifier at the computing device, such as discussed above at least in the context of FIGS. 2-4, 6, and 8-10C.

In even other embodiments, storing the first vehicle identifier associated with the first software executable and the second vehicle identifier associated with the second software executable based on the VII can include: providing a first query based on the VII and an identifier of the first software executable; after providing the first query, receiving a first query response to the first query; determining the first vehicle identifier based on the first query response; storing the first vehicle identifier at the computing device; providing a second query based on the VII and an identifier of the second software executable, where the second query differs from the first query; after providing the second query, receiving a second query response to the second query; determining the second vehicle identifier based on the second query response; and storing the second vehicle identifier at the computing device, such as discussed above at least in the context of FIGS. 5 and 7.

At block 1730, the computing device can be used in repairing the vehicle by at least: receiving a request to activate the first software executable, and activating the first software executable at least by providing the stored first vehicle identifier to the first software executable, such as discussed above at least in the context of FIGS. 2, 4-7, and 12-14D.

In some embodiments, repairing the vehicle further includes: receiving a request to activate the second software executable; and activating the second software executable at least by providing the stored second vehicle identifier to the second software executable, such as discussed above at least in the context of FIGS. 2, 4-7, and 12-14C.

In other embodiments, the computing device can further include a home page with a plurality of activation controls for activating a plurality of software executables; then, activating the first software executable can include activating the first software executable using an activation control for activating the first software executable of the home page, such as discussed above in the context of at least FIGS. 11-14D.

In still other embodiments, the computing device can be connected to the vehicle; then, repairing the vehicle can include: after activating the first software executable, sending a request for repair-related information to the vehicle; receiving the repair-related information from the vehicle; and generating a display of the computing device based on the repair-related information, such as discussed above in the context of at least FIGS. 4-7 and 11-14D. In particular of these embodiments, the repair-related information can include data associated with one or more PIDs and/or one or more DTCs, such as discussed above in the context of FIGS. 11-14D. In more particular of these embodiments, the repair-related information can include a particular DTC; then, generating the display based on the repair-related information includes: determining information about one or more tests and/or repairs related to the particular DTC; and generating a display based on the information about one or more tests and/or repairs related to the particular DTC), such as discussed above in the context of FIGS. 12-14D. In even more particular of these embodiments, determining the information about one or more tests and/or repairs related to the particular DTC can include: sending a query including the particular DTC to a server computing device; and receiving, from the server computing device, the information about one or more tests and/or repairs related to the particular DTC, such as discussed above in the context of FIGS. 12-13E. In other even more particular of these embodiments, determining the information about one or more tests and/or repairs related to the particular DTC can include: determining the information about one or more tests and/or repairs related to the particular DTC utilizing data stored on the computing device, such as discussed above in the context of FIGS. 12 and 14A-14D.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time; e.g., volatile memory, register memory, processor cache, and/or random access memory (RAM). The computer readable media may also include non-transitory computer readable media that stores program code and/or data for longer periods of time; e.g., non-volatile memory, secondary or persistent long term storage, read only memory (ROM), optical or magnetic disks, compact-disc read only memory (CD-ROM). The computer readable media may also be any other volatile or non-volatile storage systems. A computer readable medium may be considered a computer readable storage medium, for example, or a tangible and/or non-transitory storage medium and/or device.

Moreover, a block that represents one or more information transmissions may correspond to information transmissions between software and/or hardware modules and/or executables in the same physical device. However, other information transmissions may be between software and/or hardware modules and/or executables in different physical devices.

Numerous modifications and variations of the present disclosure are possible in light of the above teachings.

Embodiments of the present disclosure may relate to one or more of the enumerated example embodiments (EEEs) listed below.

EEE 1 is a method comprising: determining, at a computing device, vehicle identification information (VII) that identifies a vehicle, wherein the computing device comprises a first software executable and a second software executable; storing, at the computing device, a first vehicle identifier associated with the first software executable and a second vehicle identifier associated with the second software executable based on the VII, wherein the first vehicle identifier differs from the second vehicle identifier; and repairing the vehicle using the computing device by at least: receiving a request to activate the first software executable, and activating the first software executable at least by providing the stored first vehicle identifier to the first software executable.

EEE 2 is the method of EEE 1, wherein repairing the vehicle further comprises: receiving a request to activate the second software executable; and activating the second software executable at least by providing the stored second vehicle identifier to the second software executable.

EEE 3 is the method of EEE 1 or EEE 2, wherein the computing device is communicatively coupled to a server computing device, and wherein storing the first vehicle identifier associated with the first software executable and the second vehicle identifier associated with the second software executable comprises: providing a first query to the server computing device, the first query based on an identifier of the first software executable and the VII; after providing the first query to the server computing device, receiving a first query response to the first query from the server computing device; determining the first vehicle identifier based on the first query response; and storing the first vehicle identifier at the computing device.

EEE 4 is the method of any one of EEEs 1-3, wherein the computing device comprises an identifier database and is not communicatively coupled to a server computing device for determining vehicle identifiers, and wherein storing the first vehicle identifier associated with the first software executable and the second vehicle identifier associated with the second software executable comprises: providing a first query to the identifier database, the first query based on the identifier of the first software executable and the VII; after providing the first query to the identifier database, receiving a first query response to the first query from the identifier database; determining the first vehicle identifier based on the first query response; and storing the first vehicle identifier.

EEE 5 is the method of any one of EEEs 1-4, wherein storing the first vehicle identifier associated with the first software executable and the second vehicle identifier associated with the second software executable based on the VII comprises: providing a first query based on the VII; receiving a first query response to the first query; determining the first vehicle identifier and the second vehicle identifier based on the first query response; and storing the first vehicle identifier and the second vehicle identifier at the computing device.

EEE 6 is the method of any one of EEEs 1-5, wherein storing the first vehicle identifier associated with the first software executable and the second vehicle identifier associated with the second software executable based on the VII comprises: providing a first query based on the VII and an identifier of the first software executable; after providing the first query, receiving a first query response to the first query; determining the first vehicle identifier based on the first query response; storing the first vehicle identifier at the computing device; providing a second query based on the VII and an identifier of the second software executable, wherein the second query differs from the first query; after providing the second query, receiving a second query response to the second query; determining the second vehicle identifier based on the second query response; and storing the second vehicle identifier at the computing device.

EEE 7 is the method of any one of EEEs 1-6, wherein the computing device is connected to the vehicle, and wherein determining the VII comprises: sending a request for the VII from the computing device to the vehicle; and receiving the VII at the computing device from the vehicle.

EEE 8 is the method of any one of EEEs 1-7, wherein the VII comprises a vehicle identification number (VIN) for the vehicle.

EEE 9 is the method of any one of EEEs 1-8, wherein the first software executable is configured for one or more functions of: a vehicle scanning function, a vehicle testing function, and a repair-information retrieval function.

EEE 10 is the method of any one of EEEs 1-9, wherein the computing device further comprises a home page with a plurality of activation controls for activating a plurality of software executables, and wherein activating the first software executable comprises activating the first software executable using an activation control for activating the first software executable of the home page.

EEE 11 is the method of any one of EEEs 1-10, wherein the computing device is connected to the vehicle, and wherein repairing the vehicle comprises: after activating the first software executable, sending a request for repair-related information to the vehicle; receiving the repair-related information from the vehicle; and generating a display of the computing device based on the repair-related information.

EEE 12 is the method of EEE 11, wherein the repair-related information comprises data associated with one or more parameter identifiers (PIDs) and/or one or more diagnostic trouble codes (DTCs).

EEE 13 is the method of EEE 12, wherein the repair-related information comprises a particular DTC, and wherein generating the display based on the repair-related information comprises: determining information about one or more tests and/or repairs related to the particular DTC; and generating a display based on the information about one or more tests and/or repairs related to the particular DTC.

EEE 14 is the method of EEE 13, wherein determining the information about one or more tests and/or repairs related to the particular DTC comprises: sending a query including the particular DTC to a server computing device; and receiving, from the server computing device, the information about one or more tests and/or repairs related to the particular DTC.

EEE 15 is the method of either EEE 13 or EEE 14, wherein determining the information about one or more tests and/or repairs related to the particular DTC comprises determining the information about one or more tests and/or repairs related to the particular DTC utilizing data stored on the computing device.

EEE 16 is a computing device, comprising: a processor; and a computer readable medium configured to store at least a first software executable, a second software executable, and executable instructions, wherein the executable instructions, when executed by the processor, cause the computing device to perform functions comprising the method of any one of EEE 1 to EEE 15.

EEE 17 is a non-transitory computer readable medium configured to store at least executable instructions, wherein the executable instructions, when executed by a processor of a computing device, cause the computing device to perform functions comprising the method of any one of EEE 1 to EEE 15.

The invention claimed is:

1. A method, comprising:
determining vehicle identification information that identifies a vehicle to be serviced;
determining repair-related information about the vehicle by:
transmitting a query to a first server other than a second server, wherein the query is based on a first software executable at the first server and a second software executable at a second server and includes a first vehicle identifier based on the vehicle identification information;
receiving a second vehicle identifier and a third vehicle identifier from the first server in response to the query, wherein the second vehicle identifier is associated with both the vehicle to be serviced and the first software executable at the first server, and wherein the third vehicle identifier is associated with both the vehicle to be serviced and the second software executable at the second server;
receiving, at a computing device, a request to activate the first software executable;
after receiving the request to activate the first software executable, activating the first software executable at least by providing the received second vehicle identifier to the first software executable as part of initiating execution of the first software executable;
receiving, at the computing device, a request to activate the second software executable;
after receiving the request to activate the second software executable, activating the second software executable at least by providing the received third vehicle identifier to the second software executable as part of initiating execution of the second software executable; and
determining the repair-related information about the vehicle includes determining repair-related information based on execution of the first software executable and the second software executable; and
generating, at the computing device, a display page based on the repair-related information about the vehicle.

2. A method according to claim 1, wherein the first server includes multiple, distinct computing devices in a single computing center.

3. A method according to claim 1, wherein:
the first server includes a single server in a single computing server, and
the first server includes program logic and/or data for multiple services.

4. A method according to claim 1, wherein one or more from among the request to activate the first software executable or the request to activate the second software executable includes: (1) a diagnostic trouble code, or (2) a parameter value and corresponding parameter identifier.

5. A method according to claim 1, wherein:
determining the repair-related information about the vehicle includes determining enhanced repair data.

6. A method according to claim 5, wherein the enhanced repair data includes one or more from among: a list of parameter identifiers or a list of tests.

7. A method according to claim 1, further comprising:
storing in a local data storage of the computing device a third software executable, and a fourth vehicle identifier associated with both the third software executable and the vehicle to be serviced;
receiving, at the computing device, a request to activate the third software executable; and after receiving the request to activate the third software executable, activating the third software executable at least by providing the fourth vehicle identifier to the third software executable as part of initiating execution of the third software executable.

8. A method according to claim 7, wherein the third software executable is configured to:
use one or more from among an oscilloscope, an ammeter, a voltmeter, or an ohmmeter disposed at the computing device to perform a component test, or
to communicate with a component on the vehicle to be serviced so as to obtain information from the component or to request the component to activate a functional test on the vehicle to be serviced.

9. A method according to claim 8, wherein the information from the component includes one or more from among: a diagnostic trouble code or a parameter value corresponding to a parameter identifier.

10. A method according to claim 1, further comprising:
displaying, on a display, one or more vehicle identification information entry pages,
wherein determining vehicle identification information that identifies the vehicle to be serviced includes determining vehicle identification information based on selections made via the one or more vehicle identification information entry pages.

11. A method according to claim 1, wherein:
activating the first software executable includes activating the first software executable using an activation control of a page for activating the first software executable, and
the page includes a plurality of activation controls for activating a plurality of software executables.

12. A method according to claim 1, further comprising:
communicating, by the computing device, with a component within the vehicle to be serviced using a vehicle communication protocol to determine one or more from among: a diagnostic trouble code or a parameter value corresponding to a parameter identifier.

13. A method according to claim 1, wherein determining the vehicle identification information includes determining a vehicle identification number (VIN) for the vehicle to be serviced.

14. A method according to claim 1, further comprising:
retrieving, from a local database based on the vehicle identification information, the first vehicle identifier based on the vehicle identification information.

15. A method according to claim 14, wherein:
the computing device is connected to the vehicle, and
determining the vehicle identification information comprises:
sending a request for the vehicle identification information from the computing device to the vehicle; and
receiving the vehicle identification information at the computing device from the vehicle.

16. A method according to claim 1, wherein the repair-related information about the vehicle includes one or more from among: a repair tip, original equipment manufacturer repair information, a technical service bulletin, or a test identifier.

17. A computing device, comprising:
a processor; and
a non-transitory computer readable medium storing at least executable instructions that, when executed by the processor, cause the computing device to perform functions comprising:
determining vehicle identification information that identifies a vehicle to be serviced;
determining repair-related information about the vehicle by:
transmitting a query to a first server other than a second server, wherein the query is based on a first software executable at the first server and a second software executable at a second server and includes a first vehicle identifier based on the vehicle identification information;
receiving a second vehicle identifier and a third vehicle identifier from the first server in response to the query, wherein the second vehicle identifier is associated with both the vehicle to be serviced and the first software executable at the first server, and wherein the third vehicle identifier is associated with both the vehicle to be serviced and the second software executable at the second server;
receiving, at the computing device, a request to activate the first software executable;
after receiving the request to activate the first software executable, activating the first software executable at least by providing the received second vehicle identifier to the first software executable as part of initiating execution of the first software executable;
receiving, at the computing device, a request to activate the second software executable;
after receiving the request to activate the second software executable, activating the second software executable at least by providing the received third vehicle identifier to the second software executable as part of initiating execution of the second software executable; and
determining the repair-related information about the vehicle includes determining repair-related information based on execution of the first software executable and the second software executable; and
generating, at the computing device, a display page based on the repair-related information about the vehicle.

18. A non-transitory computer readable medium storing at least executable instructions, wherein the executable instructions, when executed by a processor of a computing device, cause the computing device to perform functions comprising:
determining vehicle identification information that identifies a vehicle to be serviced;
determining repair-related information about the vehicle by:
transmitting a query to a first server other than a second server, wherein the query is based on a first software executable at the first server and a second software executable at a second server and includes a first vehicle identifier based on the vehicle identification information;
receiving a second vehicle identifier and a third vehicle identifier from the first server in response to the query, wherein the second vehicle identifier is associated with both the vehicle to be serviced and the first software executable at the first server, and wherein the third vehicle identifier is associated with both the vehicle to be serviced and the second software executable at the second server;
receiving, at the computing device, a request to activate the first software executable;

after receiving the request to activate the first software executable, activating the first software executable at least by providing the received second vehicle identifier to the first software executable as part of initiating execution of the first software executable;
receiving, at the computing device, a request to activate the second software executable;
after receiving the request to activate the second software executable, activating the second software executable at least by providing the received third vehicle identifier to the second software executable as part of initiating execution of the second software executable; and
determining the repair-related information about the vehicle includes determining repair-related information based on execution of the first software executable and the second software executable; and generating, at the computing device, a display page based on the repair-related information about the vehicle.

\* \* \* \* \*